United States Patent [19]
Washisu

[11] Patent Number: 6,064,826
[45] Date of Patent: May 16, 2000

[54] DEVICE USED IN IMAGE BLUR PREVENTION APPARATUS

[75] Inventor: Koichi Washisu, Tokyo, Japan

[73] Assignee: Canon Kabushiki Kaisha, Tokyo, Japan

[21] Appl. No.: 09/003,805

[22] Filed: Jan. 7, 1998

Related U.S. Application Data

[63] Continuation of application No. 08/365,681, Dec. 29, 1994, abandoned.

[30] Foreign Application Priority Data

Dec. 30, 1993 [JP] Japan .................................. 5-350362
Dec. 30, 1993 [JP] Japan .................................. 5-350364

[51] Int. Cl.[7] .................................................. G03B 17/00
[52] U.S. Cl. ................................................................ 396/55
[58] Field of Search ........................ 396/52–55; 348/208

[56] References Cited

U.S. PATENT DOCUMENTS

| | | | |
|---|---|---|---|
| 4,864,339 | 9/1989 | Gross et al. ............................. | 354/202 |
| 5,101,230 | 3/1992 | Shikaumi et al. ....................... | 354/430 |
| 5,243,462 | 9/1993 | Kobayashi et al. ..................... | 359/557 |
| 5,245,378 | 9/1993 | Washisu .................................. | 354/410 |
| 5,353,091 | 10/1994 | Ishida et al. ............................ | 354/410 |
| 5,416,554 | 5/1995 | Hamada et al. ........................ | 354/400 |
| 5,444,512 | 8/1995 | Morizumi ................................ | 354/430 |
| 5,463,443 | 10/1995 | Tanaka et al. .......................... | 354/430 |
| 5,835,798 | 11/1998 | Kitagawa ................................. | 396/55 |

FOREIGN PATENT DOCUMENTS 3-188413  8/1991  Japan .

*Primary Examiner*—W. B. Perkey
*Attorney, Agent, or Firm*—Fitzpatrick, Cella, Harper & Scinto

[57] ABSTRACT

Apparatus for use with an image blur prevention device which performs an image blur prevention operation by operating a movable member. The apparatus includes an initial setting portion which moves the movable member to a predetermined target position as an initial setting of the image blur prevention device and a changing portion which changes a moving amount of the movable member on moving the movable member at positions corresponding to the predetermined target position, as an initial setting operation.

20 Claims, 50 Drawing Sheets

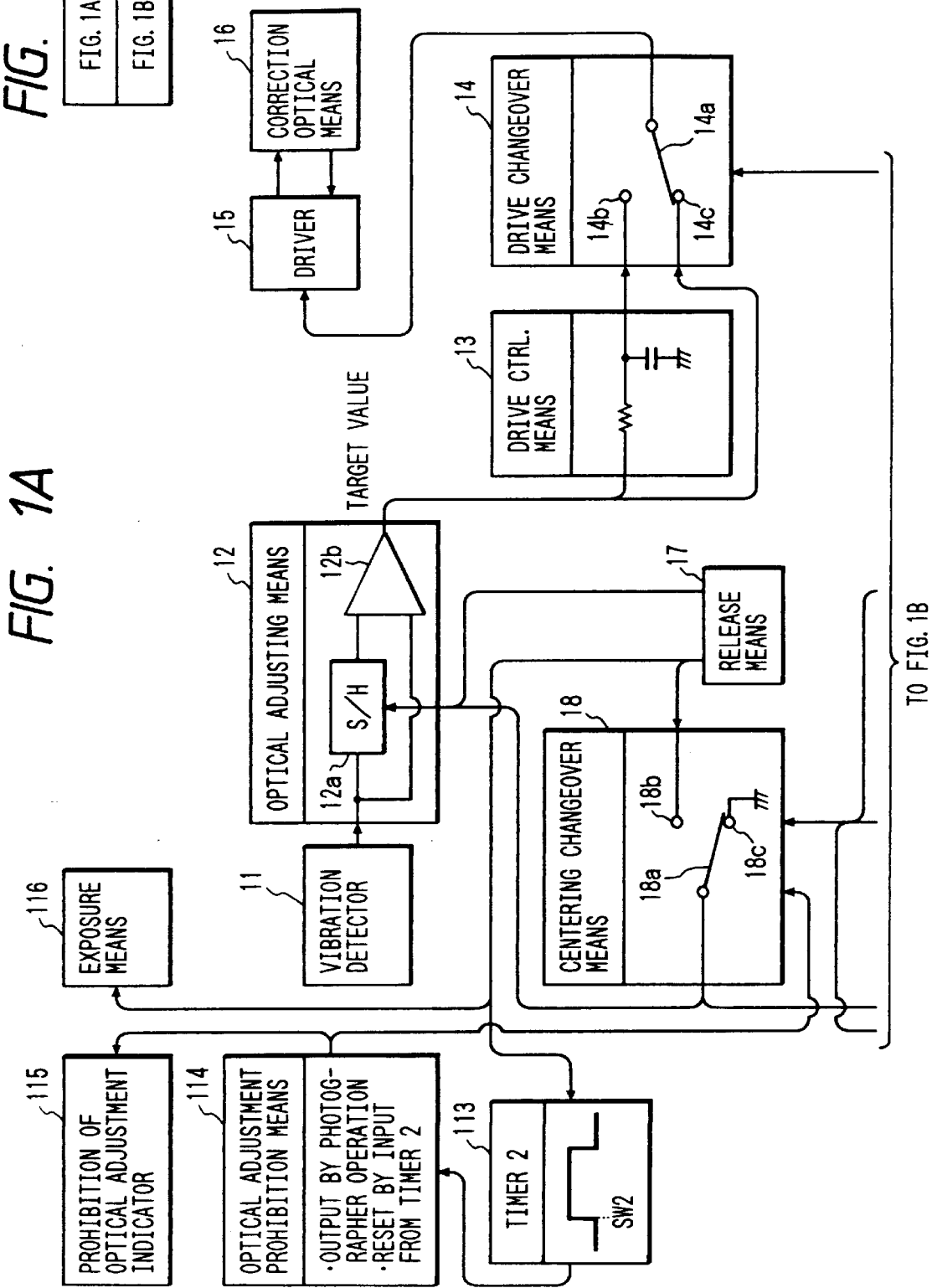

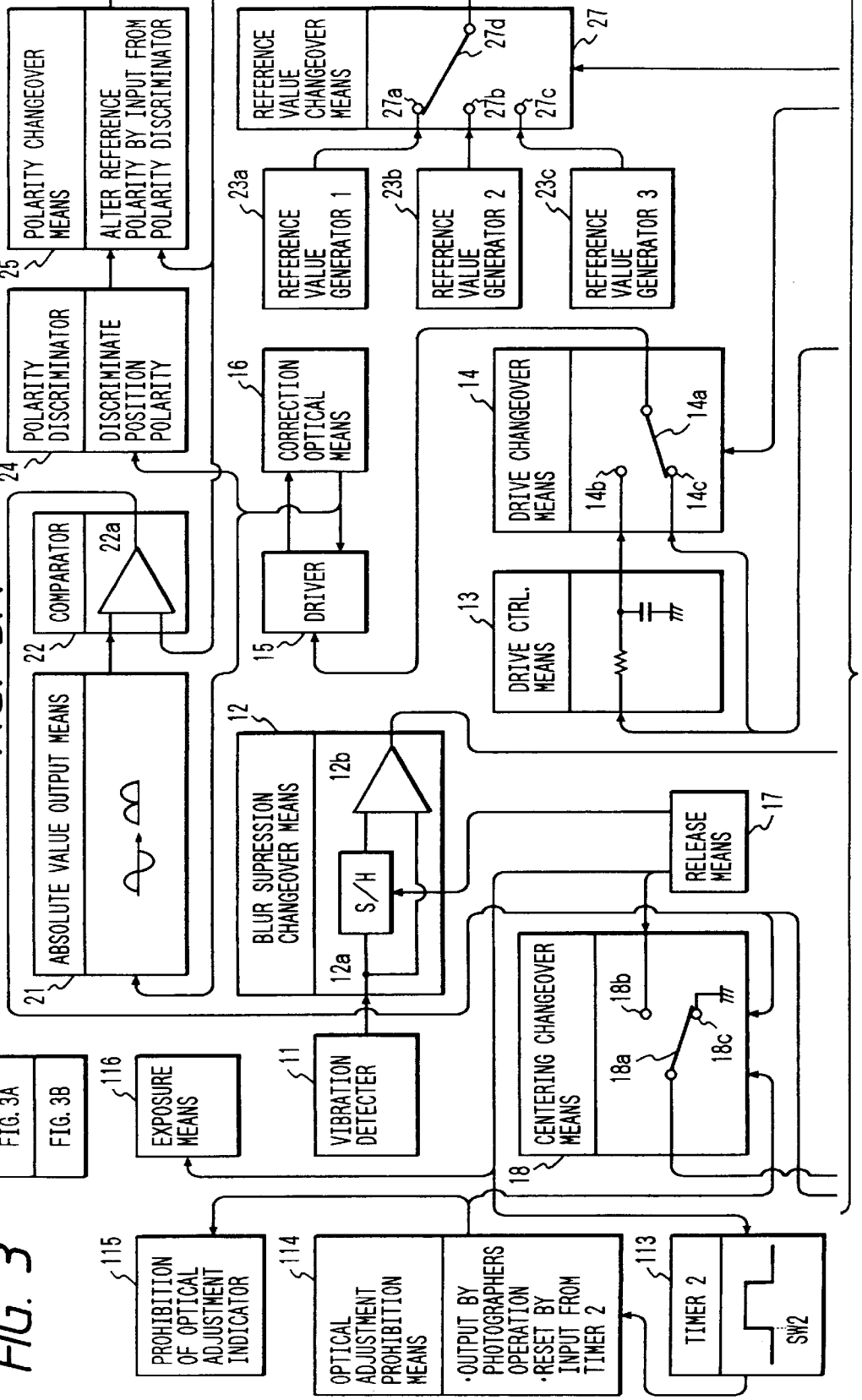

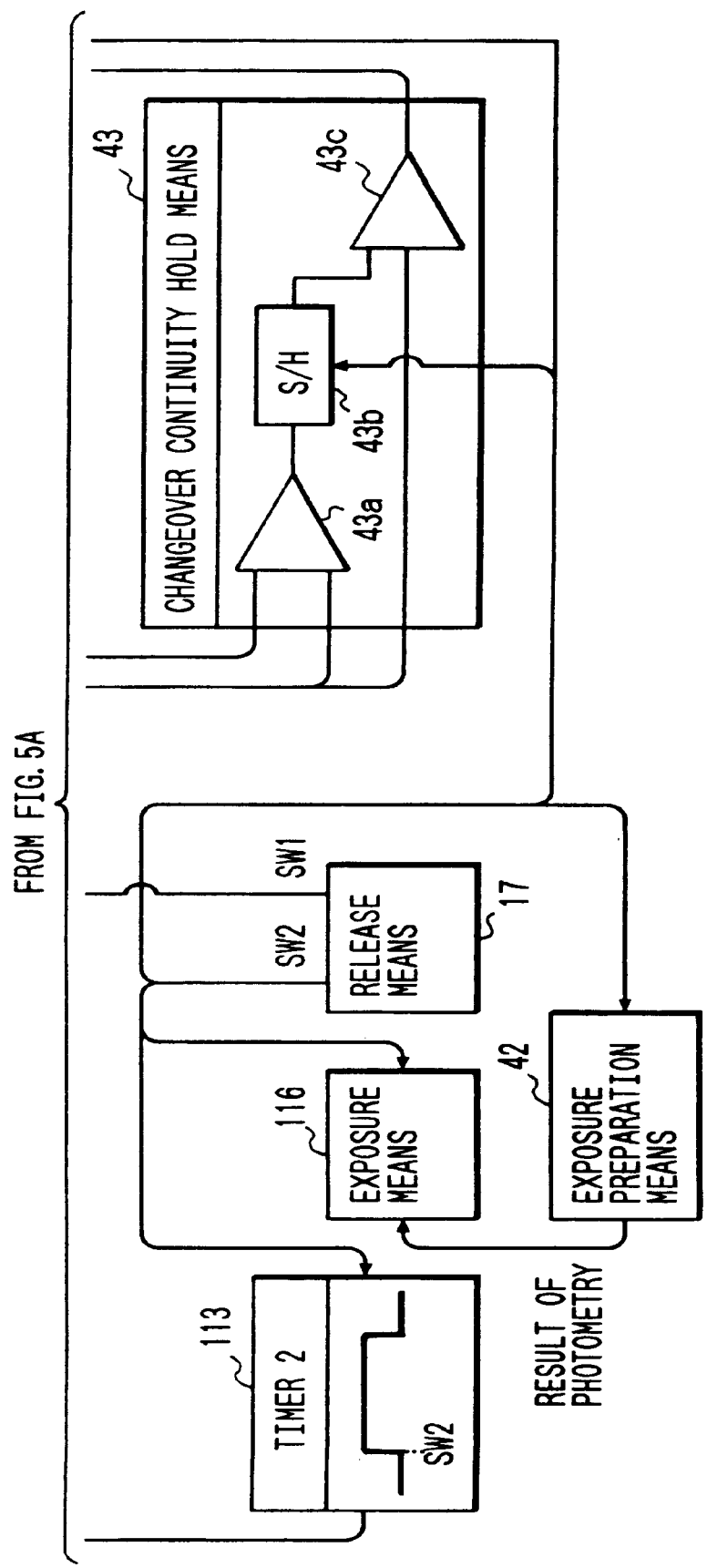

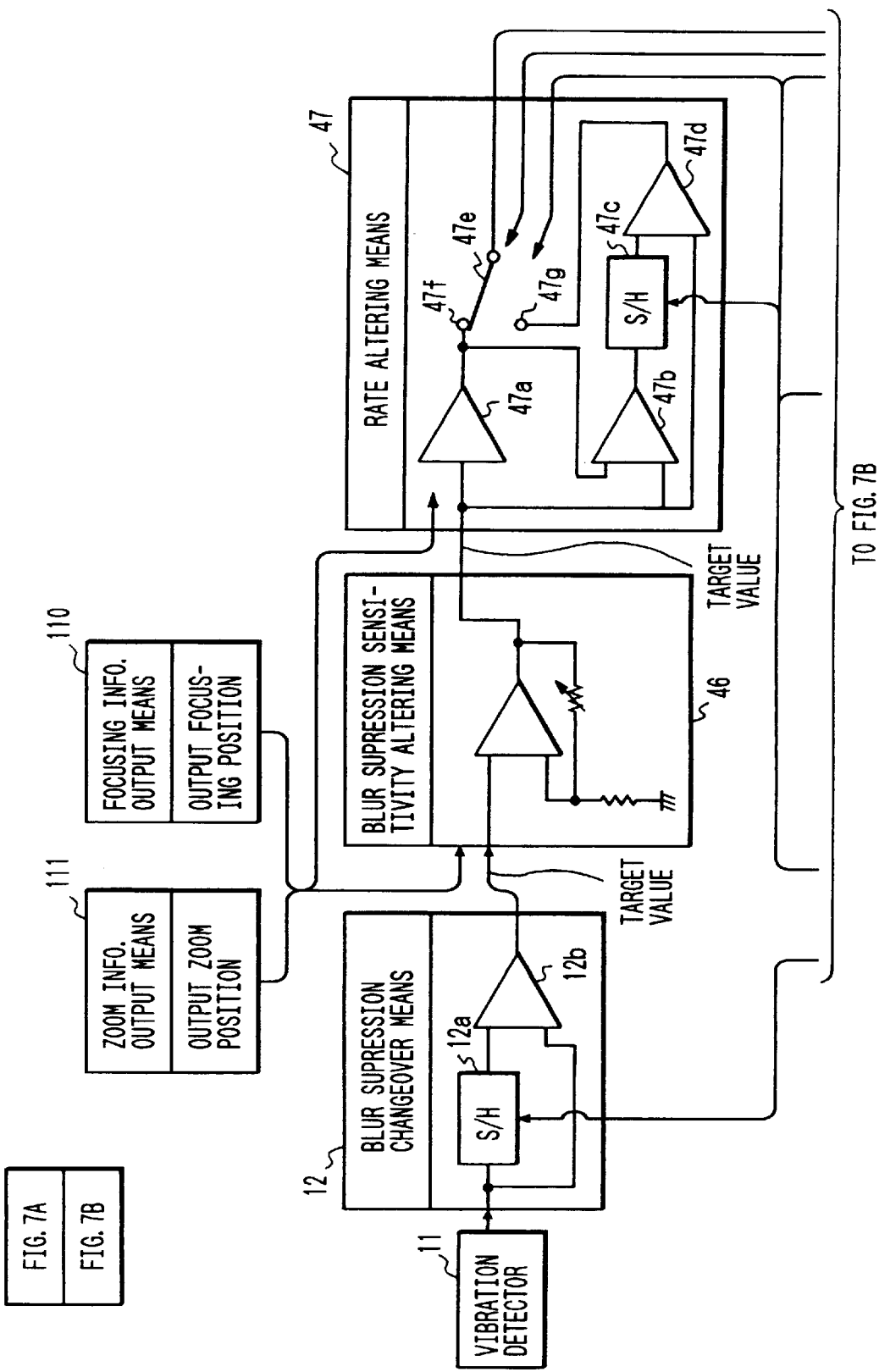

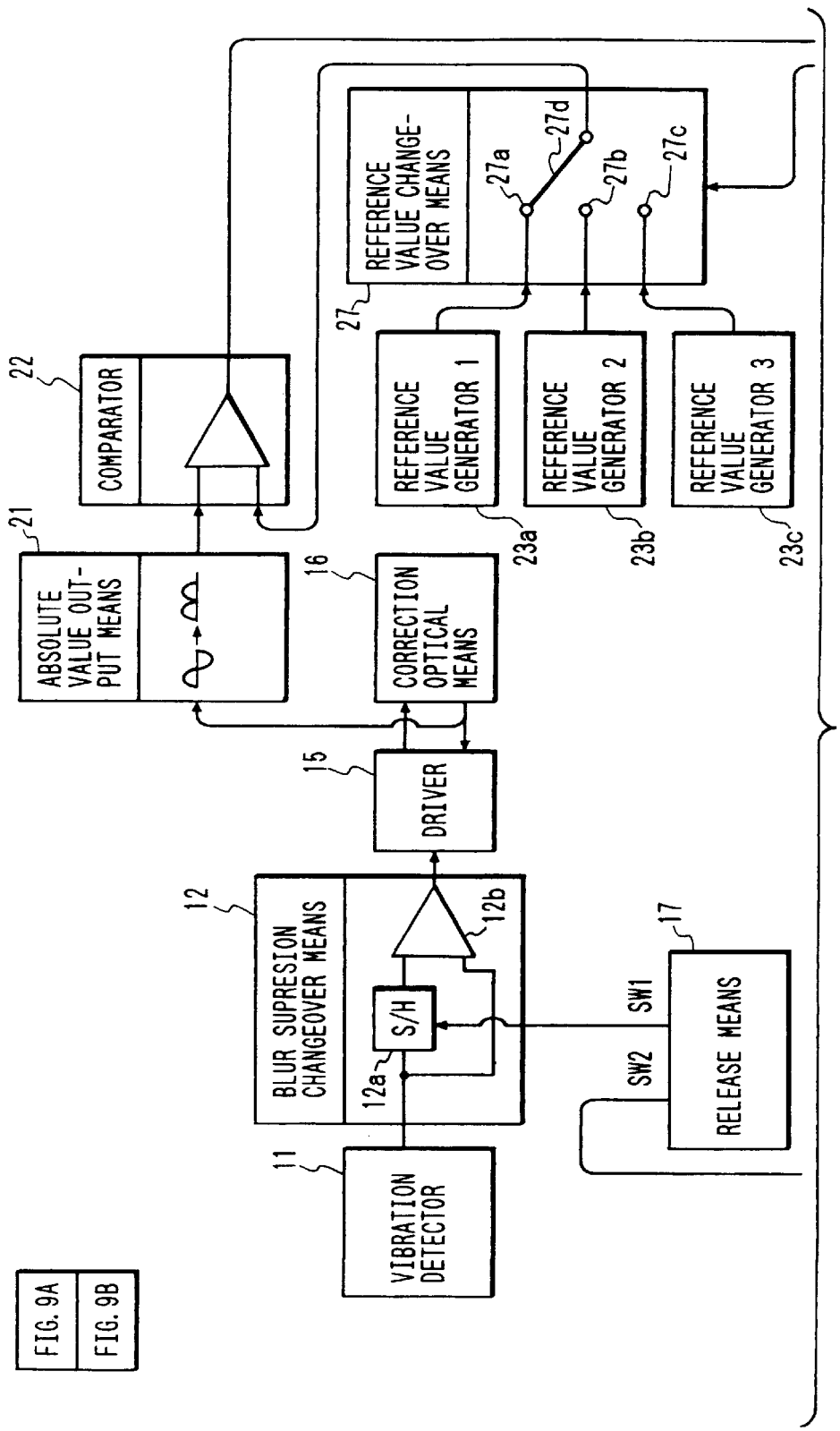

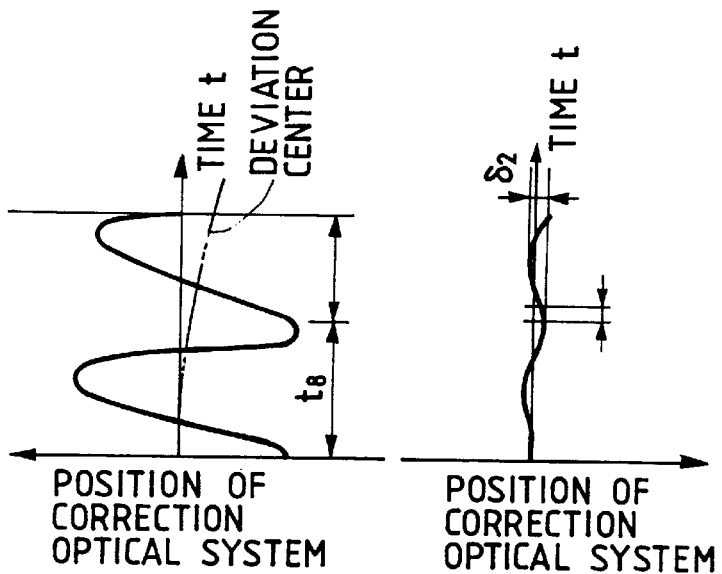
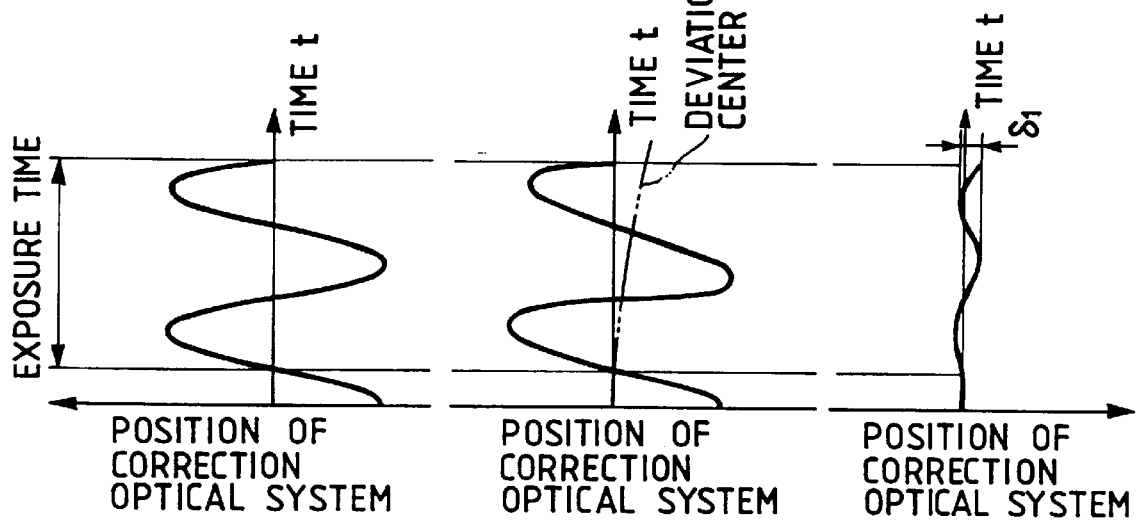
FIG. 12A, FIG. 12B, FIG. 12C, FIG. 12D, FIG. 12E

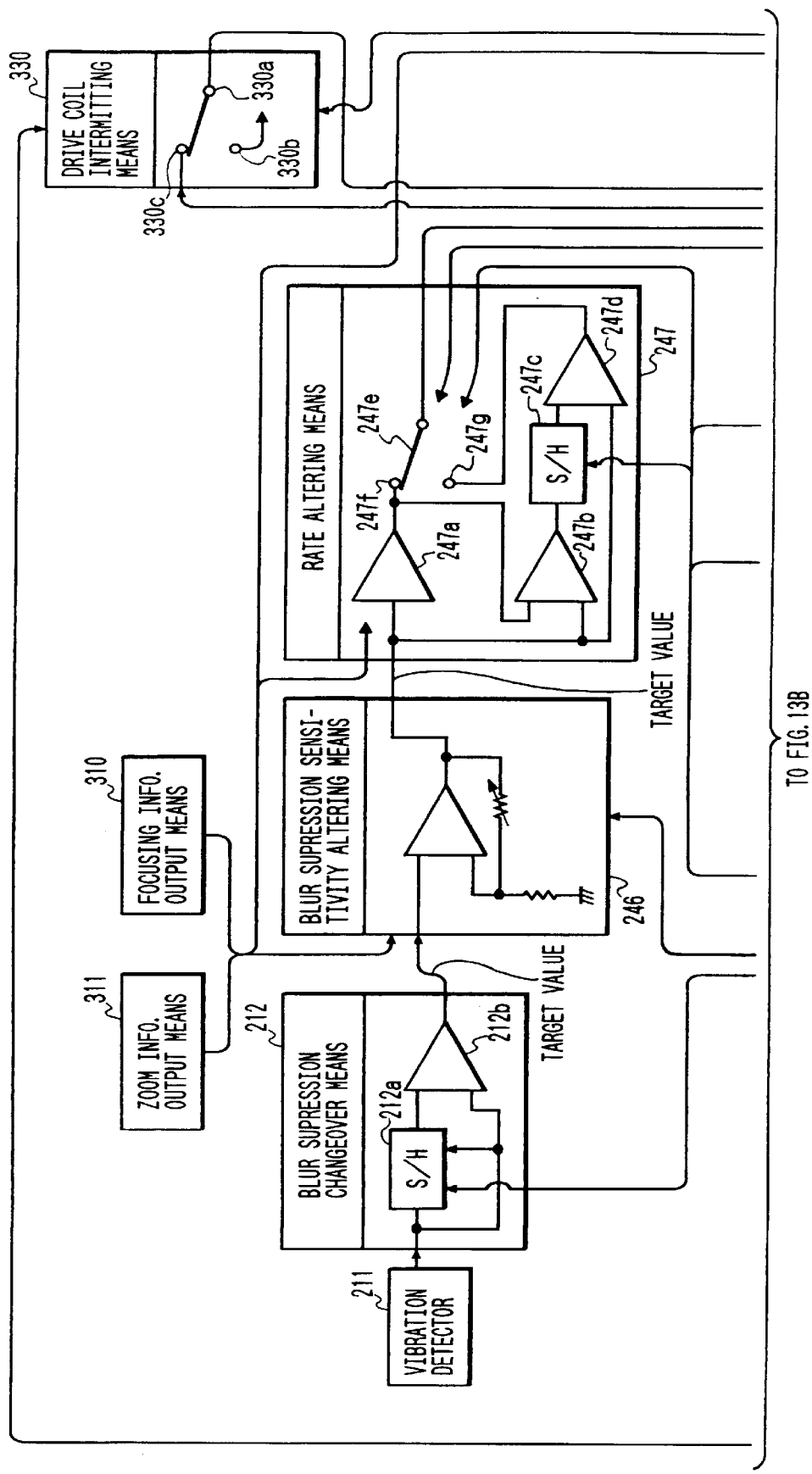

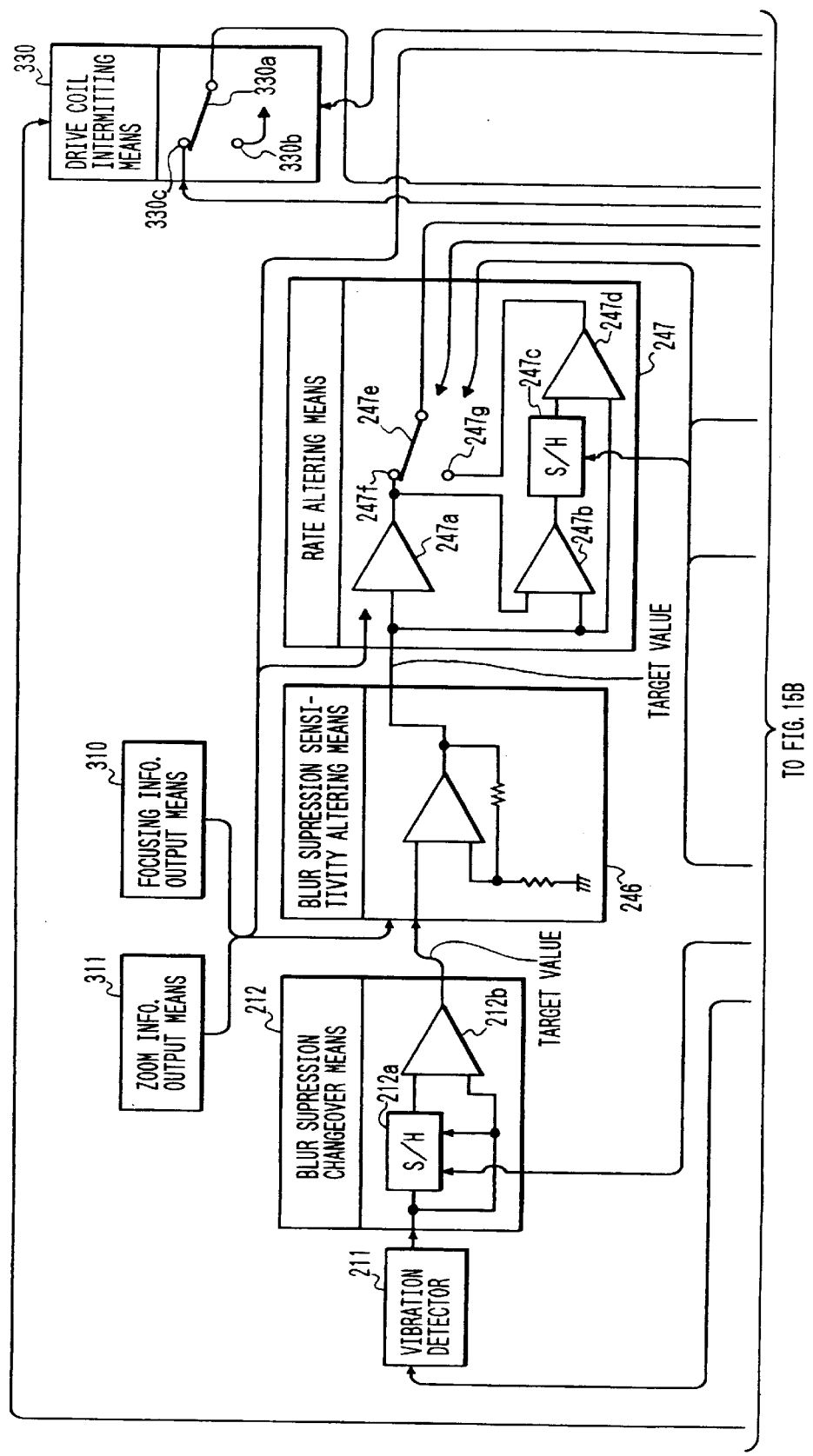

(BEFORE ALTERING FREQUENCY CHARACTERISTIC)

(AFTER ALTERING FREQUENCY CHARACTERISTIC)

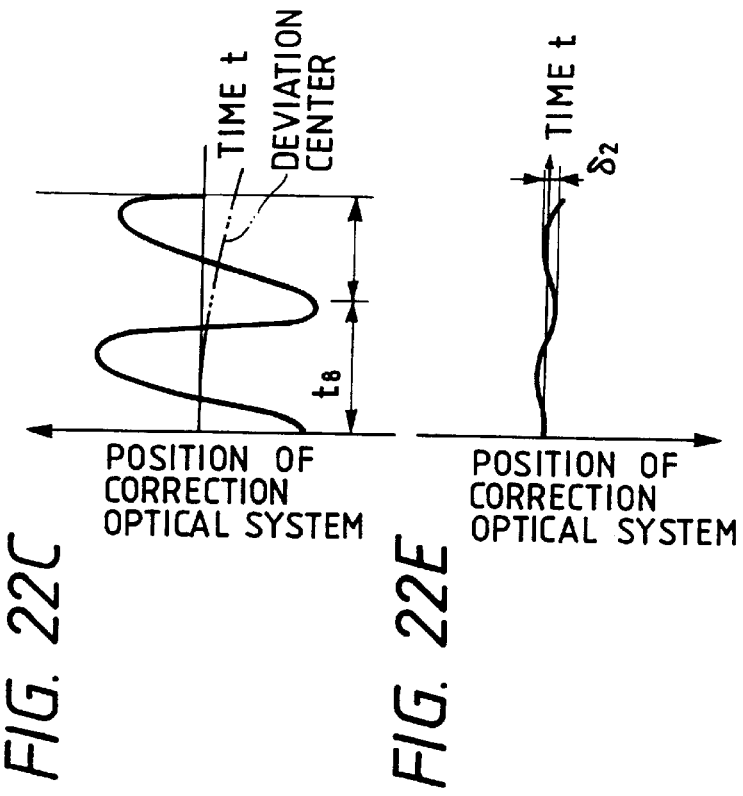
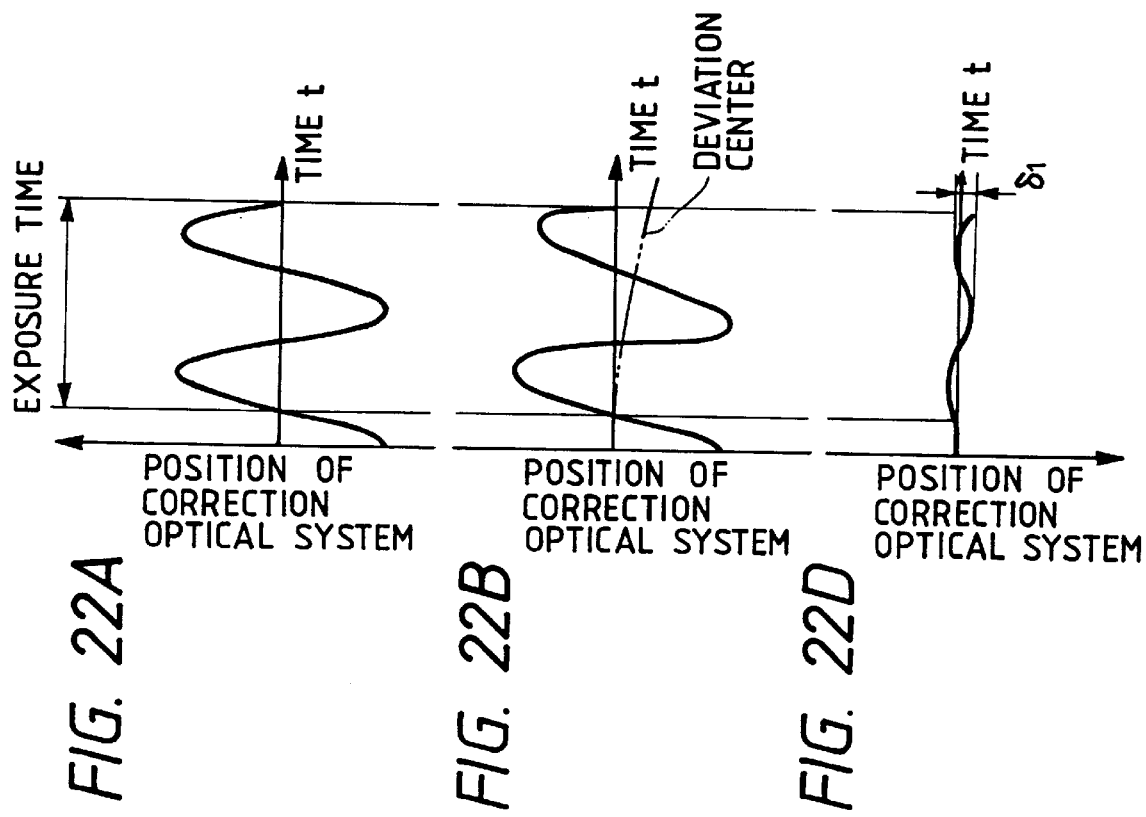

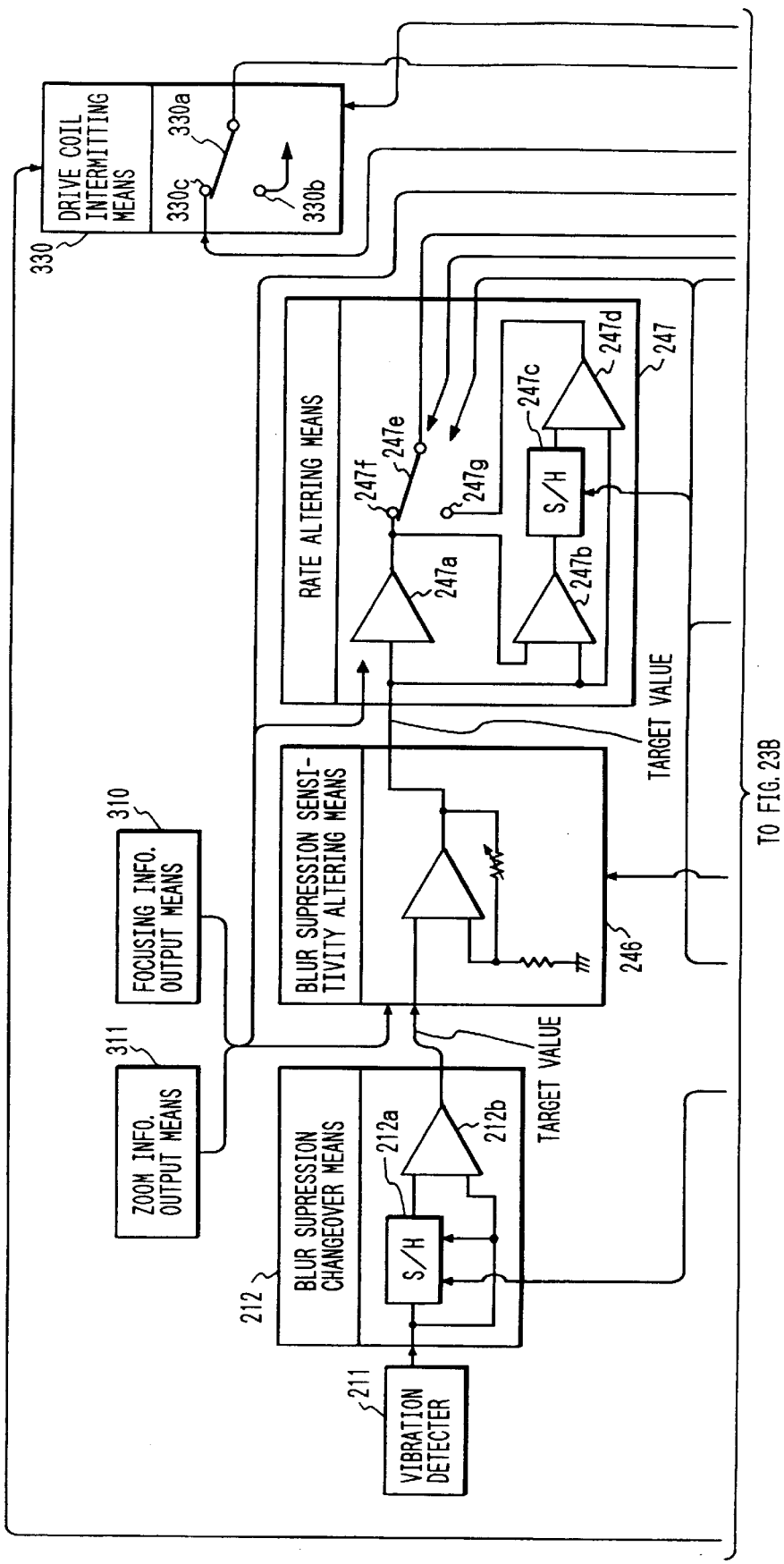

FROM FIG. 23A

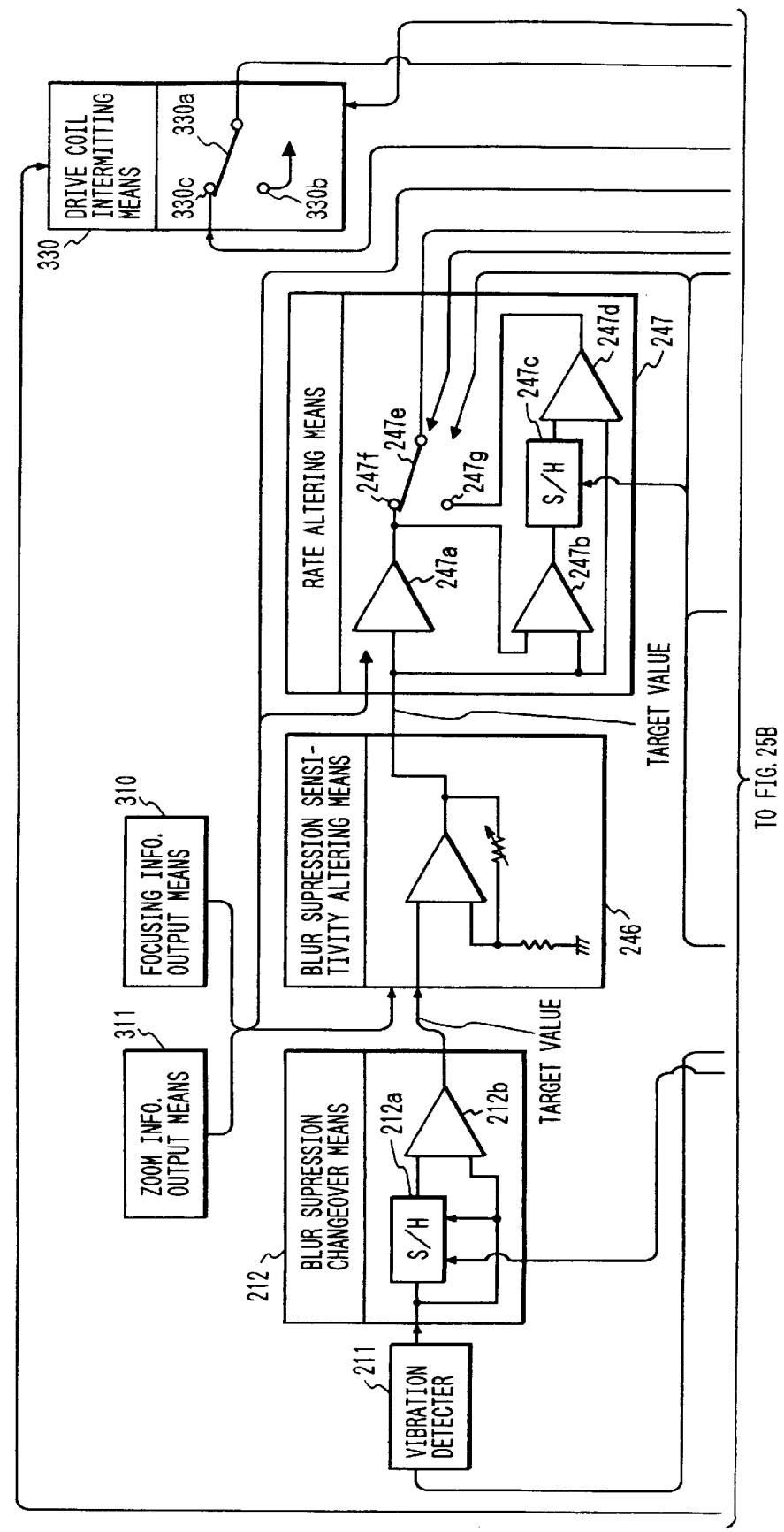

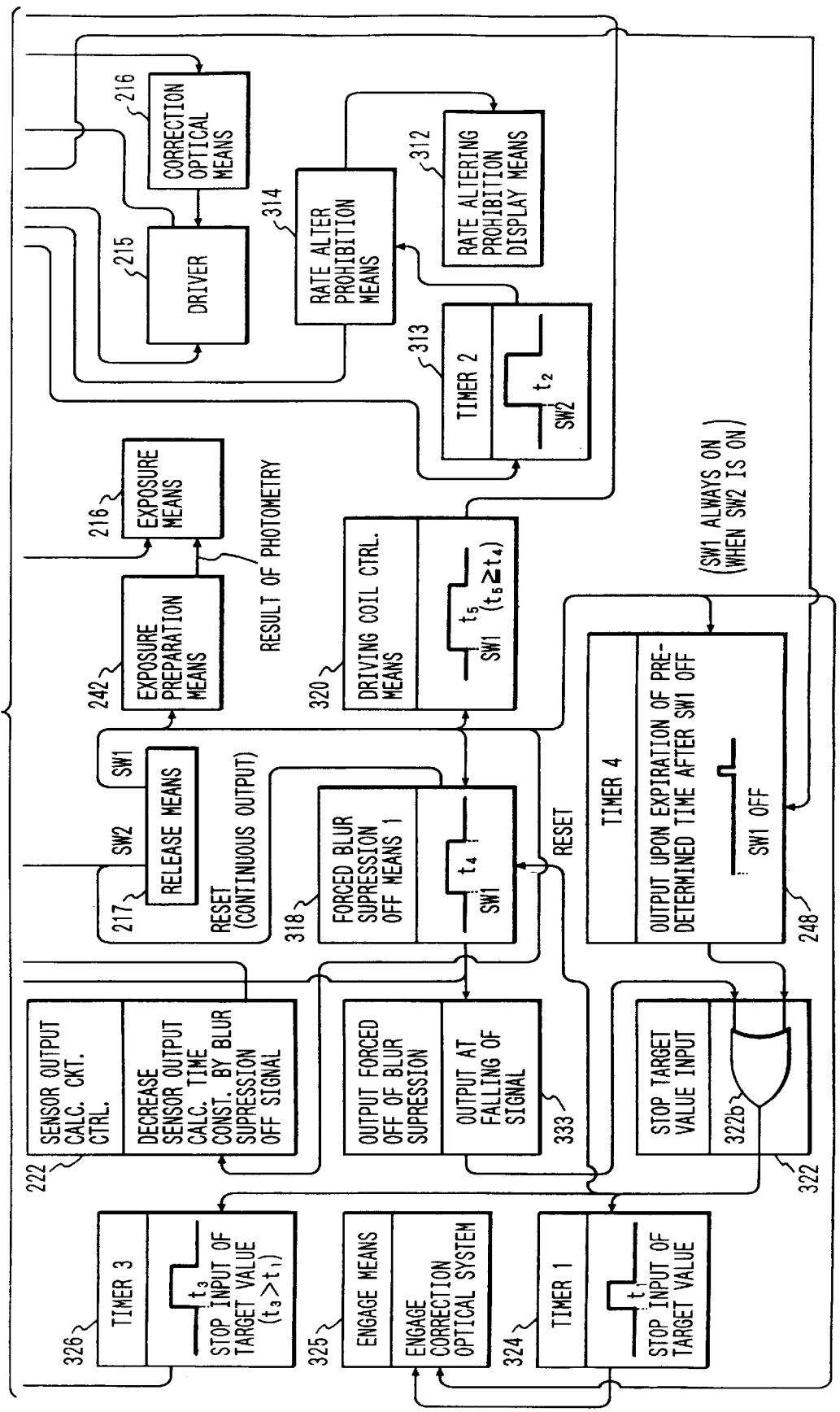

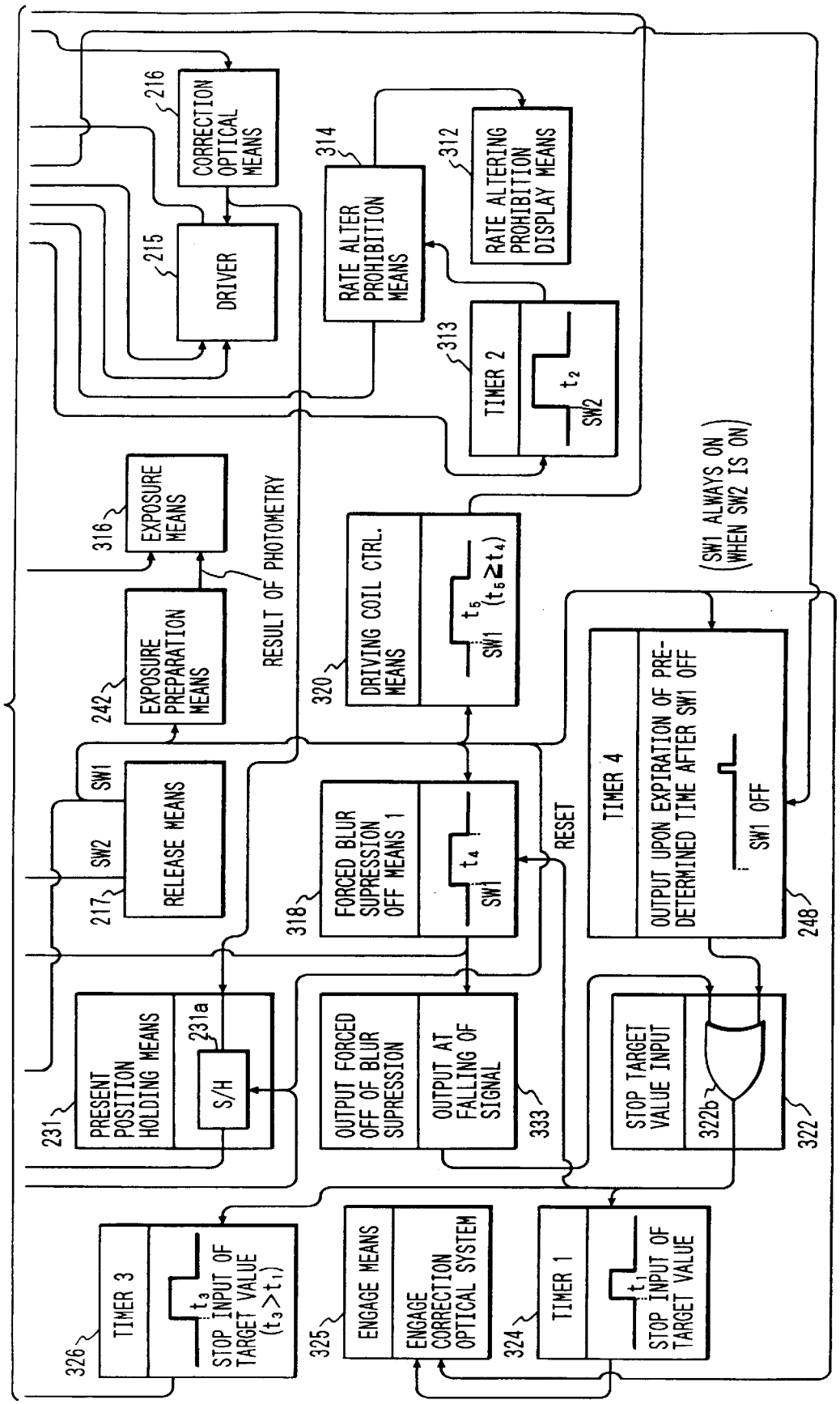

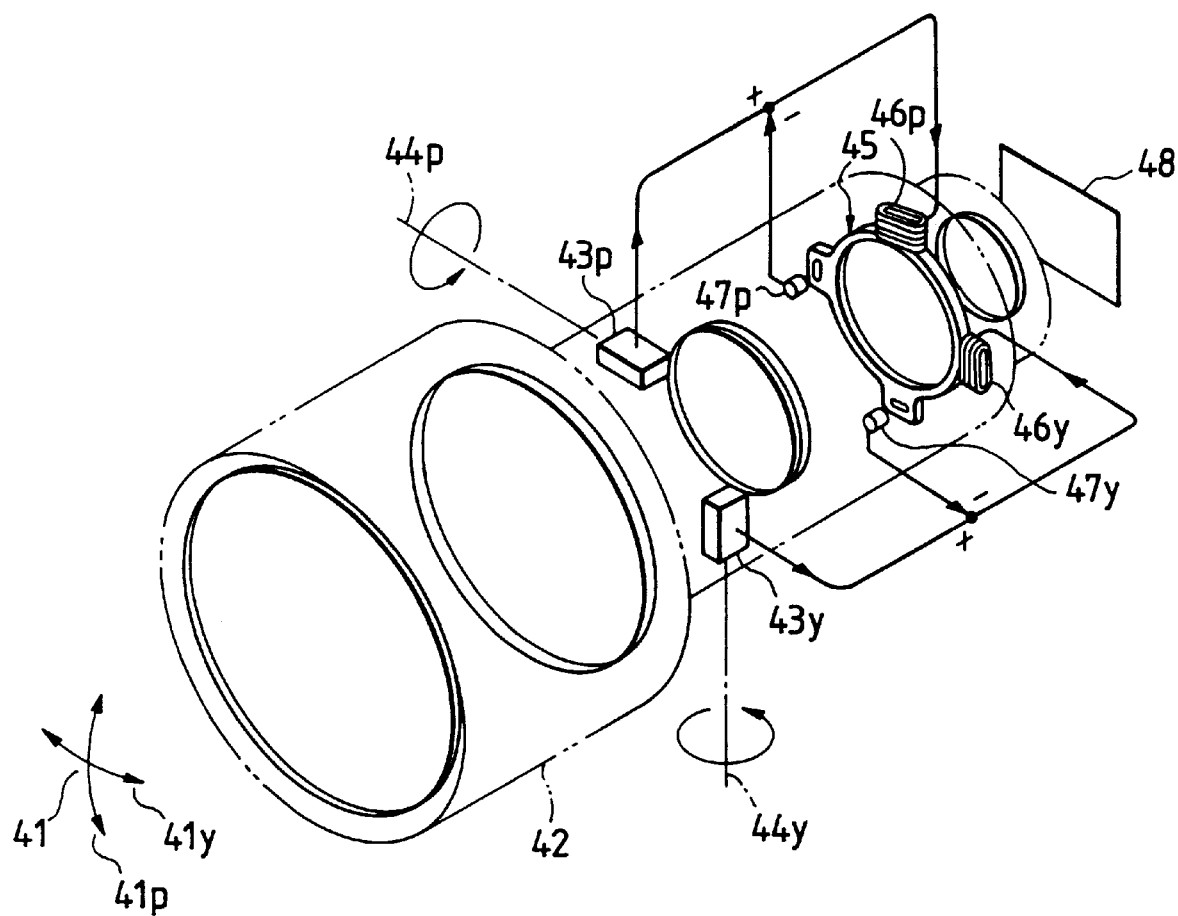

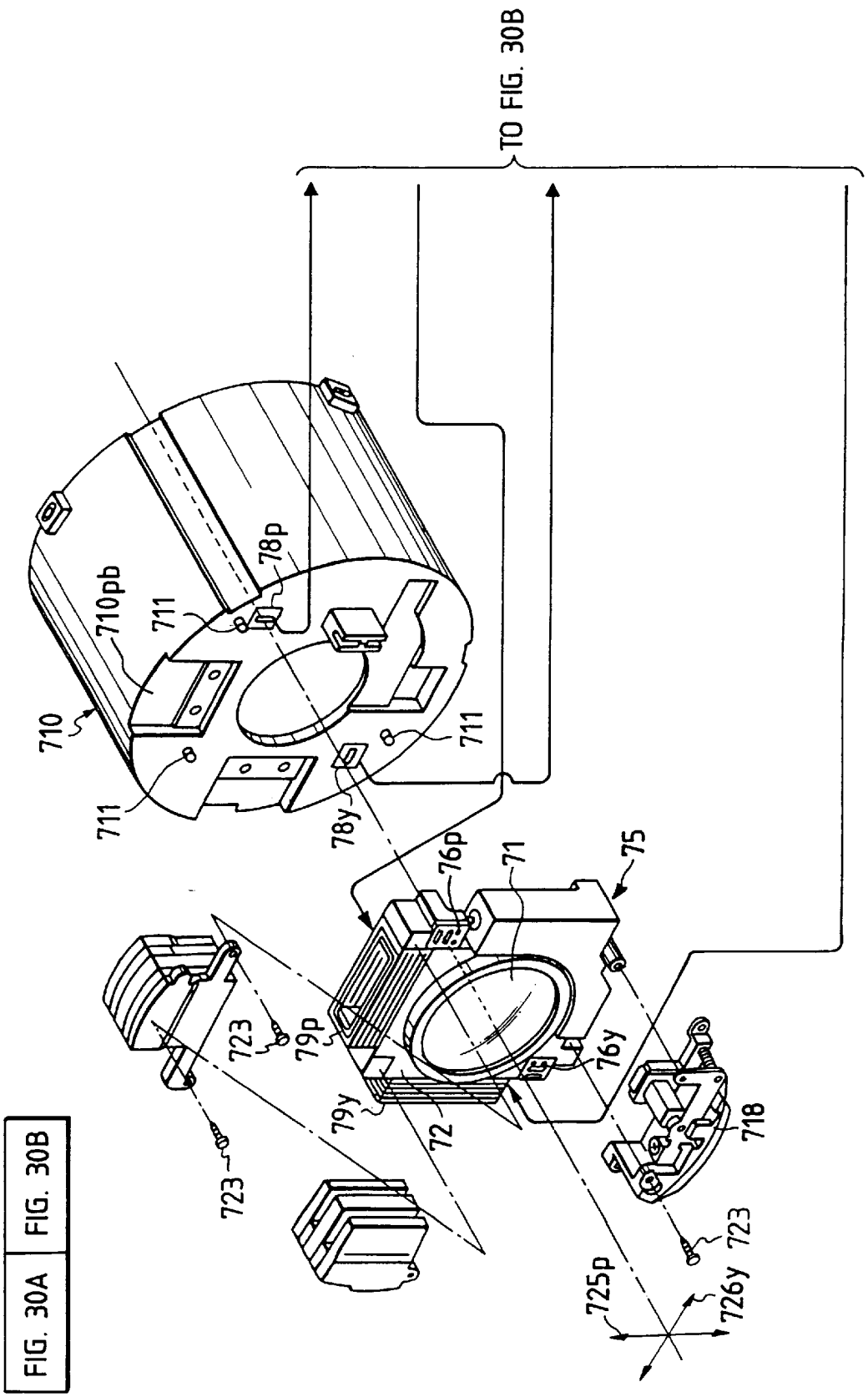

A: ADMISSIBLE ABERRATION DRIVING RANGE AT ZOOM-WIDE

B: ADMISSIBLE ABERRATION DRIVING RANGE AT ZOOM-TELE

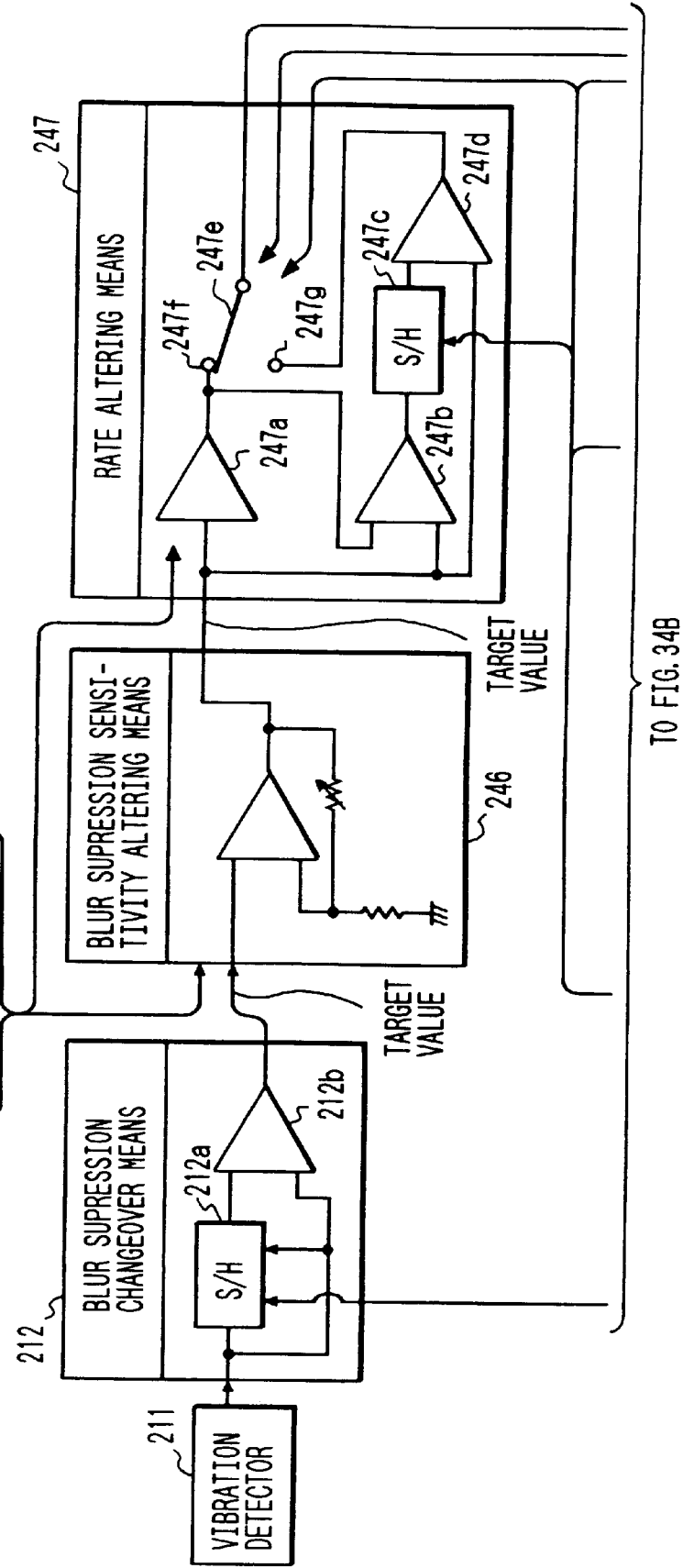

DEVICE USED IN IMAGE BLUR PREVENTION APPARATUS

This application is a continuation of application Ser. No. 08/365,681, filed Dec. 29, 1994, now abandoned.

BACKGROUND OF THE INVENTION

1. Field of the Invention

The present invention relates to a device which can be preferably used in an apparatus for preventing blurred images caused by unintentional movement of hands.

2. Related Background Art

The related background art will be described below.

Today, in a photographing camera, important operations for photographing such as determinations of exposure time, focusing, and so on are all automatically performed so that even a photographer who is not familiar with such operations seldom fails to take a good picture. However, failure caused by vibration of the camera body has been difficult to prevent.

Accordingly, a camera capable of preventing such failure caused by vibration of the camera body has been intensively studied. Among this kind of camera, a camera capable of the preventing failure caused by unintentional movement of hands of the photographer is eagerly being developed and studied.

The vibration of the hands at the time of taking a picture generally has a frequency in a range from 1 to 12 Hz. A fundamental method to obtain a good picture even if the camera body is vibrated by the hands at the time of releasing the shutter, is to detect such vibration of the camera body and drive a correcting lens according to the results of detection. Accordingly, in order to realize good photographing without a blurred image even if the camera body is vibrated, first, the vibration of the camera body has to be detected with precision, and secondarily, the deviation of the optical axis caused by the vibration has to be corrected.

Detection of the vibration (deviation) of the camera body can be carried out, principally by mounting, on the camera body, vibration sensors for detecting angular accerelation, angular velocity, angular displacement, and so on, as well as a deviation detection means for electrically or mechanically integrating the output of the vibration sensors to obtain the total angular deviation of the camera body. Further, a correction optical means is mounted on the camera body. This correction optical means is to be driven to shift the photographing optical axis according to the information from the deviation detection means. Thus, the blurred image can be reduced.

The outline of the blur suppression system using the angular deviation detection means will be described with reference to FIG. 28.

In FIG. 28, a reference numeral 43 designate a lens barrel. Angular deviation detection means (vibration detection means) 43p and 43y comprise angular velocity meters such as gyros, or the like, and integrators for integrating the angular velocities detected by the angular meters to obtain the angular deviation of the camera body. The angular velocity meter of the angular deviation detection means 43p detects vertical angular deviation, while that of the deviation detection means 43y detects horizontal angular deviation. Thus, the direction of the detection performed by the angular deviation detection means 43p is as indicated by an arrow 44p, while that of the means 43y by an arrow 44y. A correction optical means 45 has coils 46p and 46y for driving the optical means 45 and position detection elements 47p and 47y for detecting the position of the correction optical means 45. The correction optical means 45, which also has a position adjusting loop (described later), is driven corresponding to the target value outputted from the angular deviation detection means 43p and 43y in order to stabilize an image surface 48.

FIG. 29 is a perspective view showing an example of the construction of the correction optical means, wherein its constituents are disassembled.

A lens 71 is caulked in a support frame 72, in which a bearing 73y is tightly inserted. The bearing 73y supports a support shaft 74y so that the support shaft 74y can shift in its axial direction. The support shaft 74y has a small-diameter portion 74ya in order to engage with a hook 75a of a support arm 75. Also, a bearing 73p is tightly inserted in the support arm 75 in order to support a support shaft 74p so that the support shaft 74p can shift in its axial direction.

Note that, in FIG. 29, the back of the support arm 75 and a partial plan view thereof, which clearly shows the hook 75a, are also shown.

Light projector elements 76p and 76y are adhered into positioning holes 72pa and 72ya, respectively, of the support frame 72. The terminals of these light projector elements 76p and 76y are soldered with covers 77p and 77y, respectively, which are also adhered to the support frame 72 and serve as connection substrates. The support frame 72 has slits 72pb and 72yb, through which light beams emitted from the light projector elements 76p and 76y are incident on PSDs 78p and 78y (described later), respectively. Also coils 79p and 79y are adhered to the support frame, wherein the terminals of the coils 79p and 79y are soldered with the covers 77p and 77y, respectively.

Three support pins 711 having ball-shaped heads are inserted in their respective positioning holes of the lens barrel 710. The lens barrel 710 has a hook 710a for engaging with a small-diameter portion 74pa of a support shaft 74p.

Yokes $712p_1$, $712p_2$ and $712p_3$, and magnets $713p_1$ and $713p_2$ are adhered together so as to be alternately overlapped. Similarly yokes $712y_1$, $712y_2$ and $712y_3$, and magnets $713y_1$ and $713y_2$ are adhered alternately. Polarity of the magnets are indicated by arrows 713pa and 713ya.

The yokes $712p_2$ and $712y_2$ are fixed to recesses 712pb and 710yb, respectively, with screws.

Position detection elements 78p and 78y such as PSDs are adhered to senser bases 714p and 714y (of which 714y is not shown in FIG. 29), and covered with sensor marks 715p and 715y, respectively, wherein the terminals of these position detection elements 78p and 78y are soldered to a flexible substrate 716. Projections 714pa and 714ya (of which 714ya is not shown) of the sensor bases 714p and 714y are inserted into positioning holes 710pc and 710yc of the lens barrel 170, and then the flexible substrate 716 is fixed to the lens barrel 710 by means of a flexible substrate stay 717 and screws, lug portions 716pa and 716ya of the flexible substrate 716 are inserted through holes 710pd and 710yd, respectively, of the lens barrel 710, and fixed onto the yokes $712p_1$ and $712y_1$ with screws. The terminals of the coils and those of the light projector elements on the covers 77p and 77y are connected with land portion 716pb of the lug portion 716pa and land portion 716yb of the lug portion 716ya, respectively, of the flexible substrate 716, as well as, with polyurethane copper wires (three-wire strand).

A plunger 719 is fixed to a mechanical lock chassis 718, and set in a mechanical lock arm 721 provided with a spring 720, wherein the plunger 719 is rotatably fixed to the mechanical lock chassis 718 with a pivot 722.

The mechanical lock chassis 718 is fixed to the lens barrel 710 with screws, while the terminals of the plunger 719 are soldered with the land portion 716b of the flexible substrate 716.

Three adjusting screws 723 having spherical heads are thread fastened to and penetrated through the mechanical lock chassis 718 to hold, with the support pins 711, a slide surface 72c (indicated by slant lines) in between. The adjusting screws 723 are thread-fastened to the mechanical lock chassis 718 so as to be positioned to face to the slide surface with a small clearance.

A cover 724 is adhered to the lens barrel 710 to cover said correction optical means.

FIG. 30 shows a drive control system for the correction optical means shown in FIG. 29.

Outputs of the position detection elements 78p and 78y are amplified by amplifier 727p and 727y and applied to the coils 79p and 79y, respectively. As a result, the support frame 72 is driven and output of the position detection elements 78p and 78y varies. If driving direction (polarity) of each coil 79p/79y is set to coincide with the direction toward which output of the position detection element 78p/78y becomes smaller, (negative feedback), the coils 79p and 79y drive the support frame 72 to its stable position at which output of the position detection elements 78p and 78y becomes substantially zero. Note that adders 731p and 731y are circuits for adding output of the position detection elements 78p and 78y to commands 730p and 730y given from outside, that compensation circuits 728p and 728y further stabilize the control system, and that drive circuits 729p and 729y supply current to the coils 79p and 79y.

When commands 730p and 730y are given from outside to the system shown in FIG. 30B, through the adders 731p and 731y, the support frame 72 is driven exactly in correspondence to the commands 730p and 730y.

The technique employed in the control system shown in FIGS. 30A and 30B, in which the coils are controlled by negative feedback of the output of the position detection elements, is generally called "position control technique". In this case, when the movement of hands is given as the commands 730p and 730y, the support frame 72 is driven according to the movement of hands.

FIG. 31 is a circuit diagram for illustrating the details of the drive control system of the correction optical means shown in FIGS. 30A and 30B. Here, operations are described only with respect to the direction of the pitches (because operations in the direction of the yokes are the same).

Current/voltage conversion amplifiers 727a and 727b convert photo-current $727i_1$ and $727i_2$ generated in the position detection element 78p (comprising resistances R1 and R2) by the light projector 76p into voltages. Differential amplifier 727c calculates a difference between the output of the current/voltage conversion amplifiers 727a and 727b. The above current/voltage conversion amplifiers 727a and 727b, and the differential amplifier 727, and resistances R3 to R10 constitute an amplifier 727p shown in FIG. 30B.

A command amplifier 731a adds a command 730p applied from outside to a differential signal from the differential amplifier 727c. This command amplifier 731a and resistances R11 to R14 constitute an adder 731p shown in FIG. 30B.

Resistances 15 and 16, and a condenser C1, which serve as a well known phase advance circuit, constitute the compensation circuit 728p shown in FIG. 30B.

The output of the adder 731p is applied through the compensation circuit 728p to a drive circuit 729a, where a drive signal for the pitch coil 79p is generated. Thus the correction optical means is driven. The drive amplifier 729a, a resistance R17, and transistors TR1 and TR2 constitute the drive circuit 729p shown in FIG. 30B.

An adder amplifier 732a sums up the output of the current/voltage conversion amplifiers 727a and 727b (the total amount of light received by the position detection element 78p). The output of the adder amplifier 732a is applied to a drive amplifier 732, which drive the light projector element 76p according to the applied output. The adder amplifier 732a, the drive amplifier 732b, resistances R18 to R22, and a condenser C2 constitute the drive circuit for the light projector element 76 (not shown in FIGS. 30A and 30B).

The amount of light projected by the light projector element 76p is not stable and easily varies depending on temperature, for example. At the same time, the positional sensitivity of the differential amplifier 727c varies. However, by controlling the light projector element 76p by means of the above-mentioned drive circuit so as to obtain a constant total amount of received light, change in positional sensitivity can be reduced.

As described above, the correction optical means has the stable position at which the output of the position detection elements 78p and 78y becomes zero, and is driven toward the stable position according to the applied commands. Since the stable position is electrically adjusted at which the optical axis of the correcting lens 71 coincides with that of the photographing lens array in the lens barrel, the correction optical means is driven toward the optical axis of the photographing lens array.

The correction optical means is optically designed so that optical aberration of the whole photographing lenses may become as small as possible even when the correcting lens 71 is shifted in the direction vertical to the optical axis. When the amount of shift becomes great, optical aberration can not be negligible. The amount of aberration depends on focal length of the photographing lenses in various zoom modes and in focusing operation.

The relation between the amount of aberration and focal length will be described below with reference to FIGS. 32A and 32B.

In FIG. 32B, the correcting lens 71 in the photographing lens array 61 is driven as indicated by an arrow 62 for blur suppression, while the photographing lens array itself is moved along the direction Z of the optical axis according to chance of the focal length at zooming and focusing operation.

The amount of shift (distance from the zero position) of the correcting lens 71 driven in the direction shown by the arrow 62 varies according to the movement of hands, which varies, for example, as shown by a meandering curve 63 shown in FIG. 32A, as the time passes by. Suppose the release button of the camera is fully pushed (SW2 is ON) at a time 64. Then after a predetermined time lag 66, exposure is executed for a lapse 65. In FIG. 32A, during the lapse 65, the amount of shift (distance from the zero position) of the correcting lens becomes greater than an allowable driving range A and still within an allowable driving range A. The driving range B is the allowable aberration range at zoom-wide, while the driving range B is the allowable range at zoom-tele.

Therefore, when a picture is taken in the state as shown in FIG. 32A, no problem occurs at the time of zoom-tele mode (e.g. 300 mm), while aberration can not be negligible and deteriorates images at the time of zoom-wide mode (e.g. 75 mm).

Similar problems occur when the focal length is varied at focussing operation, wherein an object at the infinite-point causes no problem but an object close to the camera causes aberration.

FIGS. 33A and 33B are block diagrams schematically showing the construction of a camera employing the blur suppression system described above.

In FIGS. 33A and 33B, a vibration detection means 211 (designated by reference numerals 43p and 43y in FIG. 28) comprising deviation detection sensor such as an angular velocity detection means and a sensor output calculator for integrating output of the detection sensor to obtain deviation information, which is further amplified at a predetermined rate by the same calculator. A blur suppression change-over means 12 comprises a sample holder 212a and a differential circuit 212b. The sample holder (circuit) 212a is continuously executing sampling operations. Accordingly, the differential circuit 212b outputs a difference between the same values, that is, zero. A release means 217 is provided in the camera body. With half depression of the release button (when a switch SW1 is turned on), the release means 17 actuates an exposure preparatory means 242 for performing photometry and range measuring as well as for driving lenses to perform focusing. With full-depression of the release button (when a switch SW2 is turned on), the release means 217 actuates an exposure means 316 for lifting up and lowering a mirror as well as for opening and shutting the shutter.

When the release means 217 generates an ON-signal of switch SW1, the ON-signal is applied to the sample holder 212a of the blur suppression means 212 to bring the sample holder 212a into a holding mode, when the differential circuit 212b which adjusts the present value as time 0 starts continuous output of detected deviation (hereinafter referred to as the target value). The target value is applied through a blur suppression sensitivity altering means 246 (described later) to a buffer means 213 including a known filter circuit comprising of resistances and condensers, as well as to a buffer change-over means 214. The buffer change-over means 214 normally connects a switch terminal 214a with a terminal 14c. In other words, in the blur suppression mode, the buffer means 213 is disconnected with its terminal 214b separated from the switch terminal 214a.

A drive means 215 has the circuit construction shown in FIG. 30B, which receives the output of the position detection (output of the position detection elements 78p and 78y in FIG. 29) of the correction optical means 216 (designated by the reference numeral 71 in FIGS. 29 and 30A), and applies drive voltage to the coils 79p and 79y shown in FIG. 29. The target value is applied to the drive means 215 as a command, according to which the correction optical means 216 is exactly driven.

The blur suppression sensitivity altering means 246 performs amplification change (setting a first ratio) of the output of the buffer change-over means 214. The ratio of amplification is changed according to the output from a zoom information output means 311 and a focus information output means 310.

In order to execute sufficient blur suppression, the amount of shift (per unit time) of the correction optical means 216 is changed in correspondence with the change of the focal length of the lenses. In other words, the amount of correction of the correction optical means 216 against the amount of the movement of hands has to be changed according to the focal length. Such adjustment is necessary because the shift sensitivity (amount of correction carried out by the correction optical means 216 with respect to the image surface) of the correction optical means 216 varies according to the focal length. For example, suppose the shift (per unit time) of the correction optical means 216 required to sufficiently execute blur suppression against the movement of hand is equal to "1", then effective blur suppression has to be performed with ¼ of the shift (per unit time) in the zoom-wide mode. Otherwise, the amount of correction for blur suppression becomes excessive in the zoom-wide mode and even increases the vibration of the camera body.

A ratio altering means 247 comprises an amplifier 247a (which sets a second ratio) for further changing the target value given from the blur suppression sensitivity change-over means 246 (wherein the amplifying rate is reduced to about ⅔), a differential circuit 247b for calculating the difference between the output of said amplifier 247a and the target value from the blur suppression sensitivity change over means 246, a sample holder 247c for holding the output of the differential circuit 247b at the time when the switch SW2 is turned on, a differential circuit 247d for calculating the difference between the output of the sample holder 247c and the target value from the blur suppression sensitivity altering means 246, and a change over means for connecting a terminal 247g with a switch terminal 247e only when the switch SW2 is turned on (which normally connects the switch terminal 247e with a terminal 247f, and with the terminal 247g during the output of a ratio change-over inhibiting means 314 is applied). The ratio altering means 247 applies the target value modified according to the first ratio until the switch SW2 is turned on and the target value modified according to the first ratio while the switch SW2 is turned on, to a drive means 215. The differential circuits 247b and 247d and the sample holder 247c hold the output of the sample holder 247c during the switch SW2 is turned on and memorize the difference between the output of the amplifier 247a and the target value (output of the blur suppression sensitivity altering means 246). The amplifier 247d further calculates the difference between thus obtained difference and the target value and sets it as a newly obtained target value. Thus, continuity at the time of turning on/off the switch SW2 operated by the switch terminal 247e is realized.

The amplifying ratio of the amplifier 247a is further varied according to the output of the zoom information output means 311 and the focus information output means 310. For example, the first ratio is set to be ⅔ in the zoom-tele mode, while the ratio is set to be ⅓ in the zoom-wide mode.

In other words, until the switch SW2 is turned on (before photographing operation), the original target value (obtained according to the first ratio) is reduced to ⅔. Thus, the amount of shift (per unit time) of the correction optical means 216 as well as power consumption can be reduced. At the same time, the blur suppression sensitivity is reduced to allow subtle framing (wherein subtle movement for framing is not canceled as vibration). And only at the time of exposure (when the switch SW2 is turned on), sufficient blur suppression is performed to prevent deterioration of the image caused by deviation of the image on the film surface.

When the first ratio is reduced to the ⅓, that is, to the second ratio in the zoom-tele mode until the switch SW2 is turned on, the photographer can not recognize the effect of blur suppression. In the zoom-wide mode, however, the photographer does not see the vibration of the image caused by slight movement of hands. Accordingly, while the photographer looks into the finder (after the switch SW1 is turned on until the switch SW2 is turned on), only large deviation has to be canceled, when the first ratio may be reduced to ⅓ (a predetermined second ratio).

With the above-mentioned construction, electric power can be saved.

The ratio altering inhibiting means 314 is actuated by operation of the photographer, and inhibits the first amplifying ratio of blur-suppression from being switched to the second amplifying ratio. That is, even when the switch SW1 is turned on, sufficient blur suppression is executed with the first ratio, which is useful when the photographer wants to look at the object carefully.

The output of the ratio altering inhibiting means 314 is applied to a switch means 247e of the ratio altering means 247. Then, the switch means 247e is kept in contact with the terminal 247g. The output of the ratio altering inhibiting means 314 is applied also to the ratio altering inhibition indicator means 312, which indicates that ratio altering is inhibited. A timer 2 (313) continuously output for a predetermined lapse from the time the switch SW2 of the release means 217 is turned on. At the time of trailing of the output of the timer 2, the ratio altering inhibiting means 314 is reset. As a result, ratio change-over inhibition is stopped at the end of every photographing operation. Needless to say, the photographer, if preferable, can stop ratio change-over inhibition.

Now, operation to stop blur suppression will be described.

In FIGS. 33A and 33B, when the switch SW1 of the release means 217 is turned off, the sample holder 212a resumes sampling, when the output of the amplifier 212b is zero and blur suppression is stopped.

If the buffer means 213, the buffer change-over means 214 and the timer 3 (317) shown in FIG. 33B are omitted, which is the construction shown in FIGS. 34A and 34B, the operation is carried out as follows.

With such construction, the output of the blur suppression change-over means 212 suddenly changes from the target value of deviation while the switch SW1 is on to zero. Accordingly, the correction optical means 216 is swiftly driven to the position satisfying zero target value.

In FIGS. 35A and 35B, at the time the switch SW1 is turned off, the correction optical means is swiftly driven from its present position. Such swift drive causes sudden change of framing, which disturbs the photographer. In order to present such disturbance, the buffer means 213 shown in FIG. 33B is employed.

In FIGS. 33A and 33B, when the switch SW1 is turned off, the output of the blur suppression means 212 becomes zero. This zero output is applied to the buffer means 213, whole output gradually becomes zero from the time the switch SW1 is turned on (because of the filter circuit of the buffer means 213). After the switch SW1 is turned off, for a predetermined time lag measured by the timer 3 (317), the switch terminal 214a of the buffer change-over means 214 is connected with the terminal 214b to set the output of the buffer means 213 as the target value of the shift of the correction optical means 216. In short, after the switch SW1 is turned off, the correction optical means 216 is slowly driven from the position at the time the switch SW1 is turned off to the position of zero target value, as shown by the solid line in FIG. 35B.

With the above-mentioned construction, unpleasant disturbance given to the photographer when the switch SW1 is turned off can be prevented. At the same time, power consumption can be reduced.

In the operation shown in FIG. 35B, however, the correction optical means 216 is slowly driven to its stable position after switch SW1 is turned off without performing blur suppression for the lapse 261. Such drive of the correction optical means 216 without blur suppression is waste of electric power, and drift of framing after blur suppression is not pleasant.

SUMMARY OF THE INVENTION

A major aspect of the present invention is to provide an image blur prevention apparatus comprising a first device for initializing a blur suppression means to prevent blurred images and a second device for changing the function of said first means according to focal length, as well as to provide a device and an optical system preferably used in such an image blur prevention apparatus.

With the construction of the image blur prevention apparatus of the present invention initialization according to focal length can be performed.

BRIEF DESCRIPTION OF THE DRAWINGS

FIGS. 12A to 12E are diagrams explaining exposure control performed by the forced blur suppression off means shown in FIGS. 10A and 10B.

FIGS. 22A to 22E are diagrams explaining exposure control performed by the forced blur suppression off means 2 shown in FIGS. 20A and 20B.

FIG. 25 is comprised of FIGS. 25A and 25B which show block diagrams schematically illustrating the construction of the blur prevention camera of the eleventh embodiment according to the present invention.

FIG. 28 is a perspective view schematically showing the construction of a conventional blur prevention system.

DETAILED DESCRIPTION OF THE PREFERRED EMBODIMENTS

Figure 1B:
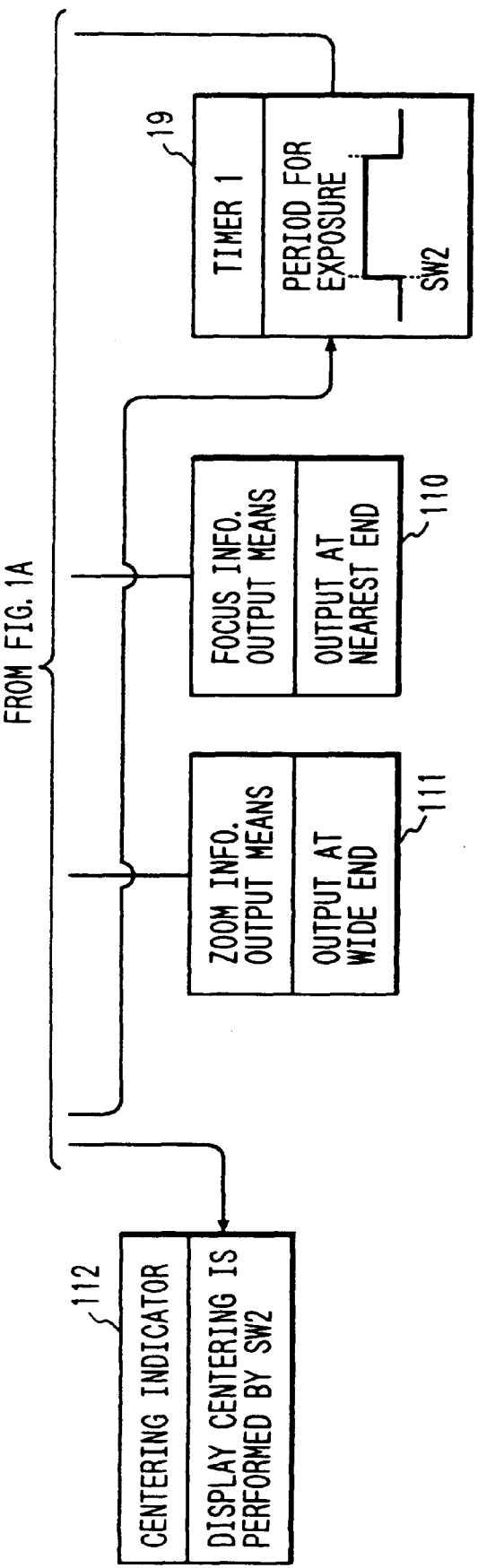
FIG. 1 is comprised of FIGS. 1A and 1B showing block diagrams illustrating the construction of the blur prevention apparatus of the first embodiment according to the present invention.

The present invention will be described below in detail with respect to the preferred embodiments shown and explained in the drawings.

FIGS. 1A and 1B are block diagrams showing the construction of a blur suppression control device of the first embodiment according to the present invention. This blur suppression control device controls operations of a blur prevention system as shown in FIG. 28. Note that the image blur correction mechanism, the drive circuit for the image blur correction mechanism, and so on are the same as those shown in FIG. 28.

In FIGS. 1A and 1B, a vibration detection means 11 (corresponding to the constituents 43p and 43y in FIG. 28) comprises angular velocity meters such as gyros, deviation detection sensors, and a sensor output calculator for integrating the output of the angular velocity meters, converting it to deviation information and amplifying the information at a predetermined ratio. An optical adjusting means 12 comprises sample holder 12a and a differential circuit 12b. Since the sample holder 12a is all the time performing sampling operations, the differential circuit 12b outputs a difference between the same values, that is, zero. A release means 17 (release button) is provided to the camera body. With half-depression of the release means (when the switch SW1 is turned on), the release means performs photometry, range measuring, and drives lenses for focusing. With full-depression (when the switch SW2 is turned on), the mirror is lifted up, then an ON-signal of switch SW2 is applied to an exposure means 116 to open and close a shutter. Finally, the mirror is lowered. The switches SW1 and SW2 may be turned on with a remote-controller, instead of manual operation as described above.

When the release means 17 applies an ON-signal of switch SW1 to the sample holder 12a to bring it into the hold mode, the differential circuit 12b resets the present value as zero and starts continuous output of the detected deviation (hereinafter referred as "target value"). The target value is applied to a drive control means 13 including a known filter circuit comprising a CR circuit (resistances and condensers), as well as to a buffer change over means 14.

Figure 29:
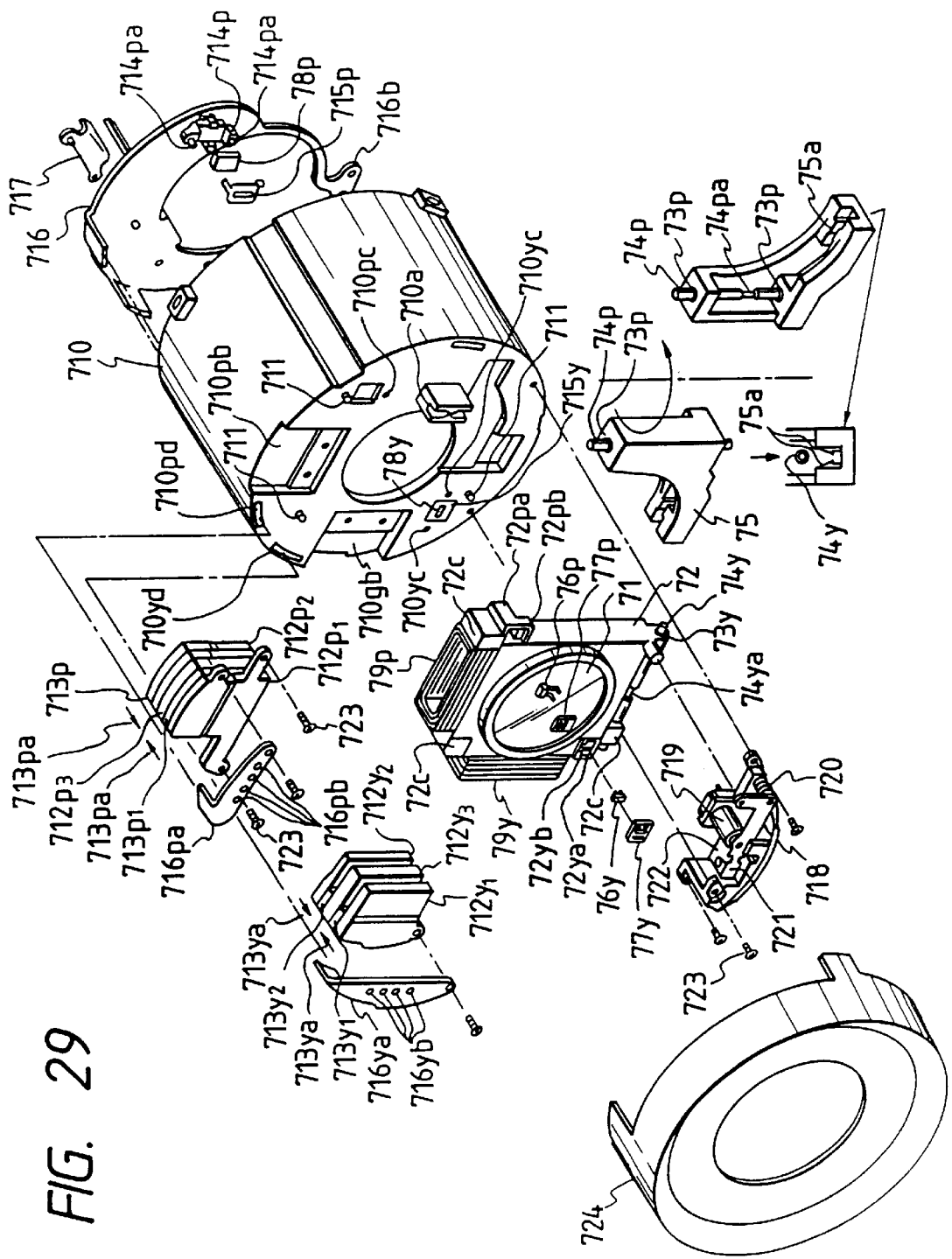
FIG. 29 is a dissembled perspective view showing the construction of a conventional correction optical means.

The drive change over means 14 normally keeps its switch terminal 14a in contact with a terminal 14c. In this case, at the time of exposure of a film, centering output from a centering change over means 18 (described later) is applied to a timer 1 (19), which then continuously applies signals to the drive change over means 14 until the exposure operation. As a result, the witch terminal 14a comes into contact with a terminal 14b. Accordingly, the target value is applied through the drive control means 13 and the drive change over means 14 to the drive means 15 for a predetermined time after centering output is applied to the timer 1 (19). The correction optical means 16 has a construction as shown in FIGS. 29, 30A and 30B.

Figure 30B:
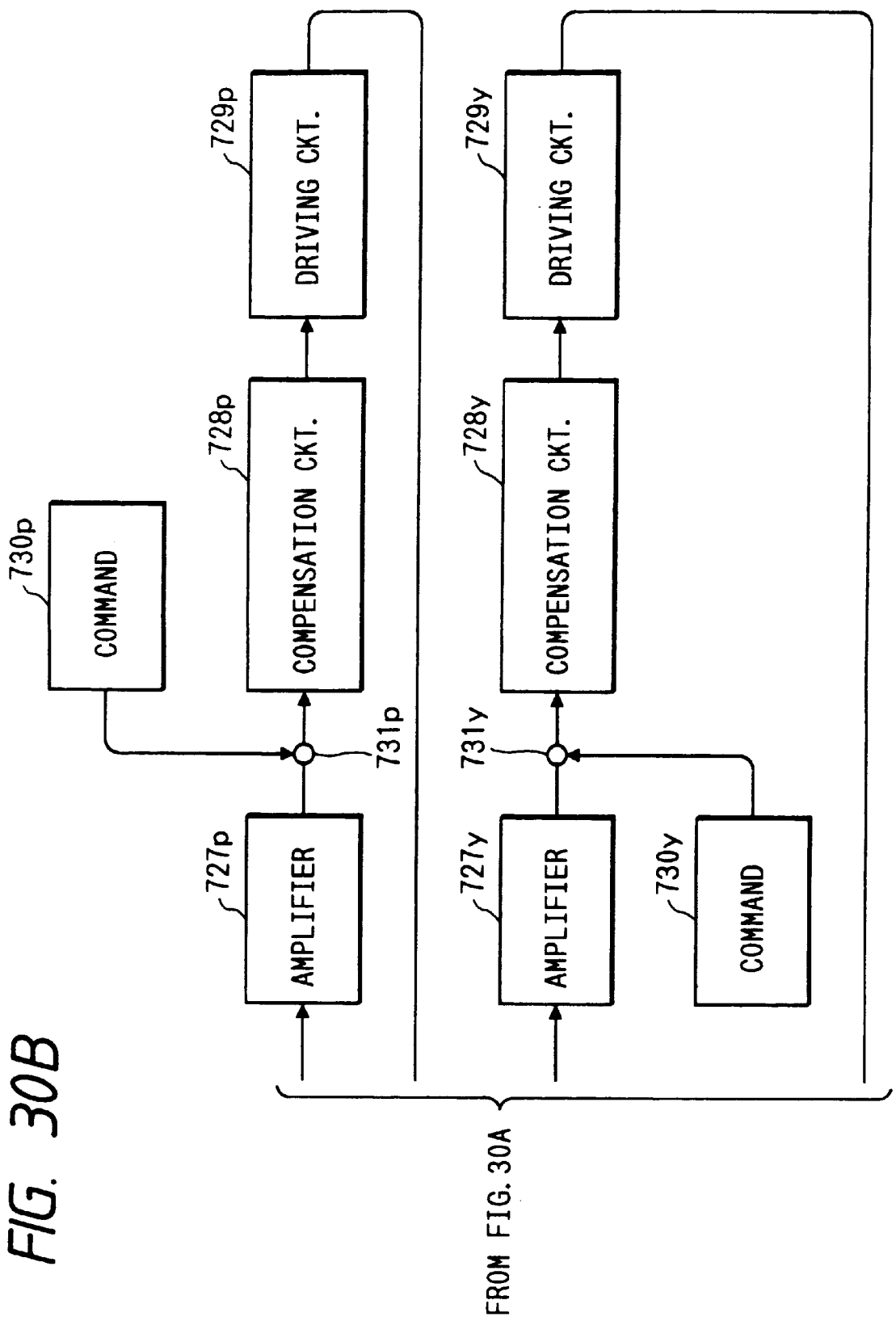
FIG. 30 is comprised of FIGS. 30A and 30B which show views explaining the mechanism of the conventional correction optical means and the drive means for the conventional optical means.
Figure 31:
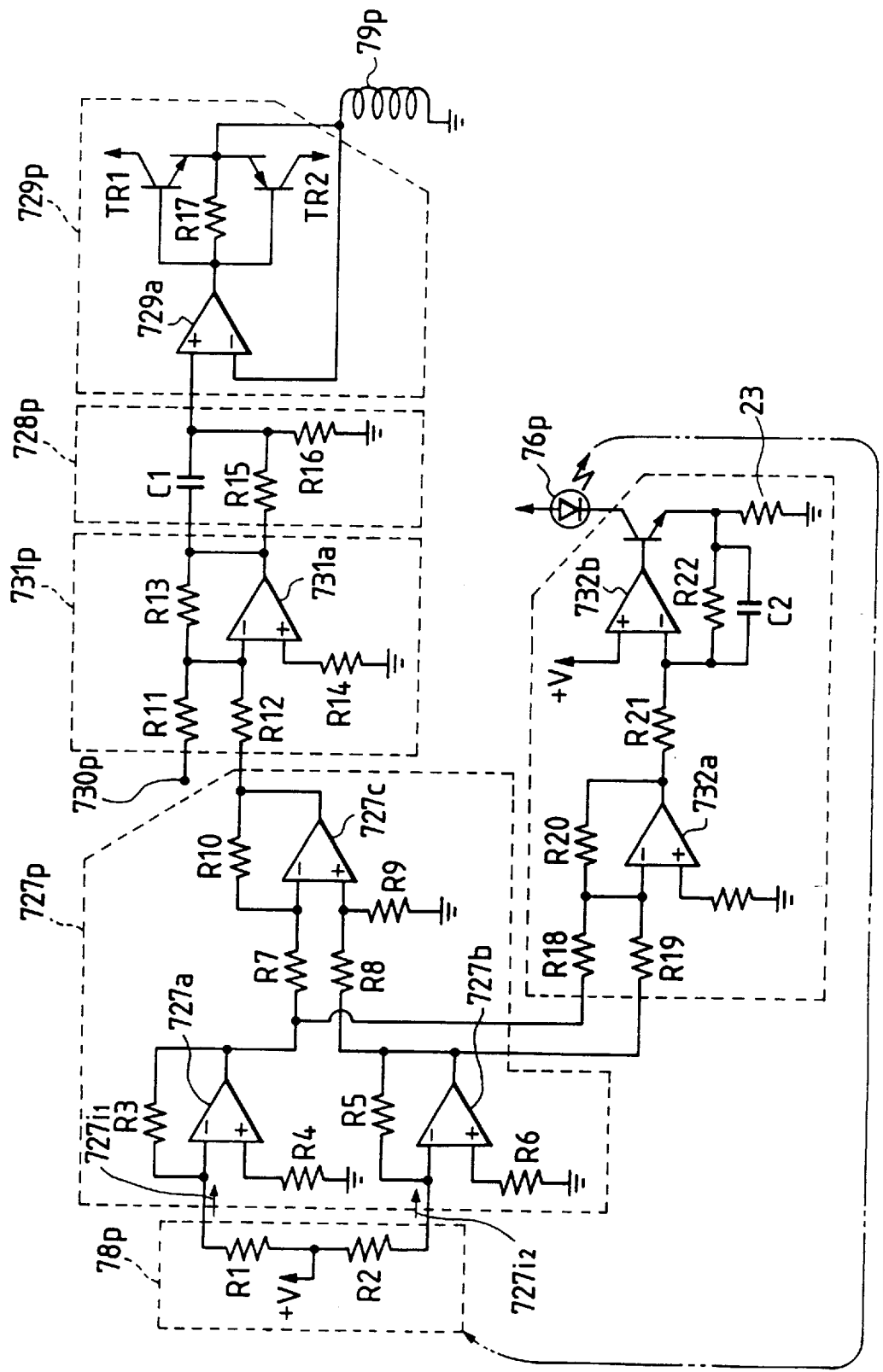
FIG. 31 is a circuit diagram showing an example of the electrical construction of the drive means and other means shown in FIGS. 30A and 30B.
Figure 32A:
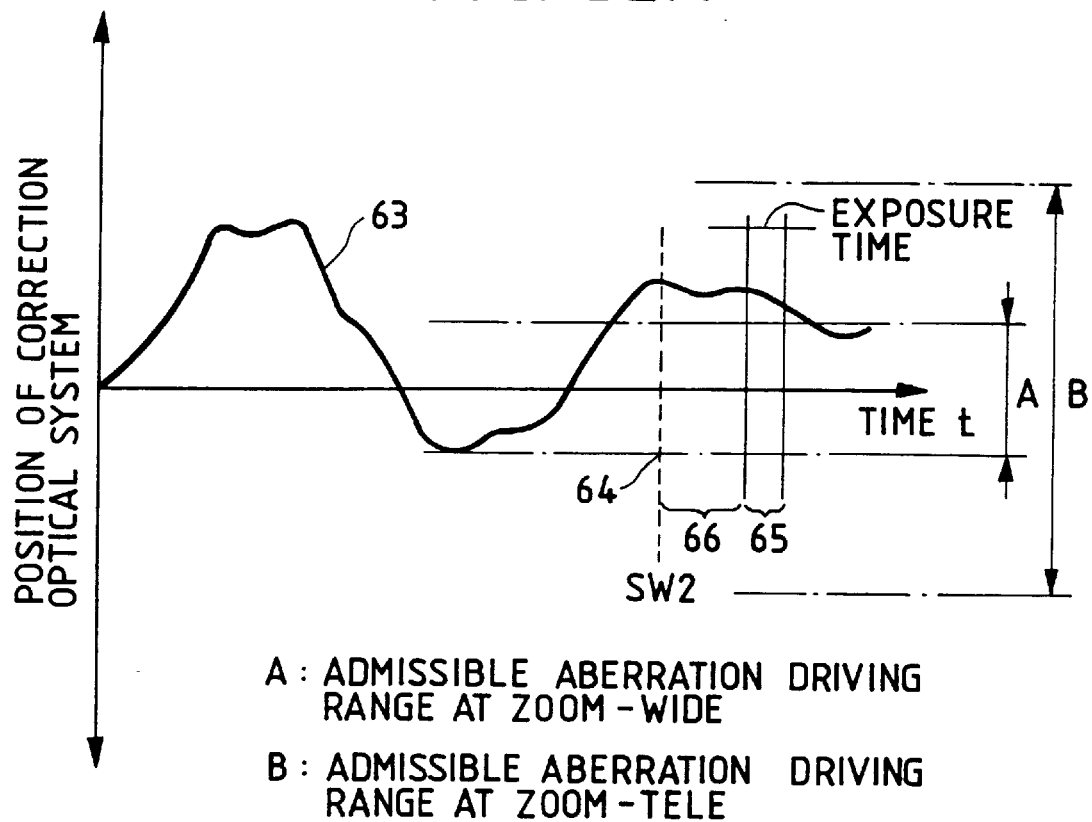
FIGS. 32A and 32B are views explaining the problems of the conventional technique.
Figure 32B:
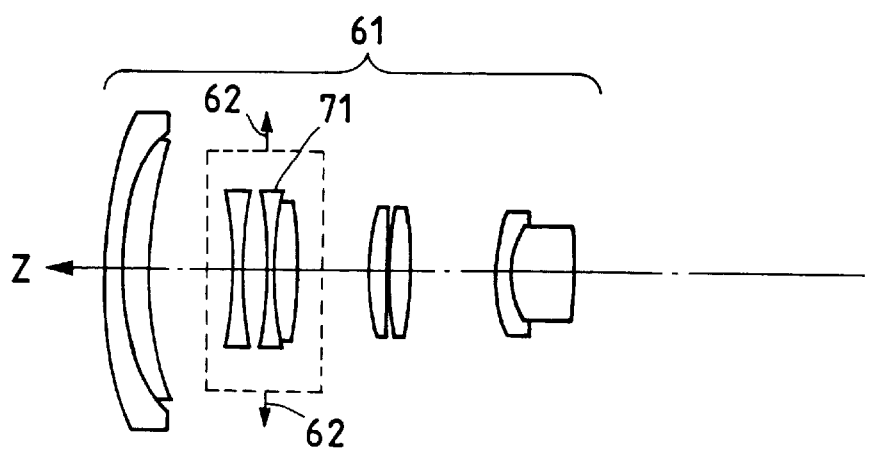

The circuit construction of the drive means 15 is as shown in FIG. 30B. The drive means 15 receives output of detected position (detected by the position detection elements 78*p* and 78*y* shown in FIG. 29) from the correction optical means 16, and drives the coils 79*p* and 79*y* shown in FIG. 29. The target value is applied to the drive means as a command, and the correction optical means 16 is exactly driven according to the target value.

The ON-signal of switch SW2 generated by the release means 17 is, as described, applied to the centering change over means 18, where the switch terminal 18*a* is normally connected with the terminal 18*c* to output nothing (zero output). When a signal outputted from a zoom information output means 111 in the zoom-wide mode or a signal outputted from a focus information output means 110 at the time nearest end focus is applied to the centering change over means 18, the switch terminal 18*a* is connected with the terminal 18*b*. These operations are performed after the ON-signal of switch SW2 is generated. However, if the present invention is applied to a video camera, these operations and those described below are performed after a picture recording start signal is generated.

In the zoom-wide mode or at the time of nearest end focus, the ON-signal of switch SW2 is applied through the centering change-over means 18 to the timer 1 (19) to actuate the timer 1 (19). Thus, in the zoom-wide mode and at the time of nearest end focus, after the ON-signal of switch SW2 is generated, the target value is applied through the drive control means 13 and the drive change over means 14 to the drive means 15 for a predetermined time.

The ON-signal of switch SW2 is also applied through the centering change-over means 18 to the sample holder 12*a*, which performs sampling for a while, and then, is brought in to the hold mode again. That is, once the switch SW2 is turned on, the target value which is reset as zero is continuously output.

A centering indicator means 112 informs the photographer that the centering operation is performed according to the output of the zoom information output means 111 or the focus information output means 110 in the zoom-wide mode or at the time of nearest end focus.

An optical adjustment inhibition means 114, when operated by the photographer, applies a command to the centering change over means 18 to forcibly keep the switch terminal 18*a* of the centering change-over means 18 in contact with the terminal 18*c*. The same command is also applied to an optical adjustment inhibition indicator means 115, which informs the photographer of optical adjustment inhibition.

The optical adjustment inhibition means 114 receives output from a timer 2 (113) which continuously performs output for a predetermined time when the ON-signal of switch SW2 is applied to it. At the time of trailing of the output of the timer 2 (113), the optical adjustment inhibition means 114 is reset (inhibition is released). The time during which the timer 2 (113) continuously performs output is determined to be longer than the time from generation of the ON-signal of switch SW2 to the exposure process so that the optical adjustment inhibition means 114 may not be reset during the exposure process.

The operation of the present invention having the above-mentioned construction in different situations will be described.

1) Not in Zoom-Wide Mode, nor Nearest End Focus

In this situation, the switch terminal 18*a* of the centering change-over means 18 is connected with the terminal 18*c*, and the target value is zero before the ON-signal of switch SW1 is generated. The target value (=0) is applied through the terminal 14*c* and the switch terminal 14*a* of the drive change over means 14 to the drive means 15. In short, the correction optical means 16 is stably positioned at the center of the optical axis.

When the ON-signal of switch SW1 is generated, the target value continuously varies from zero is applied through the terminal 14*c* and the switch terminal 14*a* of the drive change over means 14 to the drive means 15 to perform blur suppression, wherein the correction optical means 16 is driven exactly according to the target value.

During this time, the switch terminal 18*a* of the centering change-over means 18 is fixed even if the ON-signal of switch SW2 is generated. Accordingly, the sample holder 12*a* is not allowed to perform sampling nor go into the hold mode again, and the terminal 14*c* of the drive change over means 14 is also kept in connection with the switch terminal 14*a*. In this state of device, exposure of the film is carried out.

2) Optical Adjustment Inhibition Means 114 ON

In this case, the optical adjustment inhibition indicator means 115 informs the photographer that the optical adjustment inhibition is performed. And in the centering change over means 18, the terminal 18*c* is kept in contact with the switch terminal 18*a* (which is fixed even in the zoom-wide mode and at the time of nearest end focus). The optical adjustment inhibition means 114 is reset every time the ON-signal of switch SW2 is generated. The blur suppression is executed in the same way as described in the situation 1).

3) Zoom-Wide Mode and/or Nearest End Focus

In this situation, the centering indicator means 112 informs the photographer of the centering operation, and the terminal 18*b* of the centering change-over means 18 is connected with the switch terminal 18*a*.

Before the ON-signal of switch SW1 is generated, the same blur suppression as situation 1) is carried out. If the ON-signal of switch SW2 is generated, according to the output of the centering change over means 18, the sample holder 12*a* is allowed to perform sampling for a while, and then brought into the hold mode again. That is, the target value when the switch SW2 is turned on is reset as zero, and is newly output. The centering change over means 18 starts the timer 1 (19), which then keeps the terminal 14*b* of the drive change over means 14 in contact with the switch terminal 14*a* for a predetermined time lag from generation of the ON-signal of switch SW2 until the exposure process.

The functions of the drive change over means 14 will be described.

Figure 2A:
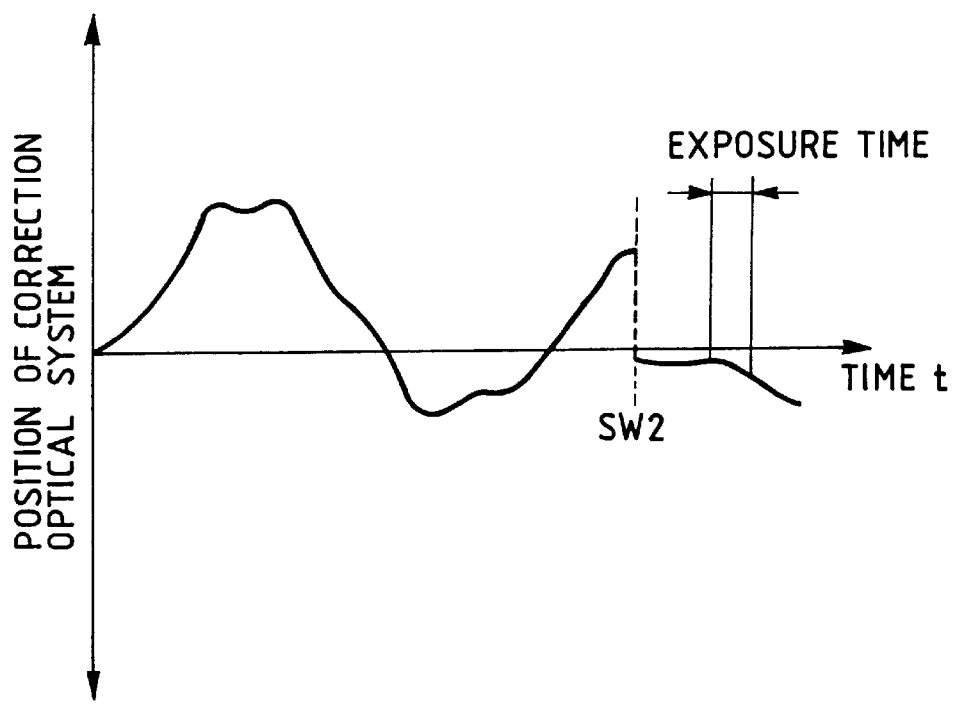
FIGS. 2A and 2B are diagrams explaining position control of the correction optical means of FIGS. 1A and 1B.

Suppose the construction without the drive change over means 14. In this case, the output of the optical adjustment means 12 is directly applied to the drive means 15. With this construction, the amount of shift (per unit time) of the correction optical means 16 after the switch SW2 is turned on is as shown in FIG. 2A. Since the target value is reset as zero when the switch SW2 is turned on, the speed at which the correction optical means 16 is driven abruptly changes at that time. Accordingly, the correction optical means 16 violently moves, which causes unnecessary vibration and hinders blur suppression performance.

Figure 2B:
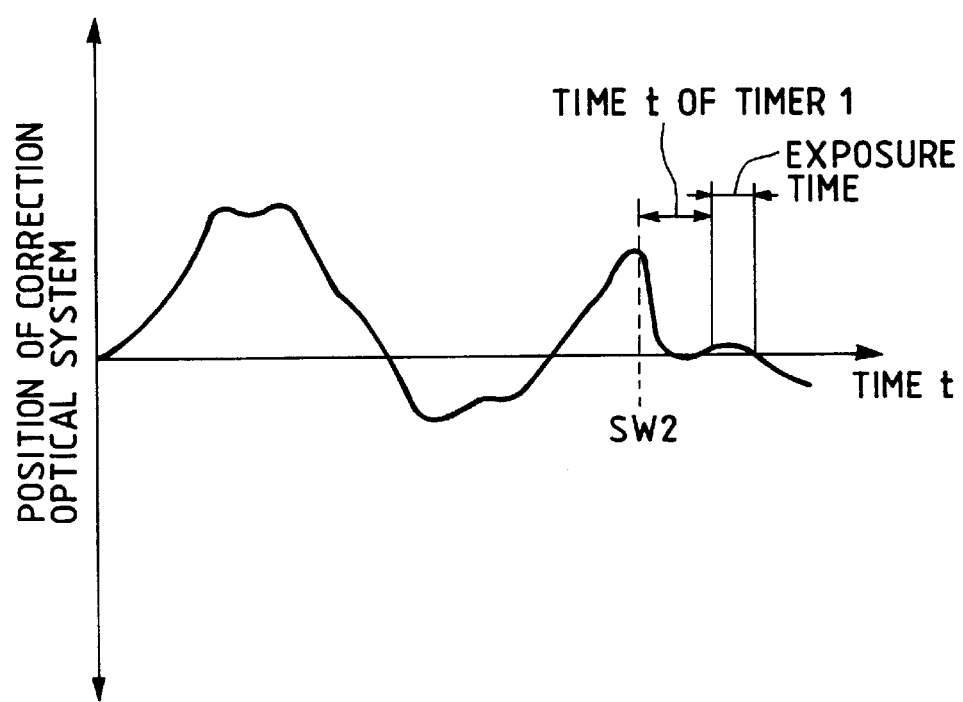

On the other hand, with the drive change-over means 13, the target value is applied through the filter circuit (low-pass filter) while the timer 1 (19) continues output. And the abrupt change of position of the correction optical means 16 shown in FIG. 2A is prevented, and the smooth movement as shown in FIG. 2B is realized. Thus, undesirable vibration caused by violent movement of the correction optical means can be prevented.

In the zoom-wide mode or at the time of nearest end focus, if the shift (distance from the zero position) of the correction optical means 16 is great, optical aberration deteriorates images. By returning the correction optical means 16 to the center position (centering operation) immediately before the exposure process, as shown in FIG. 2B, said deteriorated images caused by aberration can be prevented.

In this embodiment, the centering operation is performed only in the zoom-wide mode and/or at the time of nearest end focus, because the centering operation which may cause other problems should not be performed use aberration is not negligible.

When the focal length of the lenses is long (for example, 300 mm), vibration of hands can be easily recognized in the photographer's sight. And the photographer looking into the finder with the camera in his hand finds it difficult to determine framing. In this case, when blur suppression operation is executed, it becomes very easy to determine framing. This means that the blur prevention system has so high an optical sensitivity that the correction optical means 16 can be driven swiftly enough to cancel the vibration which is seen by the photographer. Therefore, if the centering operation is performed when the ON-signal of switch SW2 is generated, framing determined when the switch SW1 is turned on (at the time of focusing, and/or photometry) is considerably deviated. This is why the centering operation is not performed in the zoom-tele mode. The camera can be designed so that optical aberration may be reduced in the zoom-tele mode even when the shift of the correction optical means 16 is great. Thus, the camera does not need a centering operation in the zoom-tele mode. (Note that it is difficult to design a camera which can reduce aberration both in the zoom-wide mode and the zoom-tele mode).

In the zoom-wide mode (for example, with a focal length of 100 mm), the vibration of hands is hard to recognize by the photographer's sight (though deterioration of the image in a picture caused by vibration can be seen). Accordingly, framing is hardly disturbed by the centering operation, while an excellent picture can be obtained with good framing, no blur and little aberration.

(Second Embodiment)

In the first embodiment shown in FIGS. 1A and 1B, the centering operation is carried out in the zoom-wide mode when the ON-signal of switch SW2 is generated. For, in the zoom-wide mode, the centering operation causes little disturbance of framing. But, even a little disturbance of framing becomes critical in some cases.

Instead of performing the centering operation, if the correction optical means 16 is returned in the first allowable driving range (allowable deviation from the zero position) to considerably reduce aberration at the time of generation of the ON-signal of switch SW2, disturbance of framing can be further reduced. Otherwise, the first driving range may be broadened as zooming is set nearer to the tele side and/or focal length increases. Thus, disturbance can be reduced to be negligible.

Figure 3B:
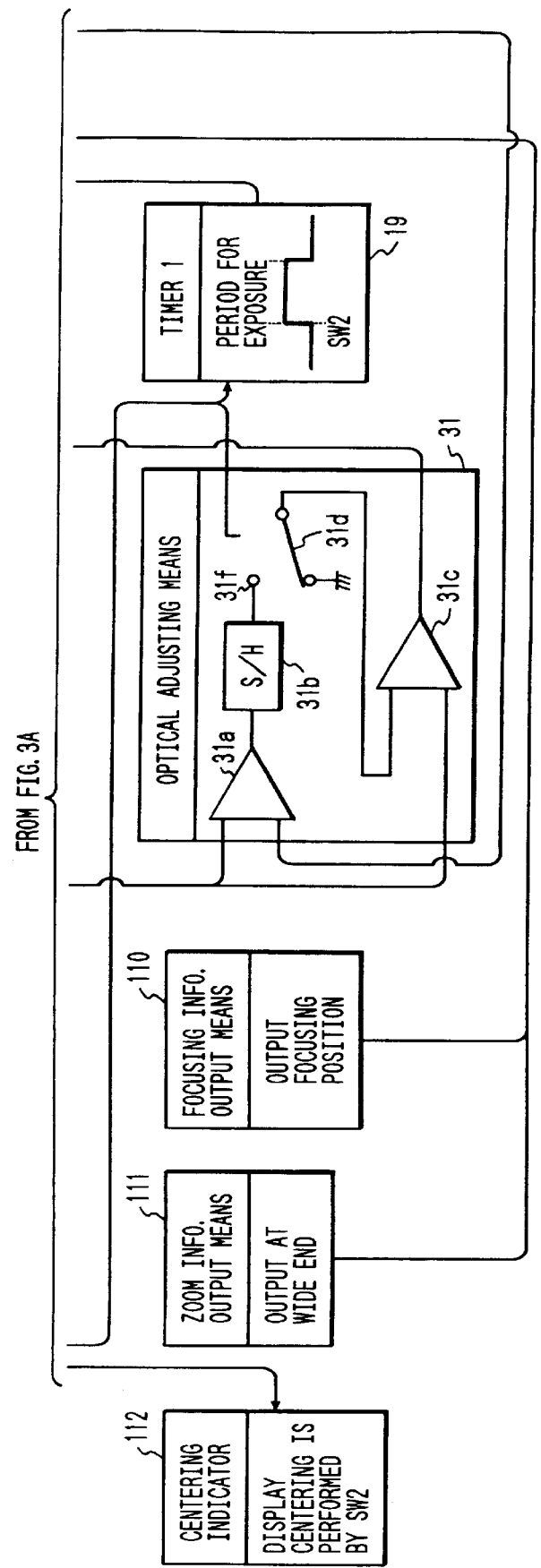
FIG. 3 is comprised of FIGS. 3A and 3B which show block diagrams illustrating the construction of the blur prevention apparatus of the second embodiment according to the present invention.

FIGS. 3A and 3B show the construction of the third embodiment which carries out the above-mentioned operations, wherein the same constituents as those in FIGS. 1A and 1B are designated by the same reference numerals and a detailed description thereof will be omitted.

The construction shown in FIGS. 3A and 3B has the following differences from the construction shown in FIGS. 1A and 1B. Reference value generation means 1 (23a), 2 (23b) and 3 (23c) for generating reference values (which set three first allowable driving ranges corresponding to zoom-wide 1 (50 mm), zoom-wide 2 (75 mm) and zoom-wide 3 (100 mm), respectively) are selected by a reference value change over means 27 which receives the output of the zoom information output means 111 and/or the focus information output means 110. The reference value change over means 27 applies the output of one of the reference value generation means 1, 2 and 3, at a time, to a comparator 22a of a comparison means 22. An absolute value output means 21 obtains the absolute value of the amount of shift (distance from the zero position) of the correction optical means 16 from the output of the detected position, and applies the obtained absolute value to the comparison means 22. The comparison means 22 compares the reference value selected from the three reference values according to the zoom modes and the focal length with the absolute value of the amount of shift from the zero position of the correction optical means 16. If the reference value is greater than the absolute value, the comparison means 22 applies a command to the centering change-over means 18 to connect the terminal 18b with the switch terminal 18a. The output of the comparison means 22 is also applied to the centering indicator means 112.

A polarity discrimination means 24 discriminates the driving polarity of the correction optical means 16 (that is, whether the correction optical means 16 is on the upper or lower side as well as on the right or left side of the optical axis). If the correction optical means 16 is on the lower side and/or on the left side of the optical axis, the polarity discrimination means 24 generates a signal and applies it to a polarity altering means 25. The polarity altering means 25, which receives the reference value from the reference value change over means 27, reverses the polarity of the reference value.

The optical adjustment means 31 applies the target value from the blur suppression change over means 12 to the differential circuit 31a of the optical adjustment means 31. The differential circuit 31a calculates a difference between the target value and the polarized referential value from the polarity altering means 25, before the ON-signal of switch SW2 is generated. The sample holder 31b receives the output of the differential circuit 31a and holds it if the ON-signal of switch SW2 is sent from the centering change. Over means 18, but sends it to a terminal 31f and continues sampling until the ON-signal of switch SW2 is generated. The switch terminal 31d, which is normally connected with a terminal 31e (zero output), is connected with a terminal 31f when the ON-signal of switch SW2 from the centering change over means 18 is received.

In short, until the ON-signal of switch SW2 is generated, the differential circuit 31c calculates the difference between the target value from the blur suppression change-over means 12 and said zero output. And after the ON-signal of switch SW2 is generated, the differential circuit 31a calculates the difference between the output of the differential circuit 31a which is held at the time of generation of the ON-signal of switch SW2 and the target value from the blur suppression change-over means 12, and applies thus calculated difference, as a newly obtained target value, to the drive control means 13 and the drive change over means 14.

The polarity altering means 25 polarizes the reference value, as described. Otherwise, if, for example, the reference value is +1 V and the target value is −3 V, the output of the differential circuit 31a would be −4 V, whose great absolute value would make the correction optical means 16 shifted out of the first allowable driving range.

In the above case, the output of position of the correction optical means 16 immediately before the switch SW2 is turned on is also −3 V, whose absolute value 3 V is outputted from the absolute value output means 21. The comparison means 22 compares the absolute value (3 V) with the reference value +1 V, and the switch terminal 18a of the centering change over means 18 is connected with the terminal 18b. At this time, since the reference value is polarized in the present invention, the polarity discrimination means 24 which receives said output (−3 V) outputs the receives value to the polarity change over means 25, then the polarity altering means 25 converts the reference value +1 V into −1 V. Thus, the differential circuit 31a of the optical adjustment means 31 obtains a difference −2 V immediately after the switch SW2 is turned on. The output of the differential circuit 31a is held by the sample holder 31b (which has been brought into the hold mode after the switch SW2 is turned on). On the other hand, the target value −3 V from the blur suppression change over means 16 is applied through the switch terminal 31d (connected with the terminal 31f after the switch SW2 is turned on) to the differential circuit 31c, where the difference between the value held by the sample holder 31b and the applied target value, which is −1 V, is calculated. Thus, the correction optical means 16 can be driven toward the driving range (−1 V to +1 V) determined by the reference value.

Figure 4A:
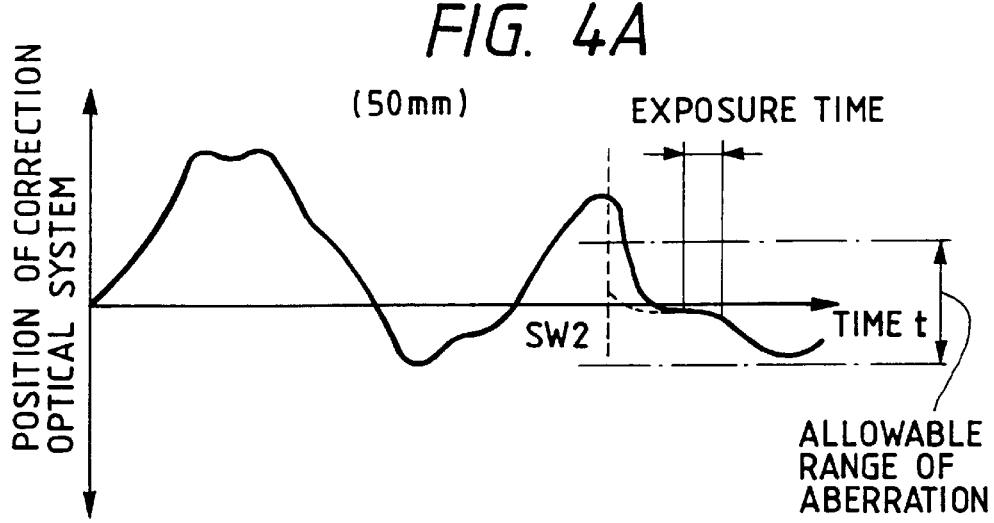
FIGS. 4A to 4C are diagrams explaining position control of the correction optical means of FIGS. 3A and 3B.
Figure 4B:
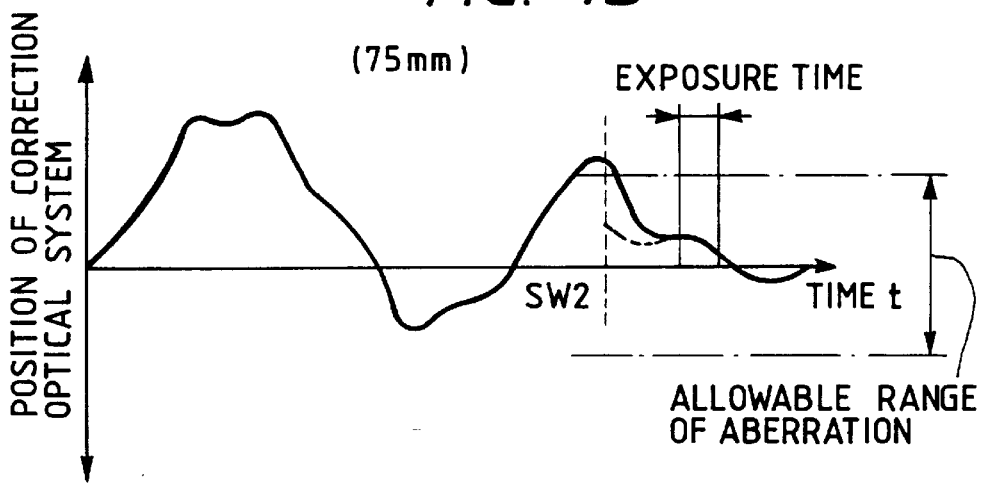
Figure 4C:
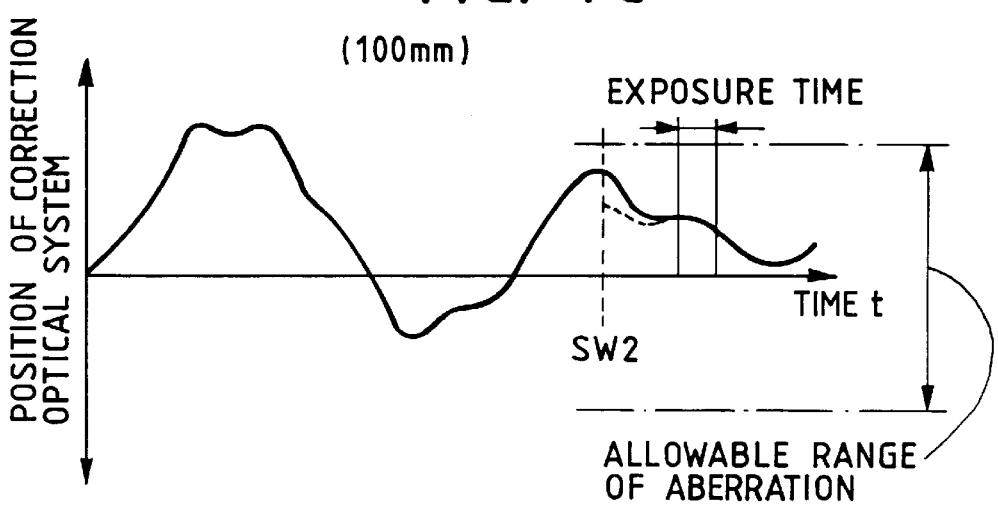

FIGS. 4A to 4C are diagrams showing the movement (the amount of shift (from the zero position)) of the correction optical means 16. FIG. 4A shows the movement in the zoom wide 1 mode (50 mm), in which the reference value change over means 27 selects the first reference value (e.g. 1 V) of the reference value generation means 1 (23a). In this case the correction optical means 16 is returned close to the center position when the ON-signal of switch SW2 is generated.

In the zoom-wide 2 mode (75 mm), the second reference value (e.g., 2 V) is selected, wherein the correction optical means 16 is centered, but by some degree, as shown in FIG. 4B, after the ON-signal of switch SW2 is generated.

In the zoom-wide 3 mode (100 mm), the third reference value (e.g. 3 V) is selected, wherein the correction optical means is centered slightly, as shown in FIG. 4C, after the ON-signal of switch SW2 is generated.

With this construction, the amount of centering of the correction optical means 16 is smaller than that of the first embodiment, which makes the disturbance of framing at the time of generation of the ON-signal of switch SW2 almost negligible.

(Third Embodiment)

In the first and second embodiments, the correction optical means 16 is returned toward the center position when the ON-signal of switch SW2 is generated. But, techniques to present a great amount of shift (from the zero position) of the correction optical means 16 during the exposure process (in order to prevent aberration great enough to deteriorate images in a picture) are not limited to those mentioned above. For example, a similar effect can be obtained by reducing the amount of shift of the correction optical means 16 until the ON-signal of switch SW2 is generated (where, if the amount of shift of the correction optical means 16 is restricted also after the ON-signal of switch SW2 is generated, correction can not be completely carried out and deterioration is caused by vibration.)

Figure 5A:
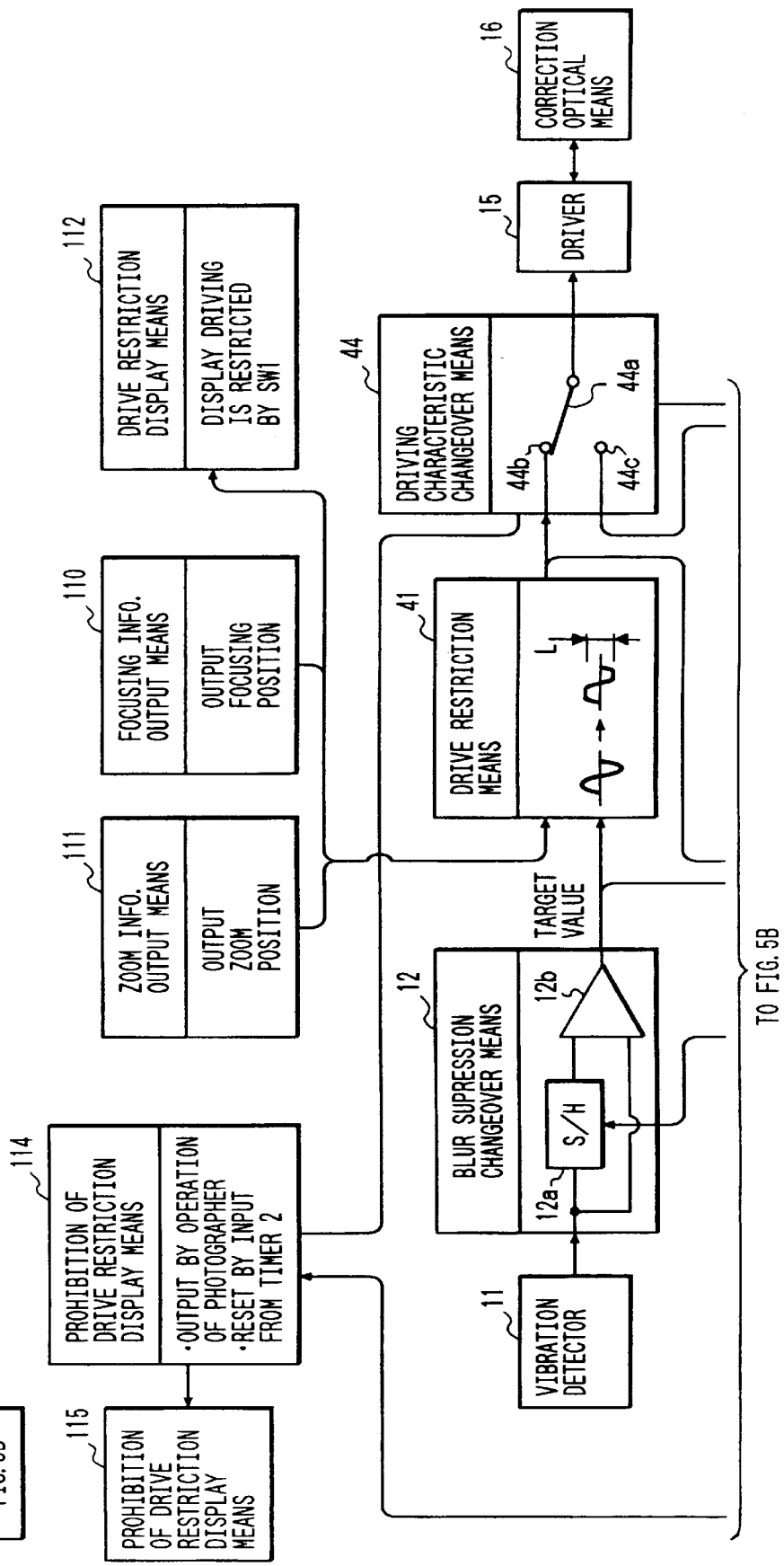
FIG. 5 comprised of FIGS. 5A and 5B which show block diagrams illustratinging the construction of the blur prevention apparatus of the third embodiment according to the present invention.

FIGS. 5A and 5B shows the construction of the fifth embodiment according to the present invention which employs the above-mentioned new method, wherein the target value from the blur suppression change-over means 12 is applied to a drive restriction means 41. The drive restriction means 41 has a variable window to restrict the greater part of the target value which determines the allowable driving range. The driving range L (allowable deviation range from the zero position) means 41 can be varied according to the output of the zoom information output means 111 and/or the focus information output means 111 and/or the focus information output means 110. For example, in the zoom-wide mode, the target value is restricted by a larger amount to narrow the driving range L.

A change-over continuity hold means 43 has a construction similar to that of the optical adjustment means 31 except that the differential circuit 43a calculates the difference between the target value from the blur suppression change-over means 12 and the second target value from the drive restriction means 41. A drive characteristic change-over means 44 receives the second target value from the drive restriction means 41 through a terminal 44c and the third target value from the change-over continuity hold means 43 through a terminal 44c. A switch terminal 44a is normally connected with the terminal 44b, but is connected with the terminal 44c if the ON-signal of switch SW2 is generated. (However, when the output of a drive restriction inhibition means 114 is received, the switch terminal 44a is kept in contact with the terminal 44c.) The output of the drive characteristic change-over means 44 is applied to the drive means 15.

Until the ON-signal of switch SW2 is generated, the large amount of shift (from the zero position) of the correction optical means 16 is restricted according to the second target value from the drive restriction means 41. But, when the ON-signal of switch SW2 is generated, the correction optical means 16 is driven according to the original target value without restriction. As a result, if the target value outputted from the blur suppression change-over means 12 at the time of generation of the ON-signal of switch SW2 is great enough to allow a large amount of shift (from the zero position) of the correction optical means 16, the great target value is applied to the drive means 15. In this case, the large amount of shift (from the zero position) of the correction optical means 16 during the exposure process causes aberration and deterioration of images.

The change-over, continuity hold means 43 is provided in order to prevent the above-mentioned problem. Suppose the target value from the blur suppression change-over means 12 at the time of generation of the ON-signal of switch SW2 is V, and that the second target value from the drive restriction means 41 is $V_2$, when the output of the differential circuit 43a is $(V_1-V_2)$. The value $(V_1-V_2)$ is held by the sample holder 43b after the ON-signal of switch SW2 is generated. Then, the differential circuit 43c calculates the difference between the target (value) $V_1$ from the blur suppression change-over means 12 and the value $(V_1-V_2)$ held by the sample holder 43b. The thus obtained difference $(V_1-(V_1-V_2)=V_2)$ is set as the origin, according to which the third target value is outputted. In short, the target value does not change at the time of generation of the ON-signal of switch SW2.

Figure 6:
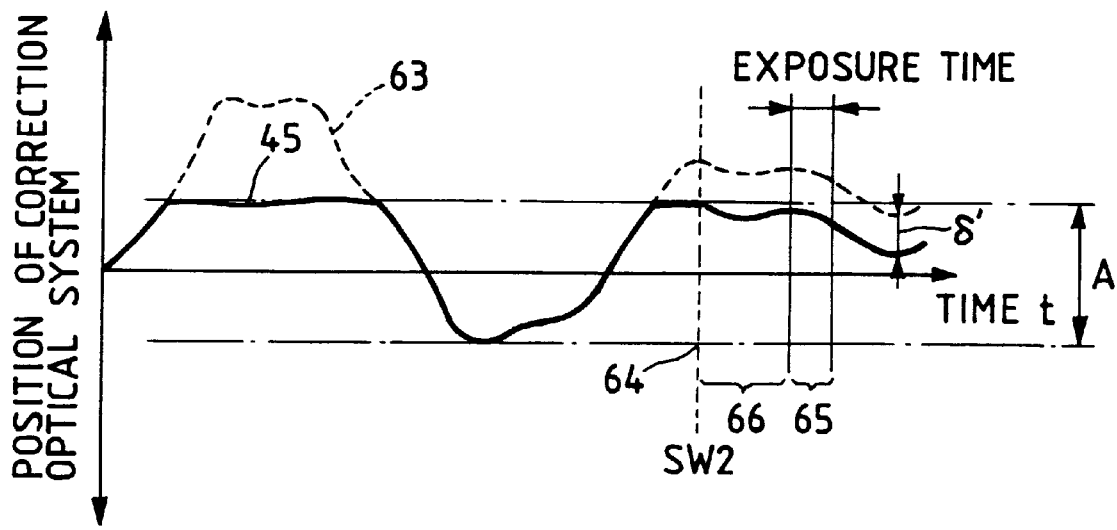
FIG. 6 is a diagram explaining position control of the correction optical means of FIGS. 5A and 5B.

FIG. 6 shows an example of the shift (distance from the zero position) of the correction optical means 16 driven by the present embodiment having the construction shown in FIGS. 5A and 5B. Until the ON-signal of switch SW2 is generated, the amount of shift 63 (broken line) of the correction optical means 16 corresponding to the target value from the blur suppression change-over means 12 is restricted as indicated by the solid line 45. After the ON-signal of switch SW2 is generated, such restriction is released. But, in order to hold continuity of the shift amount (from the zero position) before and after generation of the ON-signal of switch SW2, the position to which the correction optical means 16 is to be driven (indicated by the broken line) is shifted by 6, as shown in FIG. 6, to be within the allowable driving range A. Thus, aberration is sufficiently reduced during the exposure process.

With the above-mentioned construction, since the centering operation of the correction optical means 16 is not performed when the ON-signal of switch SW2 is generated, framing is not disturbed at the time of generation of the ON-signal of switch SW2.

According to another method of which an application has been made by the present inventor, the degree of blur suppression is reduced until the ON-signal of switch SW2 is generated in order to decrease the amount of shift (from the zero position) of the correction optical means 16.

Figure 7B:
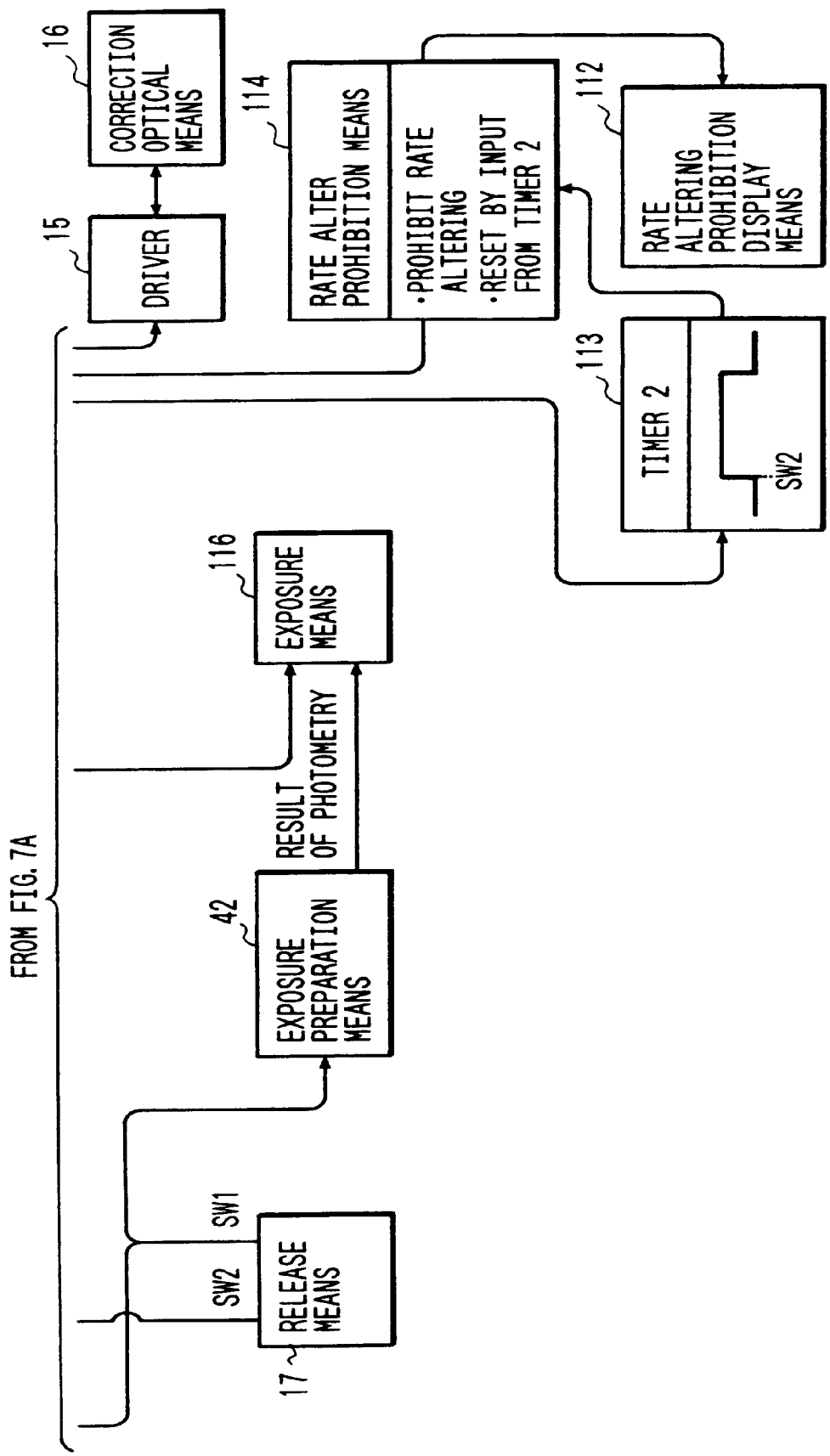
FIG. 7 is comprised of FIGS. 7A and 7B which show block diagrams illustrating another example of the construction of the blur prevention apparatus of the third embodiment according to the present invention.

If the degree of blur suppression is reduced, that is, if the ratio of the amount of shift (per unit time) of the correction optical means 16 to the target value is reduced until the ON-signal of switch SW2 is generated, electric power can be saved. At the same time, more minute framing is possible than when blur suppression is fully executed. In addition prevention of deteriorated images caused by aberration, which is one of the main object of the present invention, can be also achieved. FIGS. 7A and 7B show the construction of a device for performing such reduction of the amount of shift of the correction optical means 16. A blur suppression sensitivity altering means 46 receives the output from the zoom information output means 111 and/or the focus information output means 110, and amplifies the target value from the blur suppression change-over means 12 at a certain ratio (the first ratio) proper for the focal length.

The blur suppression sensitivity altering means 46 cancels change in the amount of eccentricity (blur suppression sensitivity) of the optical axis corresponding to the amount of shift (from the zero position) of the correction optical means 16. Such a change in the amount of eccentricity of the optical axis is optically occurs when the focal length varied. Similar blur suppression sensitivity altering means are provided also in each of the above-mentioned embodiments. But, for brevity and since these means do not concern the main objects of the embodiments described before, the blur suppression sensitivity altering means in these embodiments are not shown in the drawings.

A ratio altering means 47 comprises:
an amplifier for further reducing the target value from the blur suppression sensitivity altering means 46 at a certain ratio (second ratio, which is about ⅔); a differential circuit 47b for calculating the difference between the output of the amplifier 47a and the target value from the blur suppression sensitivity altering means 46; a sample holder 47c for holding the output of the differential circuit 47b when the ON-signal of switch SW2 is received; a differential circuit 47d for calculating the difference between the output of the sample holder 47c and the target value from the blur suppression sensitivity altering means 46; and a switch means for connecting a terminal 47g with a switch terminal 47e only when the ON-signal of switch SW2 is received. (In this switch means, the switch terminal 47e is normally connected with a terminal 47f, but kept in contact with the terminal 47g when the output of a ratio altering inhibition means 114 is received). The drive means 15 receives the target value modified at the second ratio until the ON-signal of switch SW2 is generated. On the other hand, after the ON-signal of switch SW2 is generated, the drive circuit 15 receives the target value modified at the first ratio. Like the change-over continuity hold means 44 shown in FIG. 5A, the differential circuits 47b and 47d and the sample holder 47c hold continuity before and after the switching operation by the switch terminal 47e at the time of generation of the ON-signal of switch SW2.

The ratio of amplification of the amplifier 47a is variable according to the output of the zoom information output means 111 and/or the focus information output means 110. For example, the first ratio is reduced to be ⅔ in the zoom-tele mode, while it is reduced to be ⅓ in the zoom-wide mode.

As described before, if the original target value (the first ratio) is reduced to ⅔ until the ON-signal of switch SW2 is generated (that is, until the photographing operation), less electric power is required to drive the correction optical means 16. At the same time, minute framing is possible. When the second ratio is reduced to be ⅓ of the first ratio in the zoom-tele mode, blur suppression effects can not be enjoyed by the photographer. In the zoom-wide mode, however, small vibration of the hands can not be recognized by looking into the finder. Accordingly, only remarkable vibration should be suppressed when the photographer looks into the finder (from generation of the ON-signal of switch SW1 to generation of the ON-signal of switch SW2). During this time, the second ratio can be reduced to be ⅓ of the first ratio.

With the above-mentioned construction, not only electric power can be further saved, but also prevention of deteriorated images caused by aberration, which is one of the main object of the present invention, is further ensured.

Figure 8:
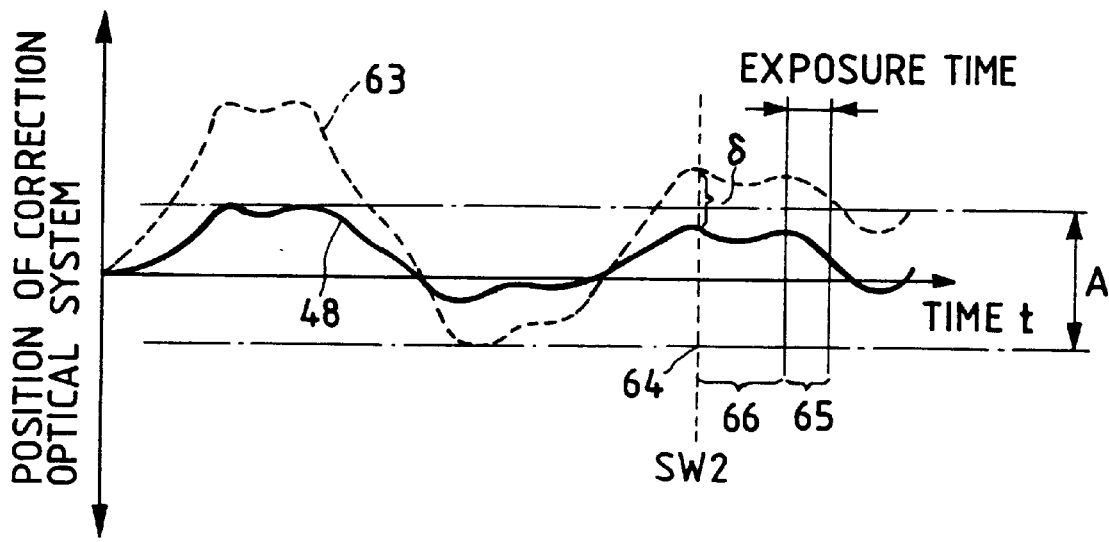
FIG. 8 is a diagram explaining position control of the correction optical means of FIGS. 7A and 7B.

FIG. 8 illustrates the effect of the above-mentioned construction to prevent deteriorated images caused by aberration. Until the ON-signal of switch SW2 is generated, the amount of shift 48 (distance from the zero position) of the correction optical means 16 is reduced to be ⅓ of the amount of shift 63 (distance from the zero position indicated by the broken line) for full blur suppression in the zoom-wide mode. After the ON-signal of switch SW2 is generated, the correction optical means 16 is driven with the original first target value, the waveform indicating the shift amount of the correction optical means 16 according to the present embodiment becomes the same as that of the correction optical means 16 driven at the target value for full blur suppression, while the position indicated by the waveform is shifted by δ from that indicated by the broken line 63 toward the center position. And the continuity before and after switching from the second ratio to the first ratio is held by the differential circuits 47b and 47d, and the sample holder 47c. As a result, the amount of shift (distance from the zero position) of the correction optical means 16 is restricted within the allowable driving range A during the exposure process. Thus, deteriorated images caused by aberration can be prevented.

As described above, with the construction shown in FIGS. 5A, 5B, 7A and 7B, framing is not disturbed at all at the time of generation of the ON-signal of switch SW2. Accordingly, the photographer can determine minute framing and take a desired picture.

(Fourth Embodiment)

In the embodiments described above, deterioration caused by aberration is prevented by the centering operation of the correction optical means performed immediately before taking a picture, or by restriction of the amount of shift (distance from the zero position) of the correction optical means executed until the time immediately before taking a picture. A similar effect can be obtained with a simpler circuit construction, wherein photo-taking is inhibited by locking the release means if aberration may occur.

Figure 9B:
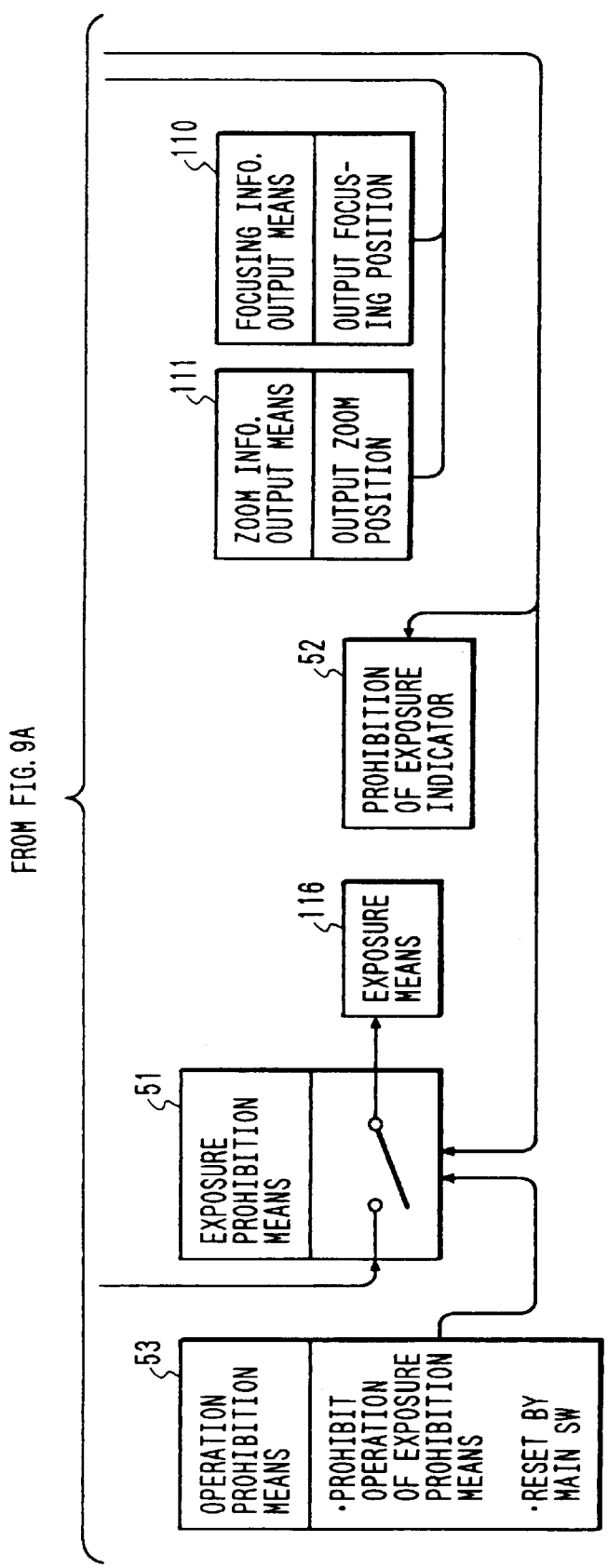
FIG. 9 is comprised of FIGS. 9A and 9B which show block diagrams illustrating the construction of the blur prevention apparatus of the fourth embodiment according to the present invention.

FIGS. 9A and 9B show the construction containing such a release lock mechanism, from which the following constituents shown in FIGS. 3A and 3B are omitted: the optical adjustment means 31; the drive control means 13; the drive change over means 14; the polarity discrimination means 24; the polarity altering means 25; the centering change-over means 18; the centering indicator means 11; the optical adjustment inhibition means 114; the optical adjustment inhibition indicator means 115; and timers 1 (19) and 2 (113). The other constituents are the same as those shown in FIGS. 3A and 3B. Instead, the present embodiment further comprises: an exposure inhibition means 51 for performing release lock upon receiving the output of the comparison means 22 (serving as a switch means for inhibiting the ON-signal of switch SW2 from being applied to the exposure means 116); an exposure inhibition indicator means 52 which is actuated also upon receiving the output of the comparison means 22; and an operation inhibition means 53 for inhibiting the operation of the exposure inhibition means 51 (that is, for holding the exposure inhibiting means 51 in the ON state).

When the amount of shift (from the zero position) of the correction optical means 16 becomes greater than the reference value determined according to the focal length of the lenses, as described with respect to the construction shown in FIGS. 3A and 3B, the comparison means 22 sends a signal to the exposure inhibition means 51 to bring it into the OFF state, because in the above situation aberration is expected to cause deterioration. At the same time, the exposure inhibition indicator means 52 informs the photographer that the exposure inhibition operation is executed. In this case, the exposure can not be performed even with full-depression of the release button. If desirable, the photographer can stop the exposure inhibition operation by handling the operation inhibition means 53, and take a picture.

With the above simple construction, deteriorated images caused by aberration can be prevented.

Though, for brevity, FIGS. 1A through 9B show the constructions comprising analog circuits, each of the above-mentioned embodiments may be constructed according to known digital processing technique, in which microcomputers are contained in the camera body and/or in the lens barrel.

According to the above-mentioned embodiments, when aberration is expected to cause deteriorated images (for example, when the amount of shift of the correction optical means is great in the zoom-wide mode and/or at the time of nearest end focus), the correction optical means 16 is returned toward the center position to be within a predetermined range immediately before the exposure in order to reduce deterioration caused by aberration to a negligible degree. Otherwise, the amount of shift (distance from the zero position) of the correction optical means 16 is restricted until the time immediately before the exposure to reduce aberration. In both cases, excellent pictures free from deterioration caused by aberration can be obtained.

Also, in one embodiment described above, the exposure is inhibited when aberration is expected to cause deterioration. Thus, waste of film, which would be used only to obtain deteriorated images caused by aberration, can be prevented with simple construction.

As described above, the above-mentioned embodiments according to the present invention have a driving range altering means for changing, according to the focal length of the lenses, the allowable driving range within which the correction optical means is returned before exposure; or an adjustment means for returning the correction optical means to be within a predetermined driving range before exposure when the focal length of the lenses is in a predetermined range; or a drive control means for controlling the driving range of the correction optical means before exposure as well as driving range control altering means for altering the driving range controlled by the drive control means according to the focal length of the lenses; or an exposure inhibition means for inhibiting exposure process when the amount of shift of the correction optical means is greater than the reference value and at the same time the focal length of the lenses is within a predetermined range.

As a result, when, for example, the amount of shift (distance from the zero position) of the correction optical means is great, the correction optical means is returned toward the center position to be within a range determined according to the focal length of the lenses before (or immediately before) exposure, in order to prevent deteriorated images caused by aberration. Or, in the similar situation, the amount of shift (from the zero position) of the correction optical means is restricted before exposure. Further, in an embodiment, exposure is inhibited in said situation.

Therefore, the present invention is able to provide a blur prevention control device for a camera with which excellent pictures free from deterioration caused by optical aberration of the lenses can be taken.

(Fifth Embodiment)

Figure 10A:
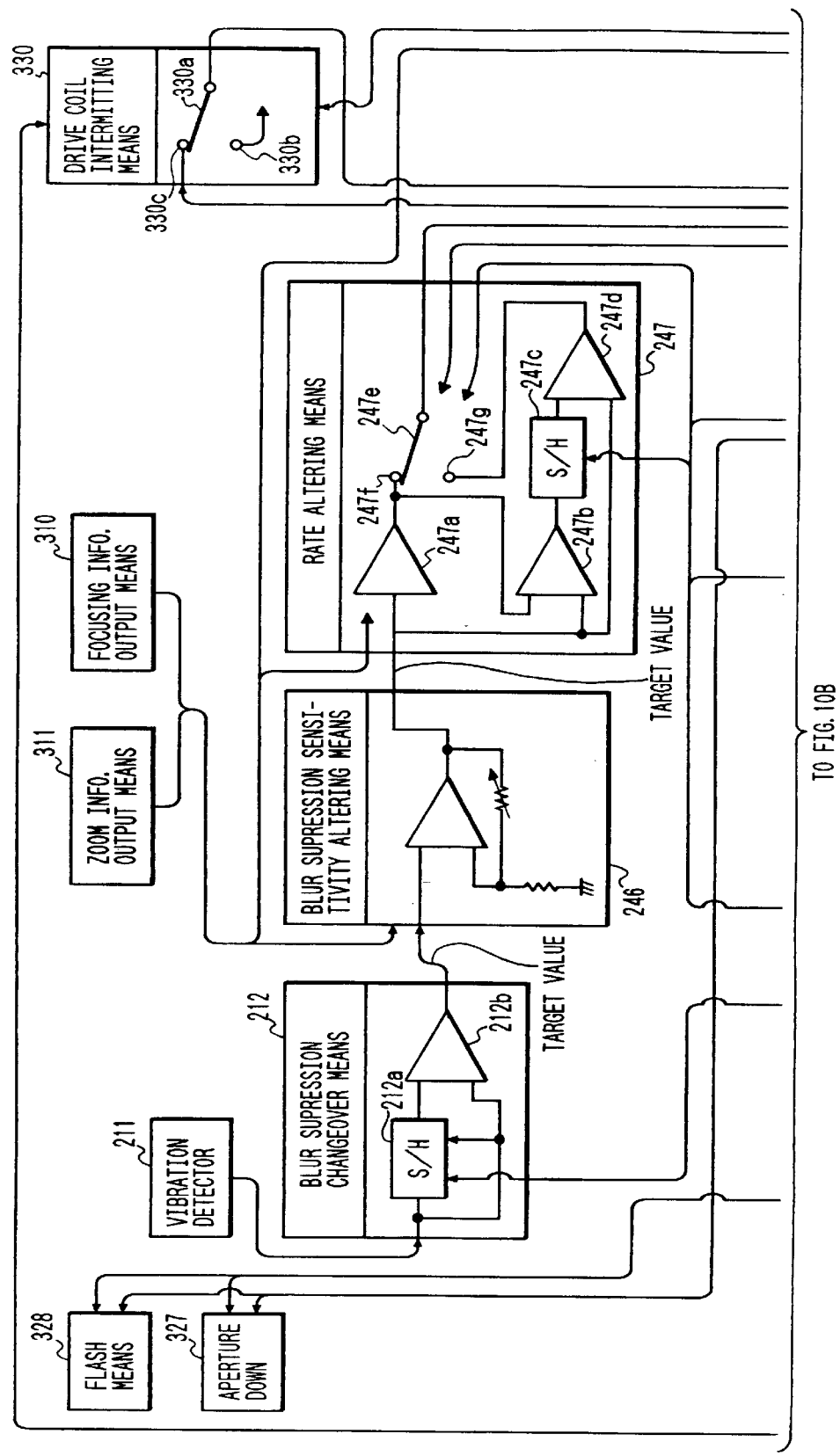
FIG. 10 is comprised of FIGS. 10A and 10B which show block diagrams schematically illustrating the construction of the blur prevention camera of the fifth embodiment according to the present invention.
Figure 10B:
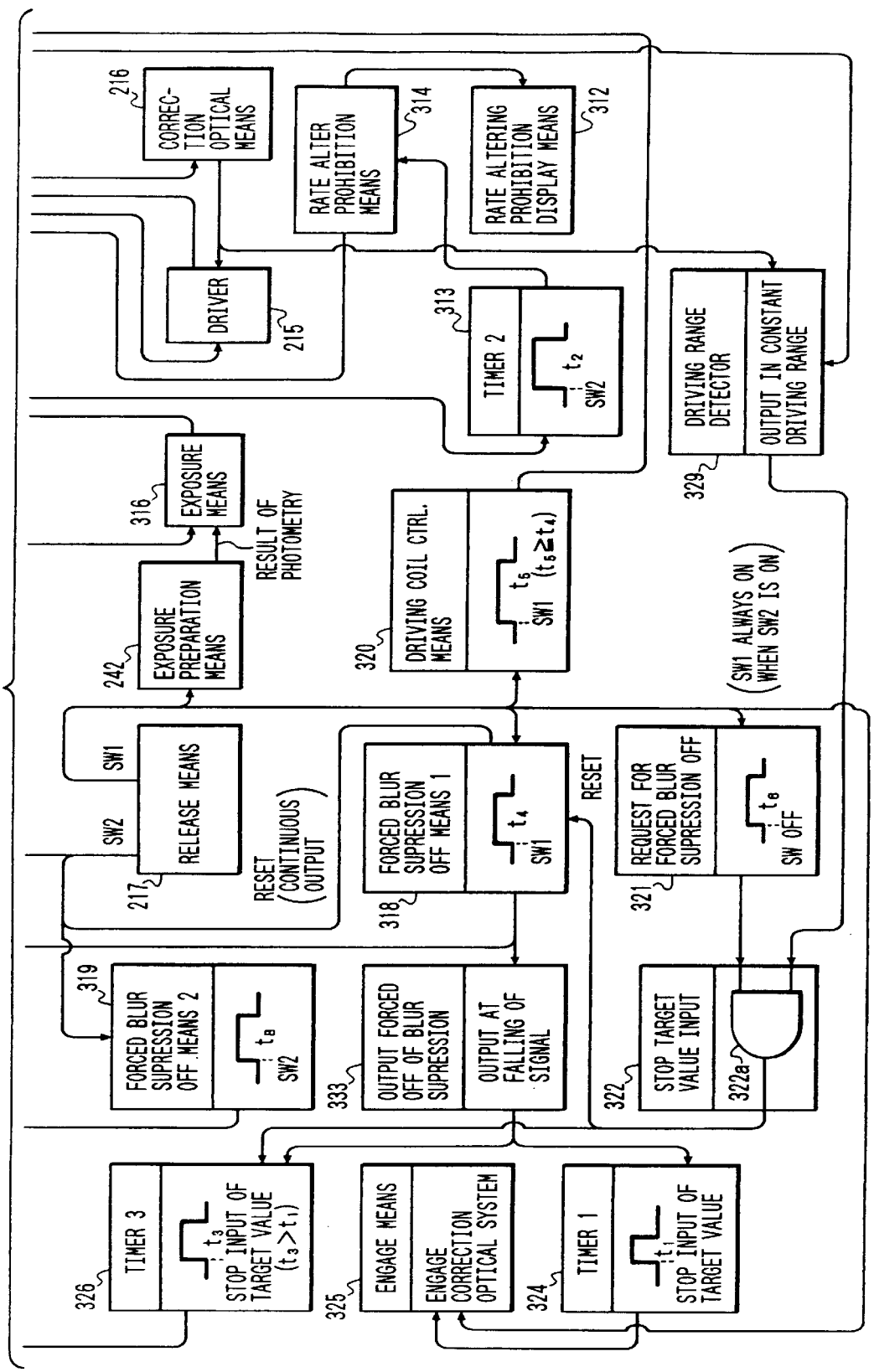
Figure 33A:
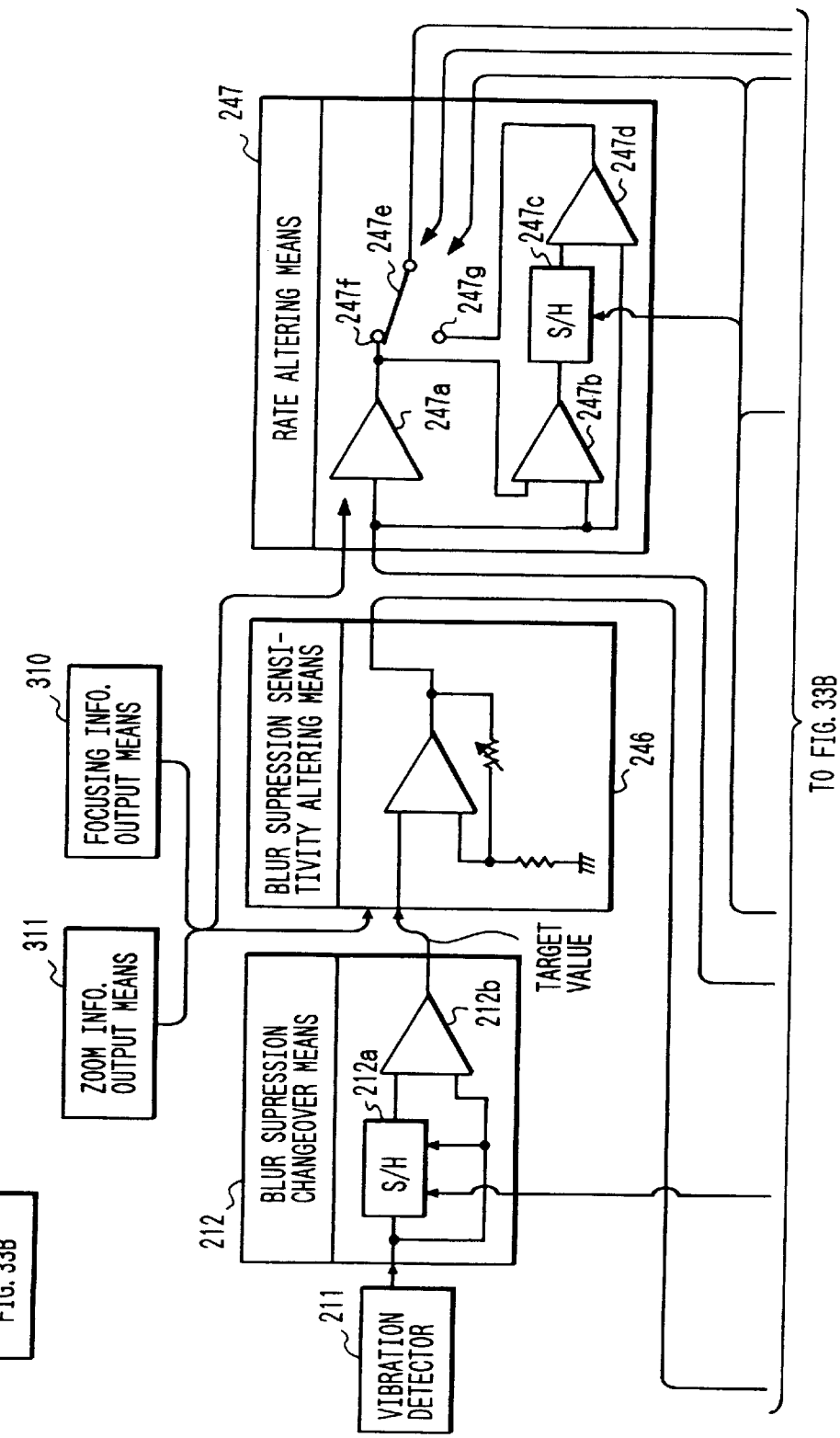
FIG. 33 is comprised of FIGS. 33A and 33B which show block diagrams schematically illustrating the construction of a conventional blur prevention camera.
Figure 33B:
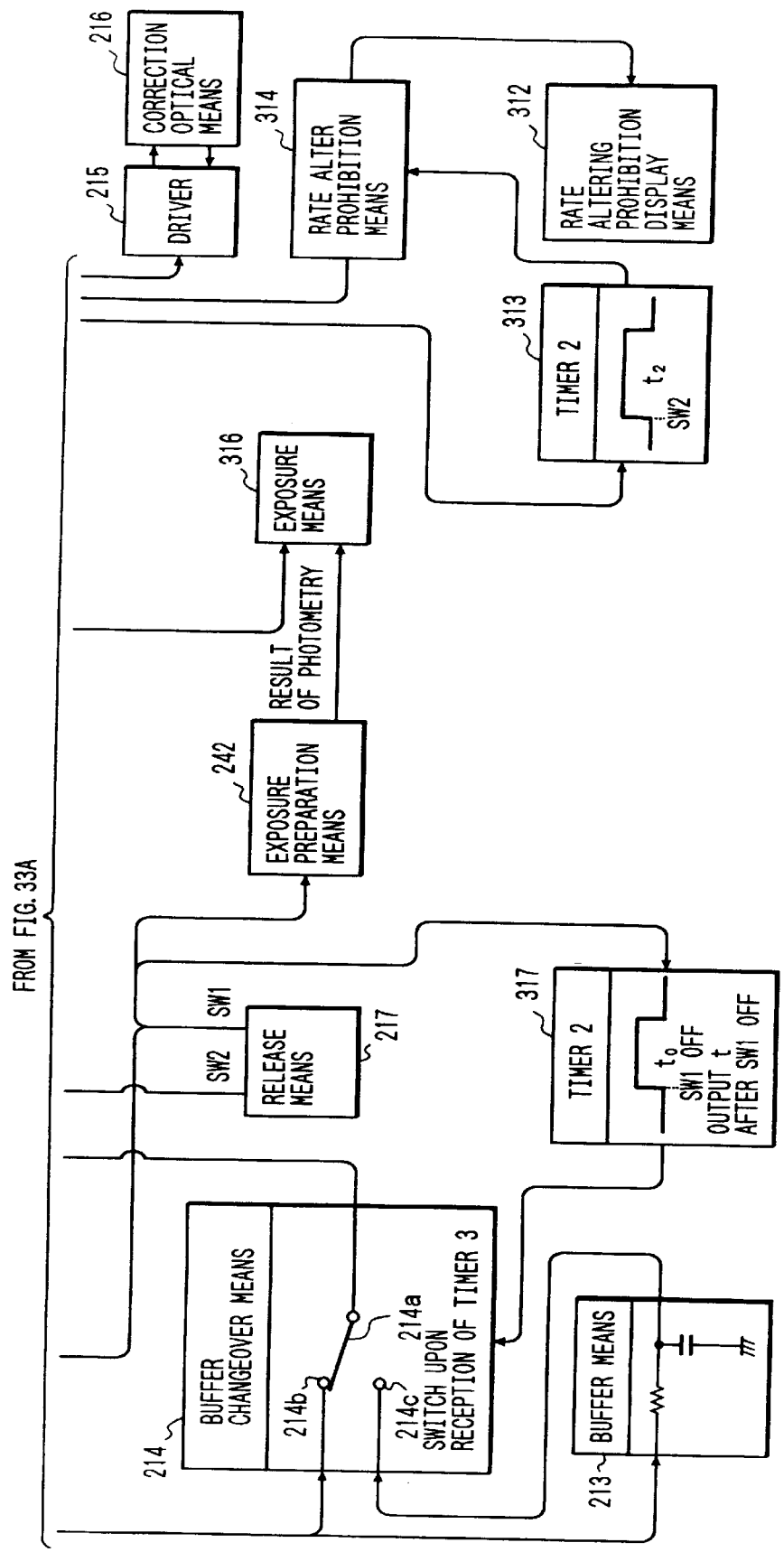

FIGS. 10A and 10B are block diagrams schematically showing the construction of the blur prevention camera of the fifth embodiment according to the present invention, in which the same constituents as those in FIGS. 33A and 33B are indicated by the same reference numerals. The image blur correction mechanism and the drive circuit for it of this embodiment are the same as those shown in FIGS. 28 through 30B.

In FIGS. 10A and 10B, a forced blur suppression off means 1 (318) starts counting from the time it receives the ON-signal of switch SW1 from the release means 217. And at the time $t_4$ (e.g. 10 sec), the forced blur suppression off means 1 (318) stops output, (when the output trails). When the forced blur suppression off means 1 (318) receives the ON-signal of switch SW2, the value of the counting is reset. Accordingly, if the ON-signal of switch SW2 is applied after a time lapse of $t_4'$ ($<t_4$) from the time the ON-signal of switch SW1 was applied, the forced blur suppression off means 1 (318) stops output after ($t_4'+t_4$) from the time the ON-signal of switch SW1 was applied.

The forced blur suppression off means 1 (318) also receives a signal from a target value input stop means 322 (described later), when the forced blur suppression off means 1 (318) is also reset. The output of the forced blur suppression off means 1 (318) is applied to a sample holder 212a and a forced blur suppression off output means 323.

The sample holder 212a receiving the output is brought into the hold mode, and then a blur suppression change-over means 212 starts to output the target value. After a time lapse of $t_4$ (or $t_4'+t_4$) from the time the ON-signal of switch SW1, the forced blur suppression off means 1 (318) stops output, when the sample holder 212a resumes sampling. Thus, the target value becomes zero and the correction optical means 16 is returned to its zero point. The forced blur suppression off output means 323 starts output at the time of trailing of the output of the forced blur suppression off means 1 (318).

The output of the forced blur suppression off output means 323 is applied to the timers 1 (324) and 2 (326). The timer 1 (324) starts output upon receiving the output of the forced blur suppression off output means 323, and continues output for a time lapse of $t_1$ (e.g. 0.3 sec). (The time lapse $t_1$ should be long enough so that the correction optical means 16 can be returned to its zero point).

The output of the timer 1 (324) is applied to an engagement means 325 (comprising the mechanical lock chassis 718, the plunger 719, the spring 720, the mechanical lock arm 721 and the pivot vis 722 shown in FIG. 29). At the time of trailing of the output of the timer 1 (324), the engagement means 325 drives the plunger 719 to set the projection 721a of a mechanical lock arm 721 into a hole 72d of the support frame 72 and engage with the support frame 72. When the ON-signal of switch SW1 is applied, the engagement means 325 drives the plunger 719 to disengage the support frame 72. A timer 3 (326) starts output to a driving coil intermittent means 330 when the output of the forced blur suppression off output means 323 is received, and continues output for a time lapse $t_3$ (e.g. 1 sec, wherein $t_3 > t_1$).

At the time of trailing of the output of the timer 3 (326), the driving coil intermittent means 330 disconnects the coil of the correction optical means 216 from the drive means 215 (that is, the switch terminal 330a is switched from the terminal 330c to the terminal 330b). As the terminal 330b is connected with the other terminal of the coil, the coil is short-circuited.

In other words, when blur suppression is to be performed for a time lapse $t_4$ (or $t_4'+t_4$) from the time the switch SW1 is turned on, the blur suppression is interrupted and forcibly stopped to save electric power, wherein the correction optical means 16 is locked and its coil is short-circuited. In order not to stop blur suppression during exposure even when exposure is performed immediately after the time lapse $t_4$ passed by from the time the switch SW1 was turned on, the forced blur suppression off means 1 (318) is reset when the switch SW2 is turned on.

A forced blur suppression off means 2 (319) start output at the time the ON-signal of switch SW2 is received from the release means 17, and continues output to an aperture down means 327 and a flash means 328 for a time lapse $t_8$ ($>t_4$).

The time lapse $t_8$ is set to be, for example, 1 sec. In this case, if the exposure time is longer than 1 sec, the aperture is narrowed and the stroboscope is flashed at the time of trailing of the output of the forced blur suppression means 2 (319), and according to the exposure-going-on information of the exposure means 316 applied to the flash means 328 and the aperture down means 327.

The stroboscope is flashed to compensate the loss of exposure light caused by the narrowed aperture.

It is difficult to keep high precision in blur suppression (precise enough to reduce the blur in a picture image to make it negligible) for a long time (e.g. 1 sec) because of limitation on the stability of the output of the deviation detection sensor and limitation of exactness of the sensor output calculator. Therefore, when blur suppression is performed for a time longer than $t_8$, the aperture is narrowed not to take in the blur caused by the vibration of hands.

A driving coil control means 320 starts output to the driving coil intermittent means 330 at the time the ON-signal of switch SW1 is received, and continues output for a time lapse $t_5$ ($\geq t_4$, e.g. 15 sec). At the time of trailing of this output, the driving coil intermittent means 330 disconnects the switch terminal 330a from the terminal 330b and connects the switch terminal 330a with the terminal 330c in order to connect the coil which has been short-circuited with the drive circuit 215. Thus, drive of the correction optical means 216 is resumed. In short, if the switch SW1 is turned on, the driving coil control means 320 starts the drive of the correction optical means 216.

At the time the release means 217 stops sending the ON-signal of switch SW1, a blur suppression off command means 321 starts output to one terminal of an AND gate 322a of a target value input stop means 322, and continues output for a time lapse $t_6$ (e.g. 6 sec). On the other hand, a signal of the detected position of the correction optical means 216 is applied to a driving range detection means 329, which applies, only if the signal of detected position falls in a predetermined range (that is only if the correction optical means 216 is within a predetermined driving range), the signal to the other terminal of the AND gate 322a of the target value input step means 322.

The "predetermined range", according to which the driving range detection means 329 decides whether the signal should be outputted or not, is varied according to the output from the zoom information output means 311 and/or the focus information output means 310. For example, the range after the switch SW1 is turned off is broadened in the zoom-wide mode and/or at the time of nearest end focus.

The target value input stop means 322 applies a signal to the forced blur suppression off means 1 (318) and the timer 3 (326) only when both the signal from the blur suppression off command means 321 and the signal from the driving range detection means 329 are received. The signal from the target value input stop means 322 resets the forced blur suppression off means 1 (318), when, as the switch SW1 has been already turned off, the forced blur suppression off means 1 (318) does not output a signal. In other words, when the target value input stop means 322 outputs a signal, the forced blur suppression off means 1 (318) stops output, and the sample holder 212a is brought into the sampling mode again, and the target value becomes zero. As a result, the correction optical means 216 is returned to its zero position, where the correction optical means 216 is locked and its coil is short-circuited.

The control operation to inhibit blur suppression, corresponding to those in the fifth embodiment, performed with the above-mentioned construction will now be described.

Figure 11:
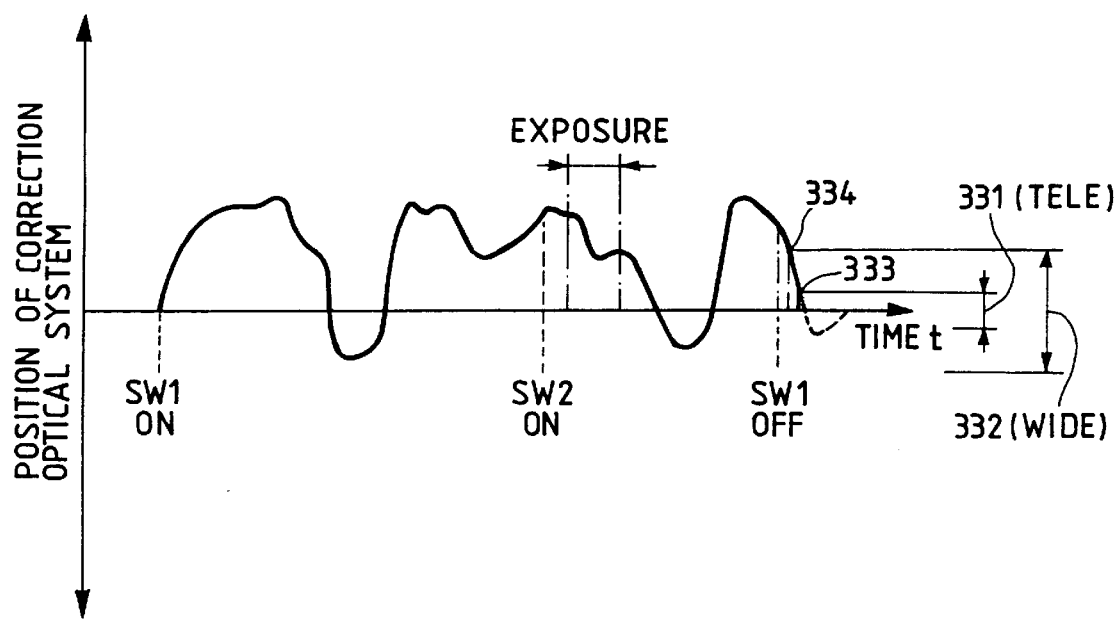
FIG. 11 is a diagram explaining position control of the correction optical means after the switch SW1 is turned off, performed by the fifth embodiment according to the present invention.

FIG. 11 is a diagram showing the position of the shifted correction optical means 216. In the zoom-tele mode, the blur suppression operation is continued even after the switch SW1 is turned off. In this case, at the time (333 in FIG. 11) both the blur suppression off command means 321 and the driving range detection means 212a output their signals, and the correction optical means 216 is returned and locked at its zero position.

In the zoom-wide mode, the driving range detection means 329 outputs a signal earlier (because the driving range 332 after the switch SW1 is turned off in the zoom-wide mode is broader than the driving range 331 in the zoom-tele mode). Accordingly, as designated by the reference numeral 334, return of the correction optical means 216 toward its zero position is also started earlier. It may be thought that an abrupt change in framing during the return of the correction optical means 216 to the zero position is unpleasant for the photographer because the driving range after the switch SW1 is turned off is wide in the zoom-wide mode. In fact, however, it is not unpleasant at all, for the ratio of the amount of deviation from the optical axis to the amount of shift of the correction optical means 216 is very small in the zoom-wide mode.

Now, exposure the control performed by the forced blur suppression off means 2 (319) will be described.

FIGS. 12A to 12E show vibration having a waveform of a sine curve which is supposed to be given during exposure.

FIGS. 12B and 12C show the vibration actually given to the camera, wherein the vibration consists of sine wave vibration and low-frequency vibration which gradually move the camera body downwards. Since the vibration detection means 211 can not detect the low-frequency vibration, the amount of shift of the correction optical means 216 is controlled according to the given sine wave vibration without containing the low-frequency vibration, as shown in FIG. 12A. Thus, part of the vibration remains uncancelled, as shown in FIGS. 12D and 12E, and deviation 6, is taken in the photograph.

When the aperture is narrowed after the time lapse $t_8$ as described before with reference to FIGS. 10A and 10B, however, the deviation δ, is not taken in. Thus, the deviation is reduced to $δ_2$. In addition, the time lapse of the stroboscope flashed to compensate the loss of exposure light is very short, the vibration remaining uncancelled is further reduced and becomes negligible.

(Sixth Embodiment)

Figure 13B:
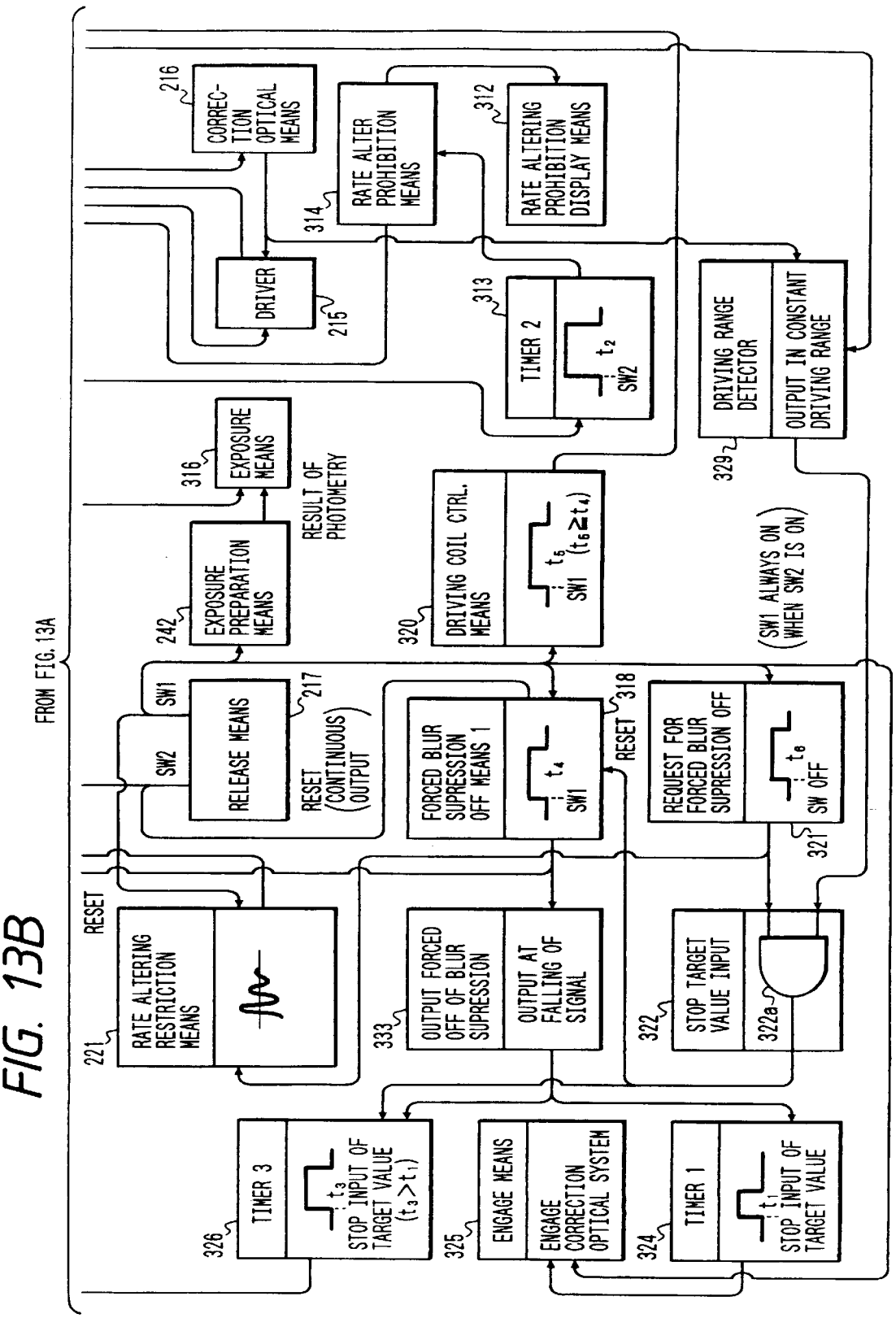
FIG. 13 is comprised of FIGS. 13A and 13B which show block diagrams schematically illustrating the construction of the blur prevention camera of the sixth embodiment according to the present invention.

FIGS. 13A and 13B are block diagrams schematically showing the construction of the blur prevention camera of the sixth embodiment according to the present invention.

This construction is different from that shown in FIGS. 10A and 10B in that a ratio altering control means 221 is added. For brevity, the forced blur suppression off means 2 (319), the aperture down means 327 and the flash means 328 shown in FIGS. 10A and 10B are not shown in FIGS. 13A and 13B.

The object of the sixth embodiment is to further save electric power by swiftly returning the correction optical means 216 to a predetermined range and locking it there after the switch SW1 is turned off (after the blur suppression off command means 321 outputs a signal).

The ratio altering control means 221 receives a signal from the blur suppression off command means 221 and gradually reduces the amplification ratio of the blur suppression sensitivity altering means 246.

The ratio altering control means 221 is reset when the switch SW1 of the release means 217 is turned on.

With the above construction, if the switch SW1 is turned off and the blur suppression off command means 321 outputs a signal, the ratio altering control means 221 gradually reduces the amplification ratio of the blur suppression sensitivity altering means 246. In other words, performance of blur suppression is gradually lowered. Accordingly, the amount of shift per unit time of the correction optical means 216 becomes smaller.

Figure 14A:
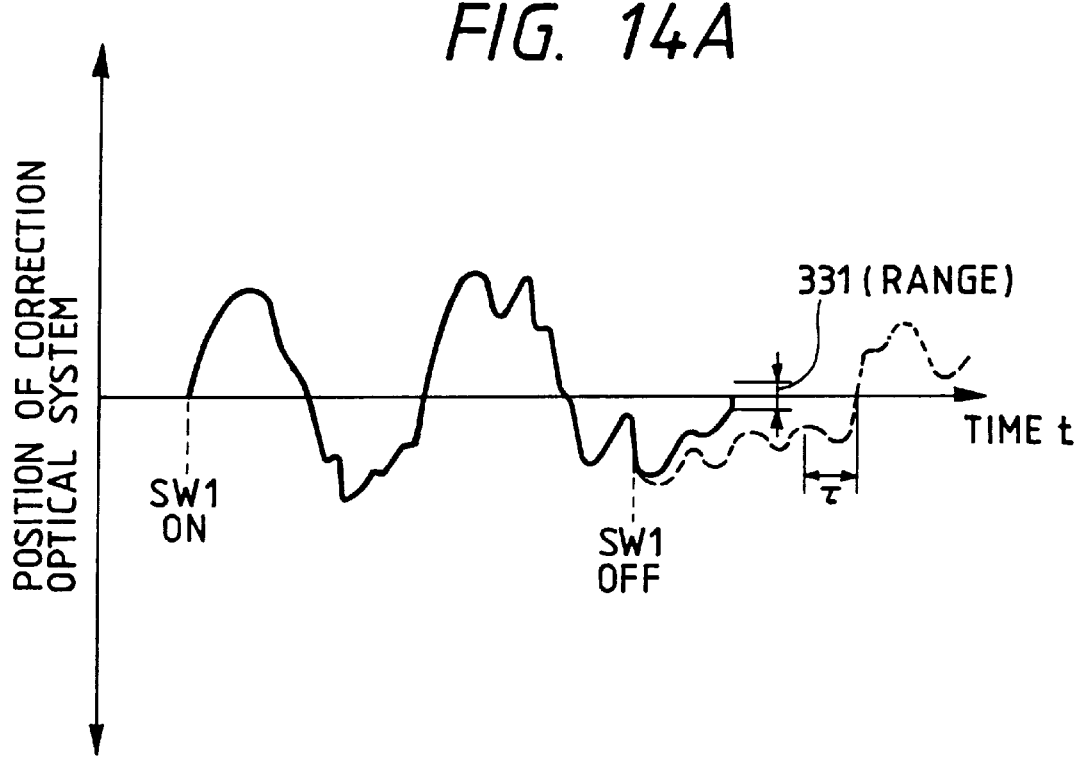
FIGS. 14A and 14B are diagrams explaining position control of the correction optical means after the switch SW1 is turned off, performed by the sixth embodiment according to the present invention.

FIG. 14A shows the amount of shift of the correction optical means 216 in the zoom-tele mode. After the switch SW1 is turned off, the amount of shift per unit time of the correction optical means 216 of this embodiment (solid line) becomes smaller and smaller than that of the control without using the ratio altering control means 221 (broken line). When the correction optical means 216 enters the predetermined range 331, the target value of the blur suppression change-over means 212 is set to be zero and the correction optical means 216 is set to be at the zero position and locked there and the coil is short-circuited, in the same way with the construction shown in FIGS. 10A and 10B.

Figure 14B:
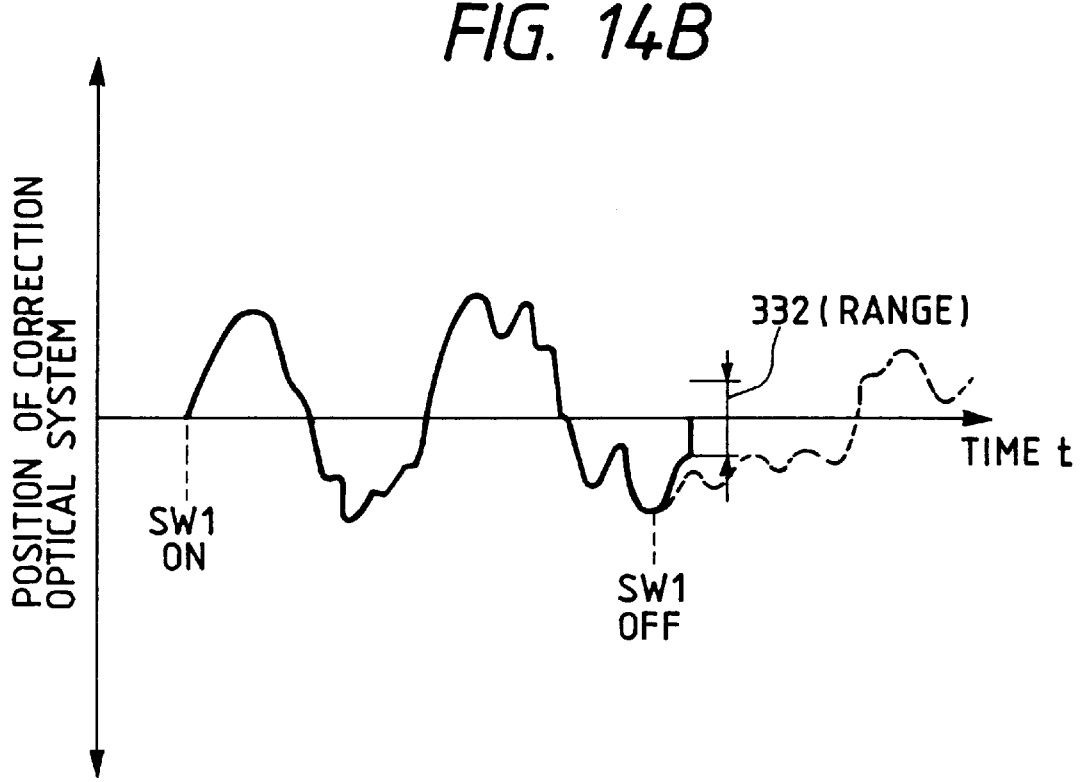

As a result, the correction optical means 216 enters the predetermined driving range earlier than the control (broken line) by a time lapse t. In the zoom-wide mode, the "predetermined" driving range after the switch SW1 is turned off is wider, as shown in FIG. 14B. Accordingly, the blur suppression operation can finish even earlier.

(Seventh Embodiment)

Figure 15B:
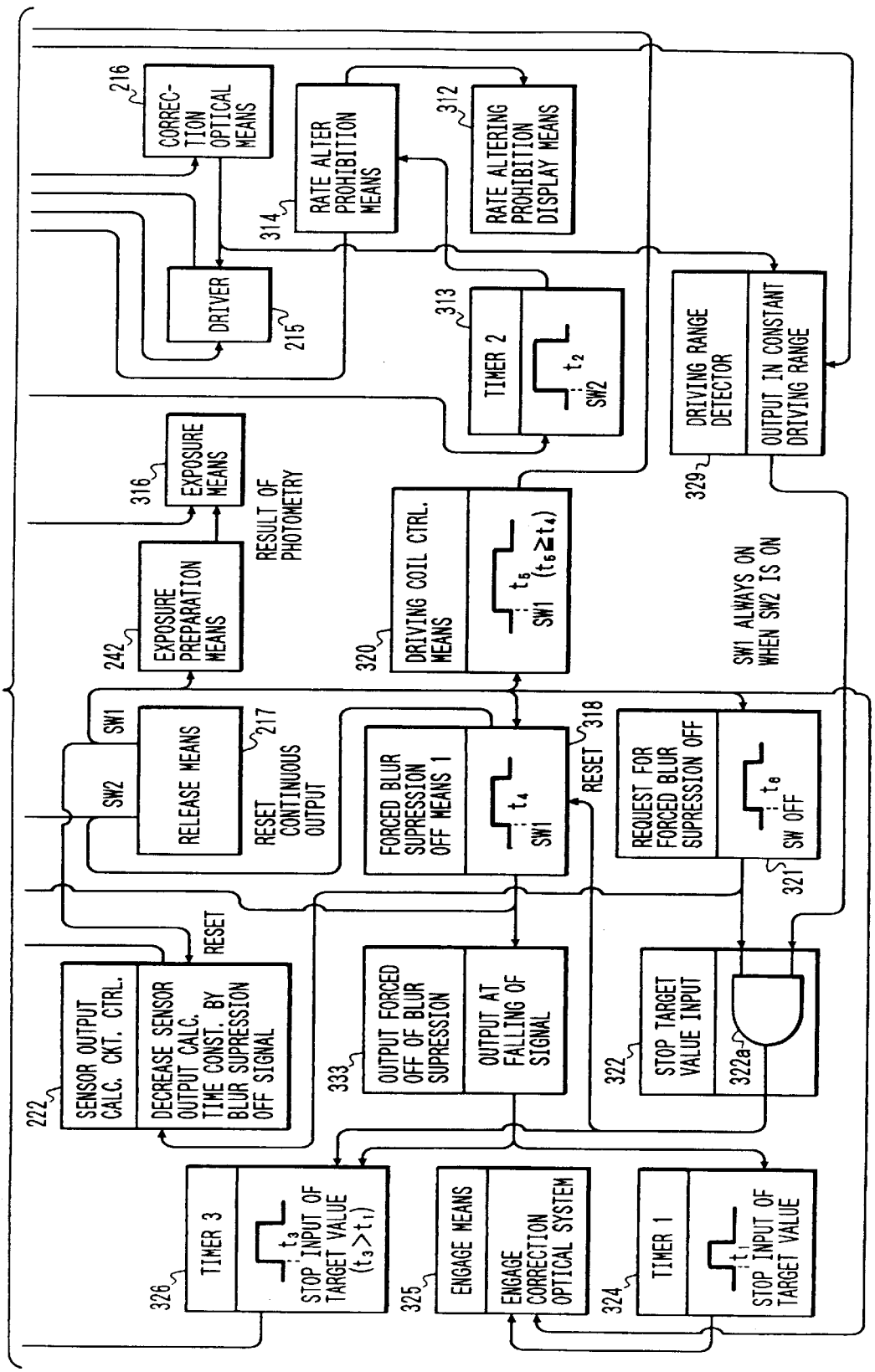
FIG. 15 is comprised of FIGS. 15A and 15B which show block diagrams schematically illustrating the lip construction of the blur prevention camera of the seventh embodiment according to the present invention.

FIGS. 15A and 15B are block diagrams schematically showing the construction of the blur prevention camera of the seventh embodiment according to the present invention.

In this embodiment, the ratio altering control means 221 of the sixth embodiment shown in FIGS. 13A and 13B is replaced by a sensor output calculator control means 222.

The sensor output calculator control means 222 receives a signal from the blur suppression off command means 321 and varies frequency characteristics of the sensor output calculator in the vibration detection means 211. For example, from the time the signal from the blur suppression off command means 321 is received, the part of the components on the lower frequency side to be attenuated is gradually increased by properly varying the frequency characteristics of the sensor output calculator (for example, at first components lower than 0.1 Hz are . . . , then those lower than 0.5 Hz, and further lower than 1 Hz, and so on).

The lower frequency components of the vibration of hands cause greater deviation than the higher frequency components. Therefore, if the frequency characteristics of the sensor output calculator is properly varied so that the attenuation ratio of the lower frequency components can be increased, the target value is reduced. Thus, an effect similar to that of the sixth embodiment having the construction shown in FIGS. 13A and 13B can be obtained. That is, the amount of shift of the correction optical means 216 can be gradually reduced. This operation will be described here in detail.

Figure 16A:
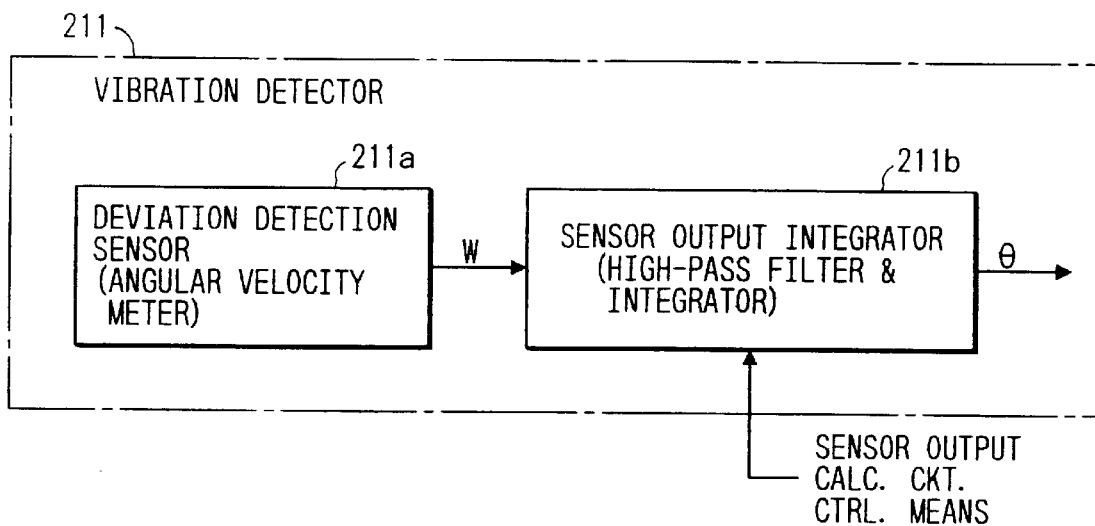
FIGS. 16A and 16B are block diagrams showing the construction of the vibration detection means shown in FIGS. 15A and 15B.
Figure 16B:
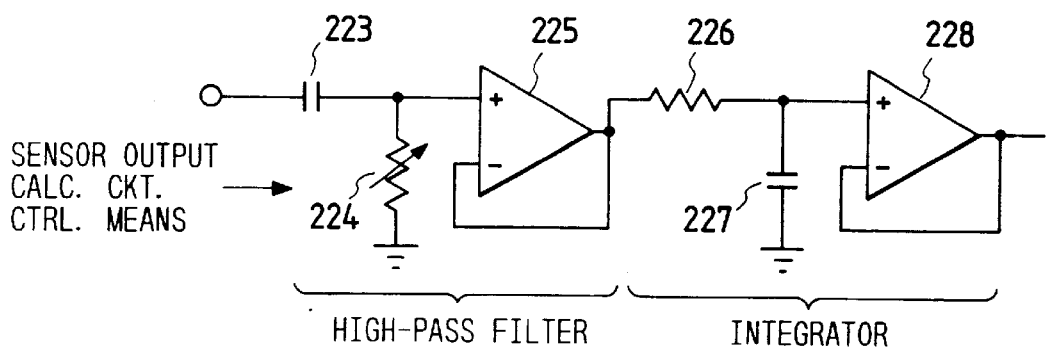

FIG. 16A shows the construction of the vibration detection means 211, which comprises a deviation detection sensor 211a (angular velocity meter such as a vibration gyro) for outputting an angular velocity ω and a sensor output calculator 211b for calculating the output of the deviation detection sensor 211a. The sensor output calculator 211b comprises of a high-pass filter for attenuating the lower frequency components and an integrator for integrating the angular velocity to obtain an angle θ.

If the sensor output calculator 211b is an analog circuit as shown in FIG. 16A, its high-pass filter comprises of a condenser 223, variable resistance 224 and an operational amplifier 225, while its integrator comprises a condenser 227, a resistance 226 and an operational amplifier.

Figure 17A:
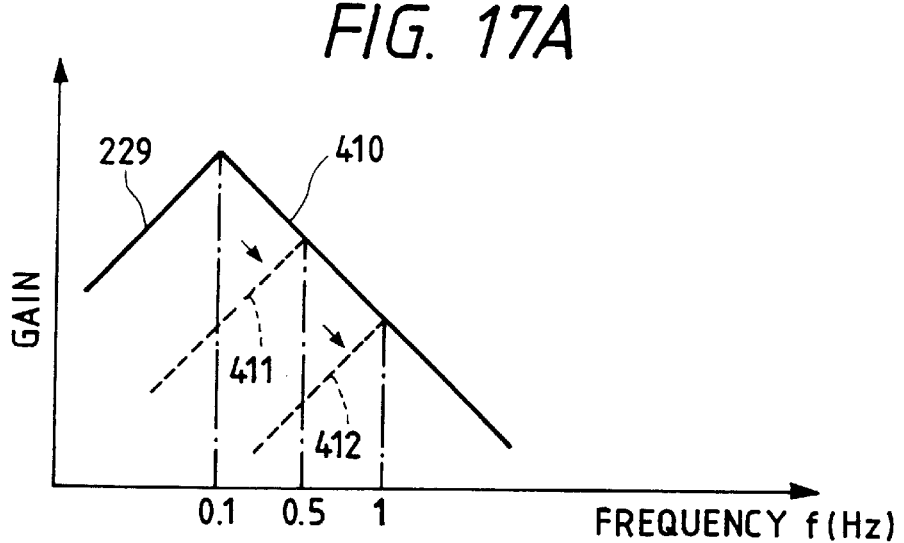
FIGS. 17A to 17C are diagrams explaining target value of deviation angle output from the vibration detection means shown in FIGS. 16A and 16B.

FIG. 17A shows the frequency characteristics of the sensor output calculator 211b, wherein the components lower than 0.1 Hz are gradually attenuated (solid line 229), while the components higher than 0.1 Hz are integrated (solid line 410). Note that attenuation of the higher frequency components at a constant ratio is equivalent to integration thereof.

If the sensor output calculator control means 222 decreases the resistance of the variable resistance 224 (that is, decreases the time constant), the frequency characteristics of the sensor output calculator 211b are changed as shown by the broken line 411, wherein the components lower than 0.5 Hz are attenuated, and further as shown by the broken line 412, wherein the components lower than 1 Hz are attenuated.

Figure 17B:
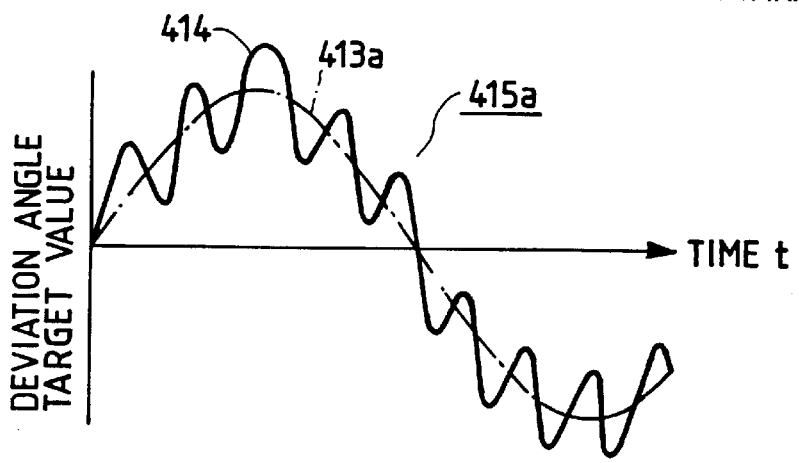

FIG. 17B shows the deviation output 415a of the sensor output calculator 211b before altering its frequency characteristics, wherein the deviation output 415a consists of low frequency vibration having a large amplitude and high frequency vibration having a small amplitude.

Figure 17C:
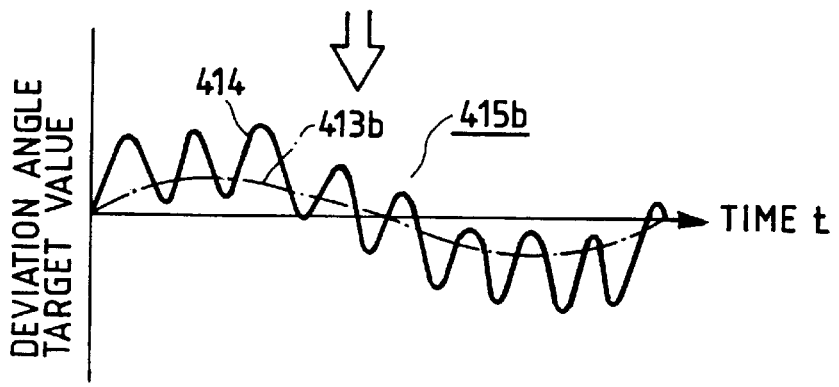

FIG. 17C shows the output of the sensor output calculator 211b when the frequency characteristics of the sensor output calculator 211b are altered by the sensor output calculator control means 222 so that the low frequency vibration having a large amplitude is attenuated. By altering the frequency characteristics as described above, the amplitude of the deviation output 415a is reduced. As a result, the correction optical means 216 enters the predetermined driving range earlier, which exhibits the same effect as shown in FIGS. 14A and 14B.

(Eighth Embodiment)

Figure 18A:
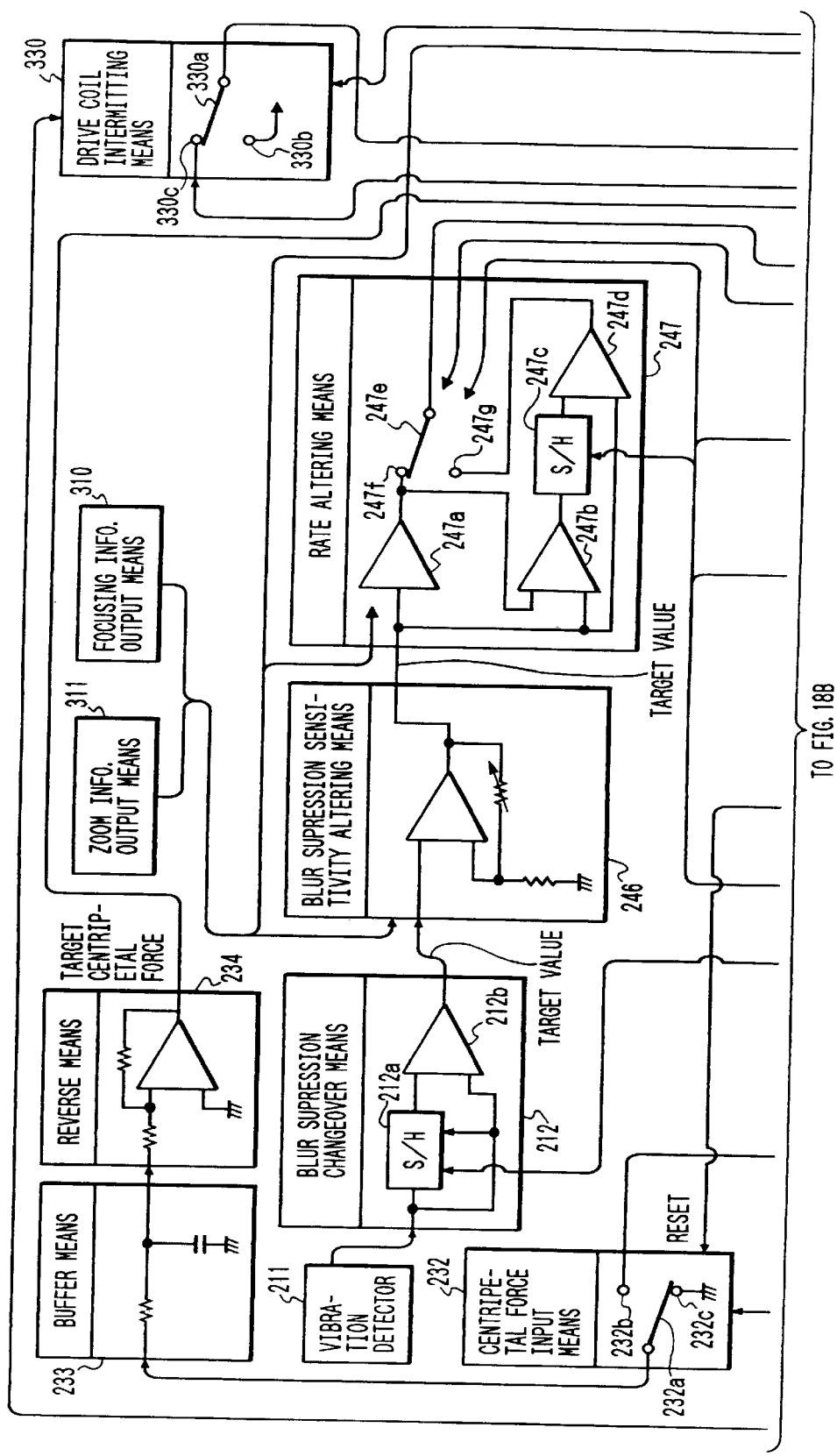
FIG. 18 is comprised of FIGS. 18A and 18B which show block diagrams schematically illustrating the construction of the blur prevention camera of the eighth embodiment according to the present invention.
Figure 18B:
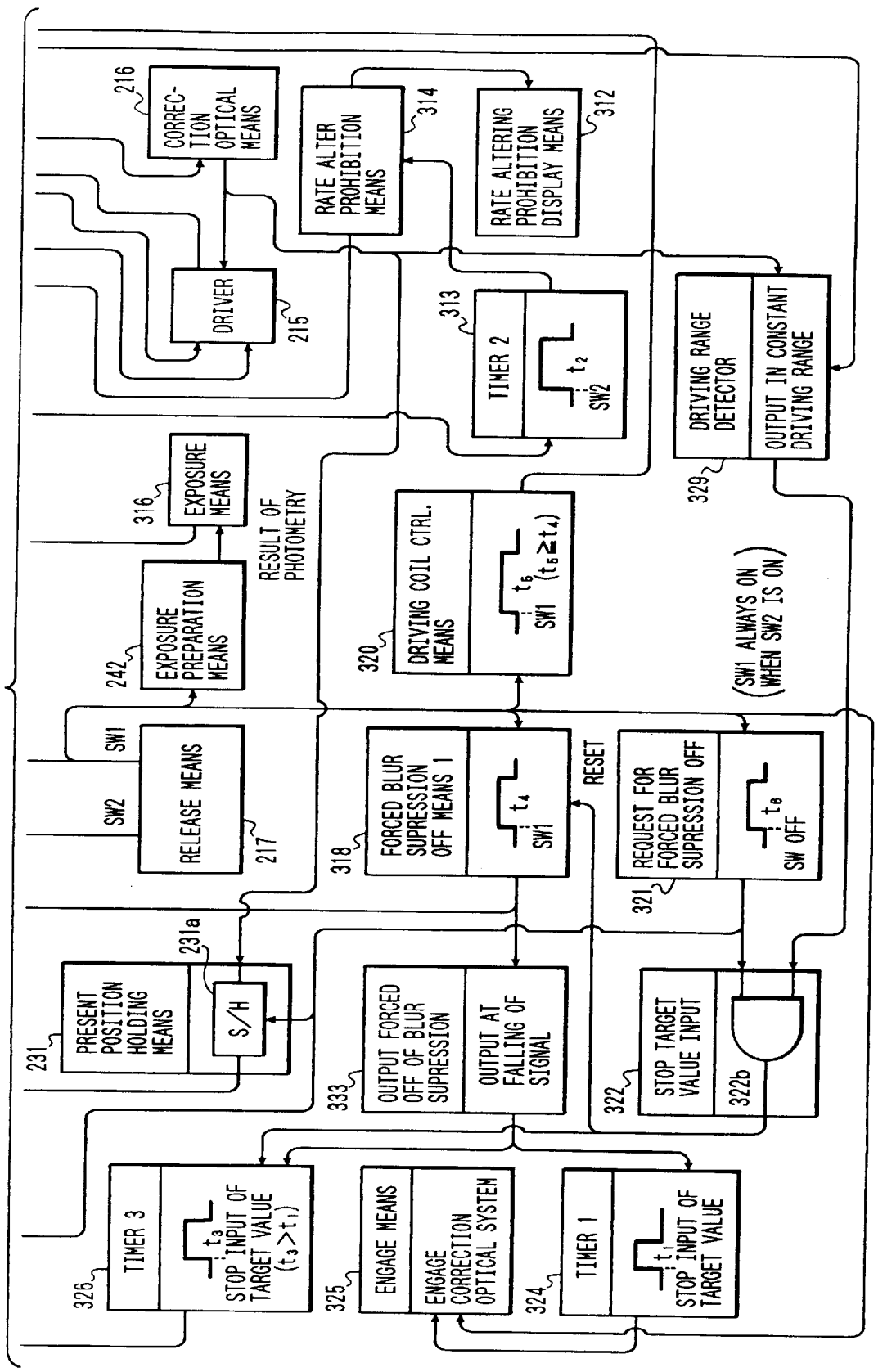

FIGS. 18A and 18B are block diagrams schematically showing the construction of the blur prevention camera of the eighth embodiment according to the present invention.

In this embodiment, the sensor output calculator control means shown in FIGS. 15A and 15B is replaced by a present position hold means 231, a centripetal force input means 232, a buffer means 233 and a reverse means 234.

The present position hold means 231 receives a signal from the blur suppression off command means 321, and holds and stores the present position of the correction optical means 216 in a sample holder 231a. The centripetal force input means 232 with its switch terminal 232a normally connected with a terminal 232c (such as GND) connects the switch terminal 232a with a terminal 232b when the signal from the blur suppression off command means 321 is applied to the centripetal force input means 232. Thus, the present position of the correction optical means 216 held in the sample holder 231a is applied to the buffer means 233.

The buffer means 233 is a low-pass filter comprising known RC (resistances and condensers) circuits for gradually increasing its output from zero up to the value of the applied present position. The output of the buffer means 233 is applied to the reverse means 234 whose output is gradually decreased from zero to the negative value of the present position. The output of the reverse means 234 is added to the target value from the ratio altering means 247, and the resultant value is applied to the drive means 215.

Figure 19A:
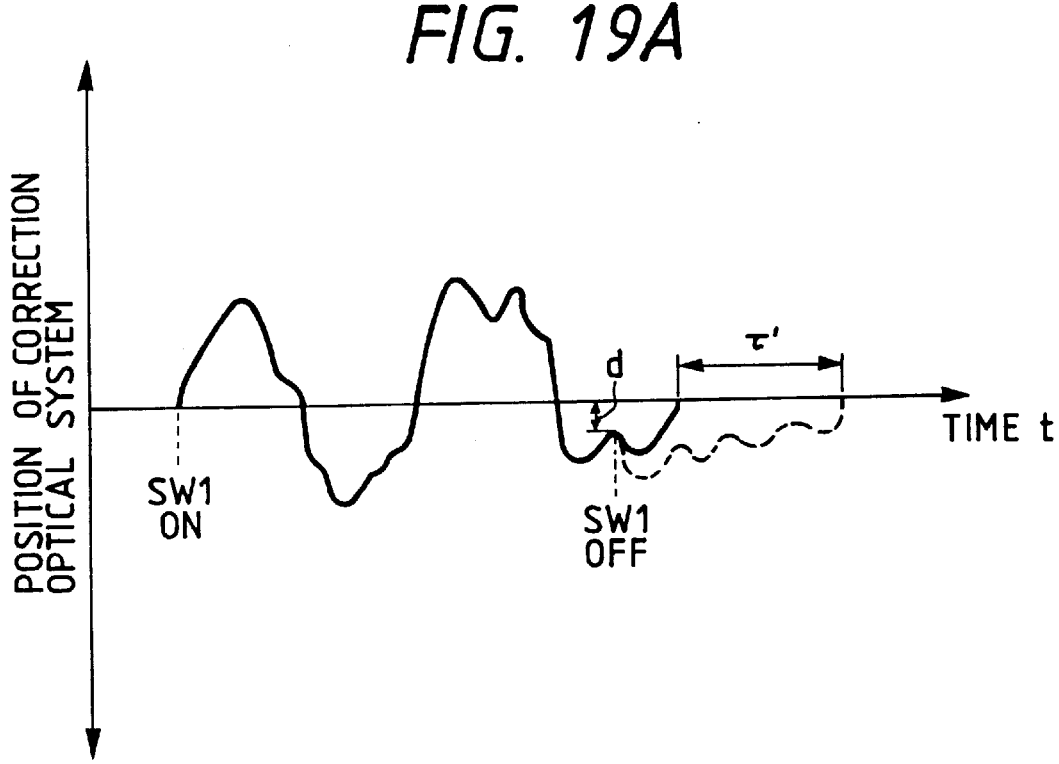
FIGS. 19A and 19B are diagrams explaining position control of the correction optical means after the switch SW1 is turned off, performed by the eighth embodiment according to the present invention.

Suppose the present position of the correction optical means 216 is −d at the time the switch SW1 is turned off, as shown in FIG. 19A. In this case, as the output of the reverse means 234 increases from zero to +d, the correction optical means 216 is, while suppressing vibration, moved from the present position of −d toward the zero position. (Note that the broken line in FIG. 19 shows the amount of shift of the correction optical means 216 of the control without the present position hold means 231, the centripetal force input means 232, the buffer means 233 and the reverse means 234 described above). When the correction optical means 216 enters the predetermined driving range, the position of the correction optical means 216 at that time is set as the zero position, where the correction optical means 216 is locked and its coil is short-circuited.

With the above-mentioned construction, the blur suppression operation can be finished earlier than the control (broken line) by a time lapse t'.

Figure 19B:
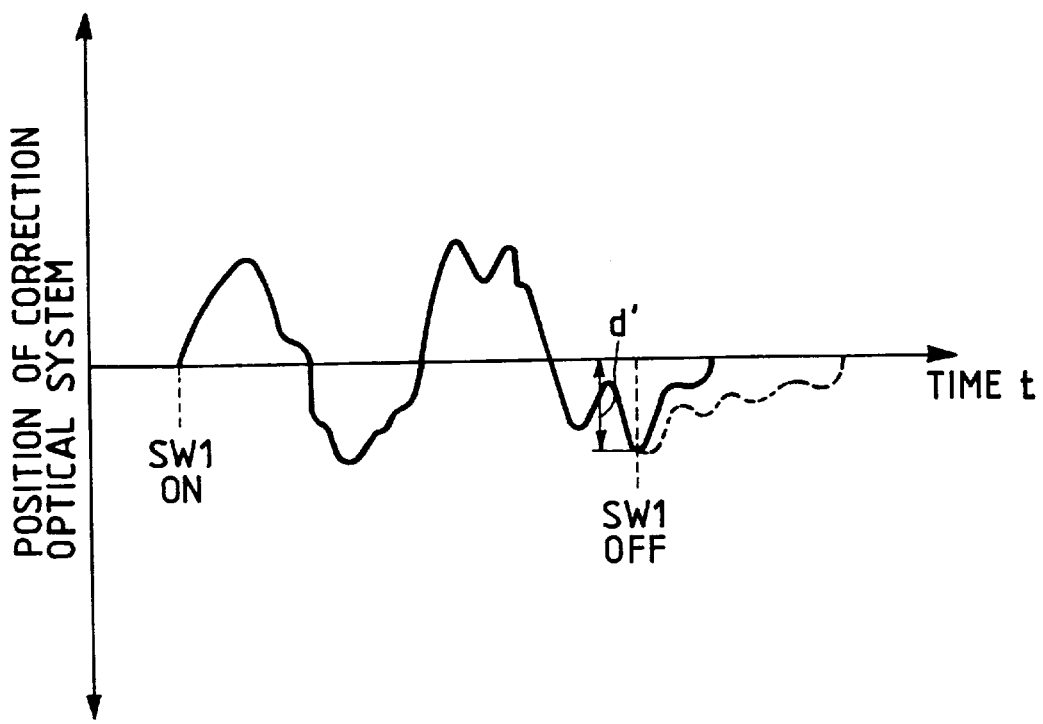

When the present position of the correction optical means 216 at the time the switch SW1 is turned off is greater than that shown in FIG. 19B (that is, −d' shown in FIG. 19B), the correction optical means 216 is returned with greater centripetal force. As a result, the blur suppression operation can also be finished earlier.

(Ninth Embodiment)

Though, in the fifth to eighth embodiments described above (see FIGS. 10A through 19B), the blur suppression operation is finished when the correction optical means 216 enters the predetermined driving range and is locked there after the switch SW1 is turned off, the blur suppression operation may be stopped and the correction optical means 216 may be locked when a predetermined time lapse has passed by since the switch SW1 was turned off.

Figures 20, 20A:
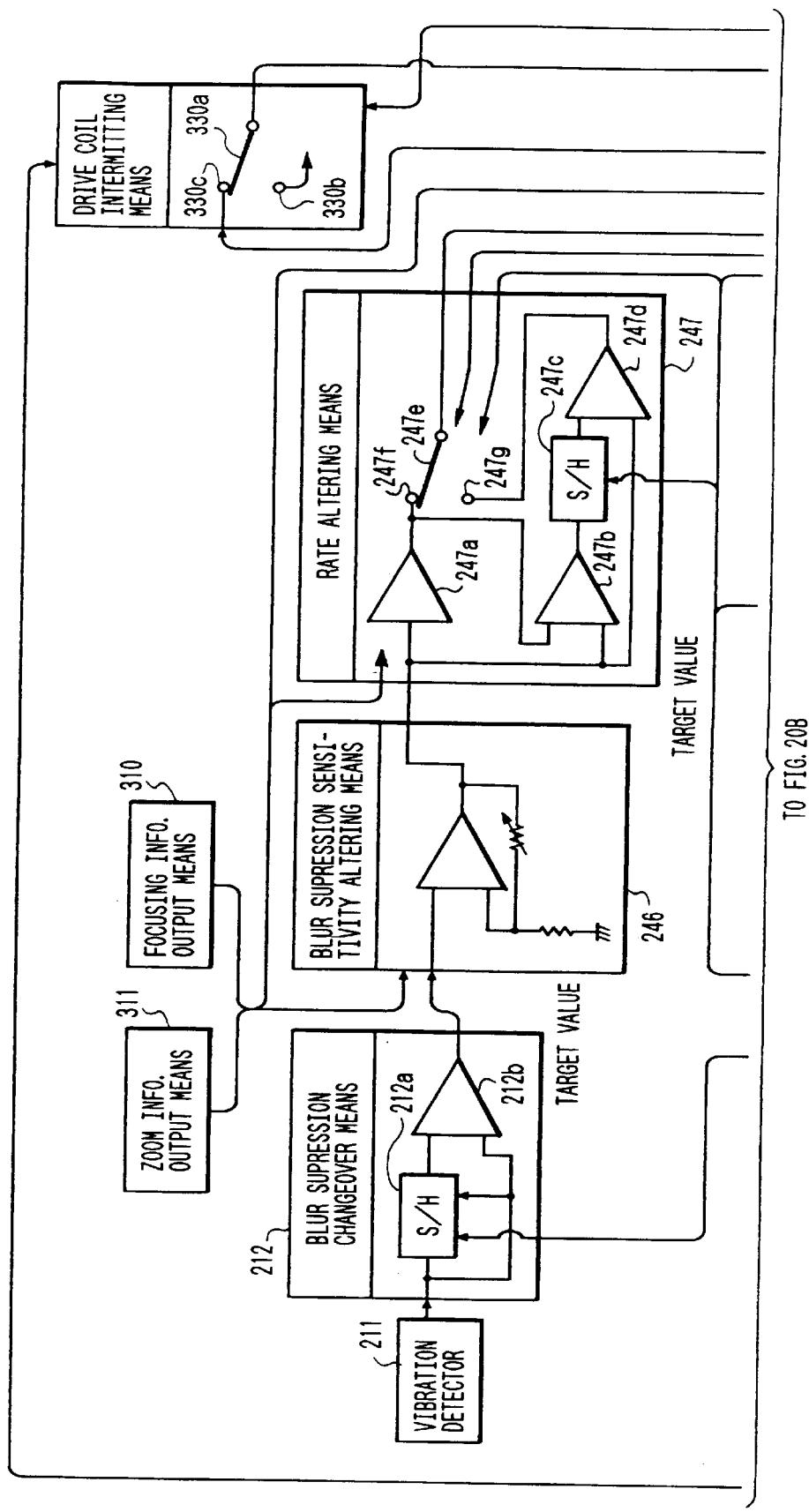
FIG. 20 is comprised of FIGS. 20A and 20B which show lock diagrams schematically illustrating the construction of the blur prevention camera of the ninth embodiment according to the present invention.
Figure 20B:
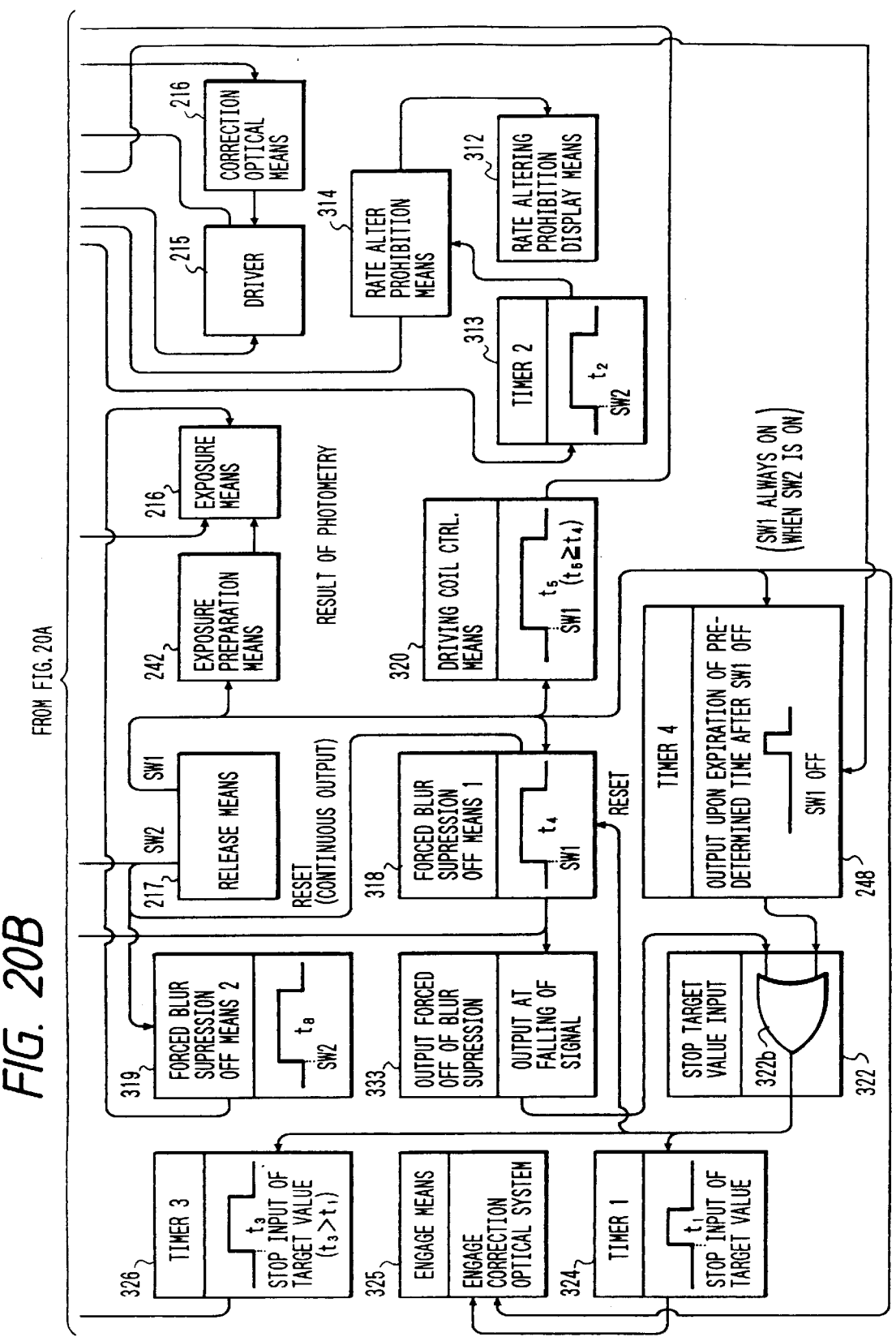

FIGS. 20A and 20B are block diagrams schematically showing the construction of the blur prevention camera of the ninth embodiment according to the present invention.

The construction of this embodiment is different from the construction shown in FIGS. 10A and 10B in that the driving range detection means 329 is replaced by a timer 4 (248) as well as the AND gate 322a of the target value input inhibition means 322 by an OR gate 322b.

The timer 4 (248), when signals from the zoom information output means 311 and the focus information output means 310 are received, changes its count time $t_7$, wherein $t_7$ is decreased in the zoom-wide mode and/or at the time of nearest end focus.

The timer 4 (248), when the OFF-signal of switch SW1 from the release means 217 is received, starts counting and continues output, for example, for two seconds at the time of infinite focus. The output of the timer 4 (248) is applied to one terminal of the OR gate of the target value input stop means 322. Then, the target value input stop means 322 is actuated to reset the target value of the blur suppression changeover means 212 as zero. As a result, in the same way with the construction shown in FIGS. 10A and 10B the correction optical means 216 is set at the zero point and locked there, and the coil is short-circuited.

Since the target value input stop means 322 is provided with the OR gate 322b, the blur suppression operation can be finished and the correction optical means 216 can be locked by the forced blur suppression off means 323 after a predetermined time lapse $t_4$ (or $t'_4+t_4$) has passed by since the switch SW1 was turned on, even if the switch SW11 is not turned off.

Figure 21:
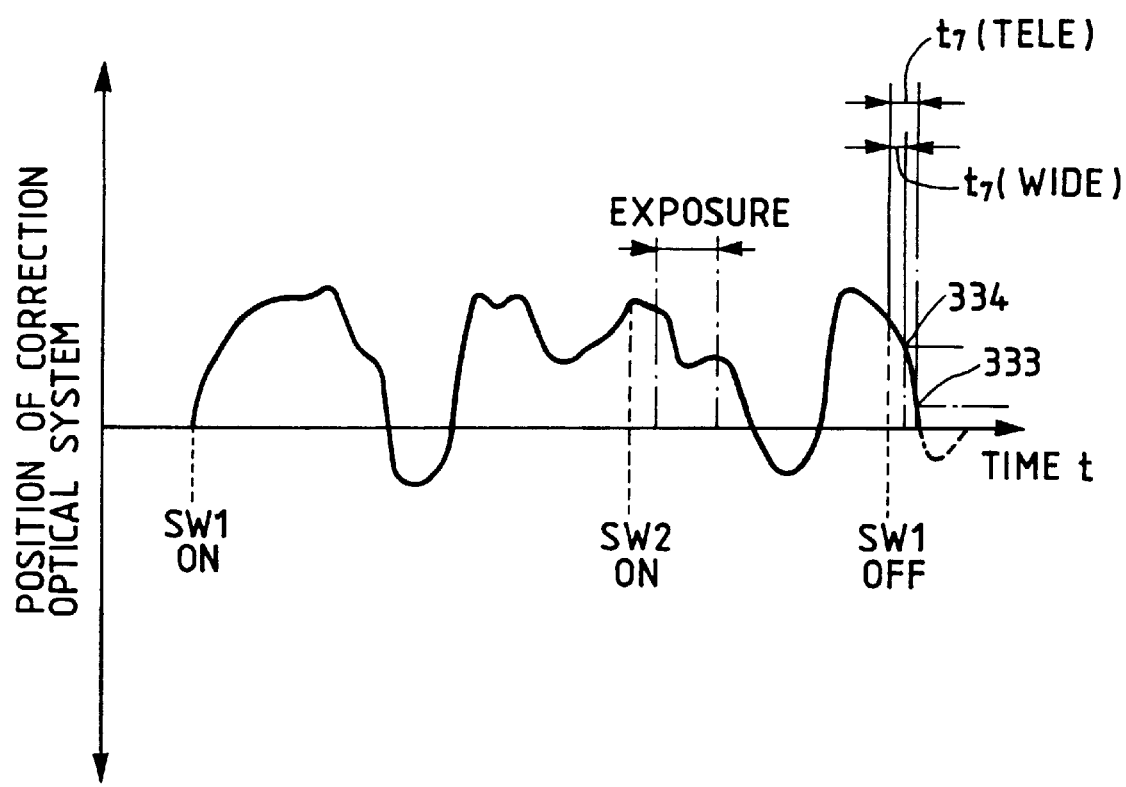
FIG. 21 is a diagram explaining position control of the correction optical means after the switch SW1 is turned off, performed by the ninth embodiment according to the present invention.

As shown in FIG. 21, after the time lapse $t_7$ (which is varied according to the zoom modes (tele/wide) and the focal length) from the time, the switch SW1 was turned off, the correction optical means 216 is set to be at the zero position.

The photographer seldom continues to look into the finder for a long time after the switch SW1 is turned off. Accordingly, if the count time $t_7$ is determined to be longer (e.g. 3 sec) than the time for which the photographer is expected to continue to look into the finder, the photographer does not have to see an unpleasant change of framing.

The construction shown in FIGS. 20A and 20B is different from that shown in FIGS. 10A and 10B in another point. That is, the shutter operation of the exposure means 316 is controlled, not by the flash means 328 and the aperture down means 327, but by the output of the forced blur suppression off means 2 (319).

In short, when the exposure time is longer than the time $t_8$ for which the blur suppression operation is continued, the shutter is closed during the exposure in order to prevent deteriorated images caused by a deviation.

FIGS. 22A to 22E explain the blur suppression mechanism, as FIGS. 12A to 12E. After the time lapse $t_8$ has passed by if a deviation is expected to cause deteriorated images, the shutter is closed to stop the exposure. Needless to say, if desirable, insufficient exposure may be compensated by flashing the stroboscope immediately before the shutter is closed.

(Tenth Embodiment)

Figure 23B:
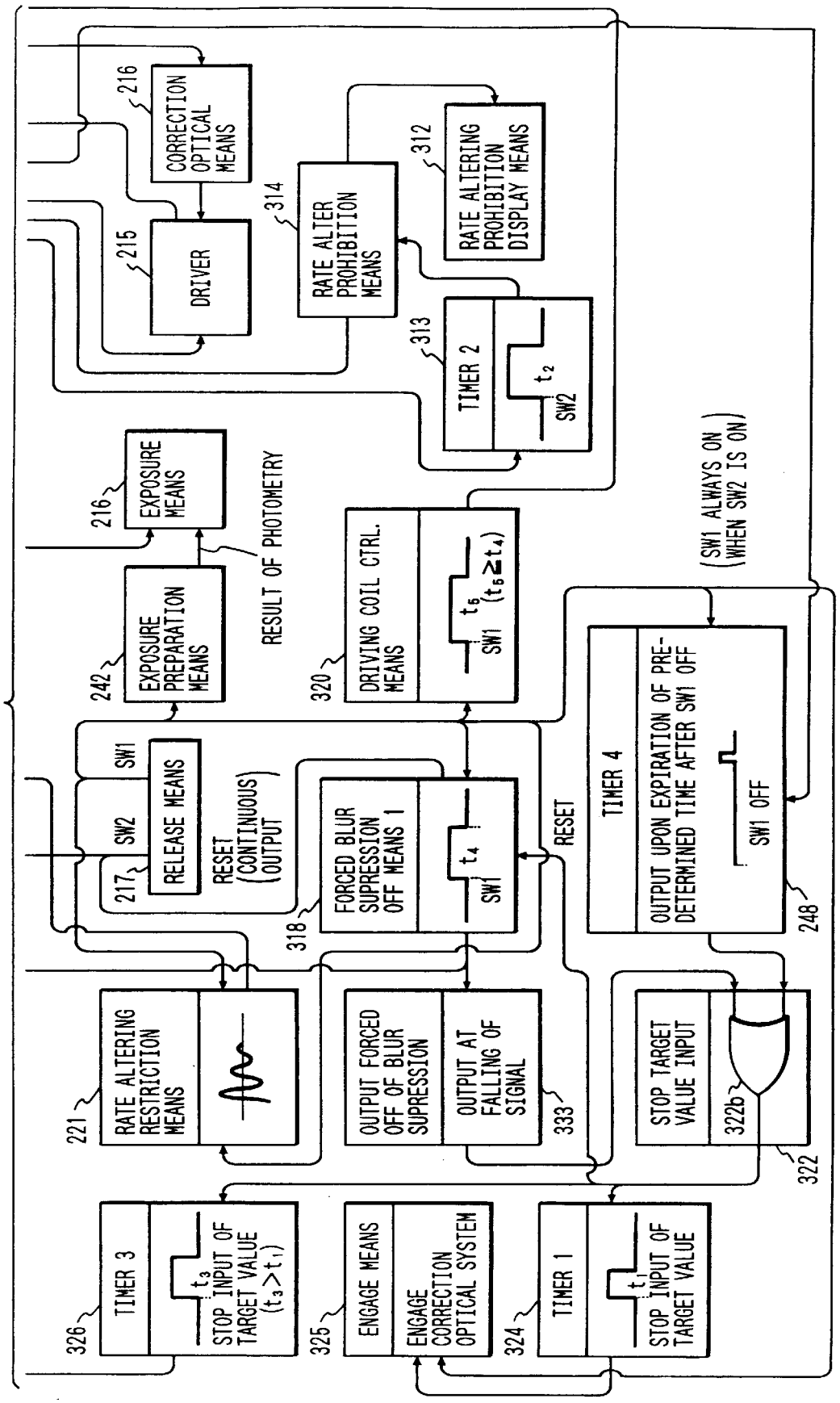
FIG. 23 is comprised of FIGS. 23A and 23B which show block diagrams schematically illustrating the construction of the blur prevention camera of the tenth embodiment according to the present invention.

FIGS. 23A and 23B are block diagrams schematically showing the construction of the blur prevention camera of the tenth embodiment according to the present invention.

The construction shown in FIGS. 23A and 23B is different from the construction shown in FIGS. 13A and 13B in that the driving range detection means 329 is replaced by the timer 4 (248) as well as the AND gate 322a of the target value input stop means 322 by the OR gate 322b.

As described with respect to the construction shown in FIGS. 13A and 13B, the amplification ratio of the target value outputted from the blur suppression sensitivity altering means 246 is gradually reduced after turning off the switch SW1. Such alternation of the amplification ratio is performed in order to let the correction optical means 16 enter the predetermined driving range earlier and finish the blur suppression operation earlier. A similar effect can be obtained if the blur suppression operation is performed for a predetermined time counted from the time the switch SW1 is turned on.

With the construction shown in FIGS. 23A and 23B, when the switch SW1 is turned on, the timer 4 (248) starts counting. And after a time lapse $t_7$ (e.g. 1 sec), the timer 4 (248) outputs a signal to stop the blur suppression operation and lock the correction optical means 16.

The time $t_4$ to be counted by the timer 4 (248) is changed even during the focusing operation. And the time $t_4$ is reduced in the zoom-wide mode and/or at the time of nearest end focus. When the focal length is small, the photographer is not disturbed by the large amount of shift of the correction optical means 216 returning to the zero position. Accordingly, the correction optical means 216 can be returned to the zero position with a somewhat large amplification ratio of the blur suppression sensitivity altering means 246 in a short time $t_7$.

Figure 24A:
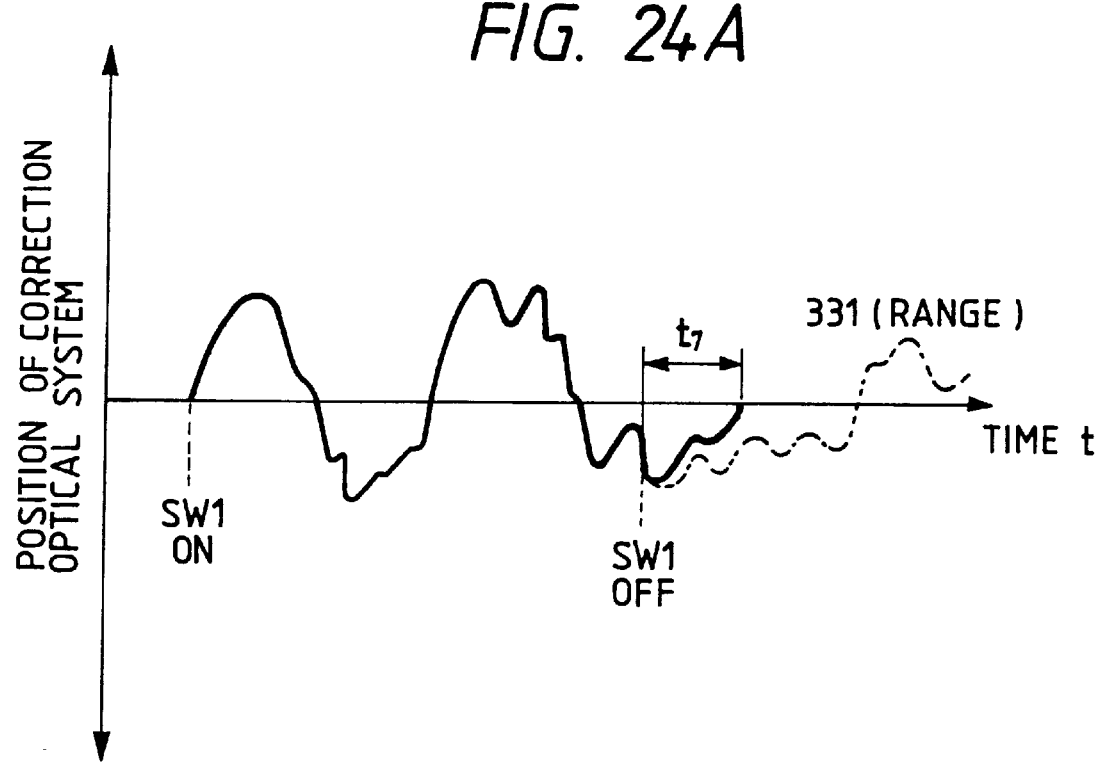
FIGS. 24A and 24B are diagrams explaining position control of the correction optical means after the switch SW1 is turned off, performed by the tenth embodiment according to the present invention.
Figure 24B:
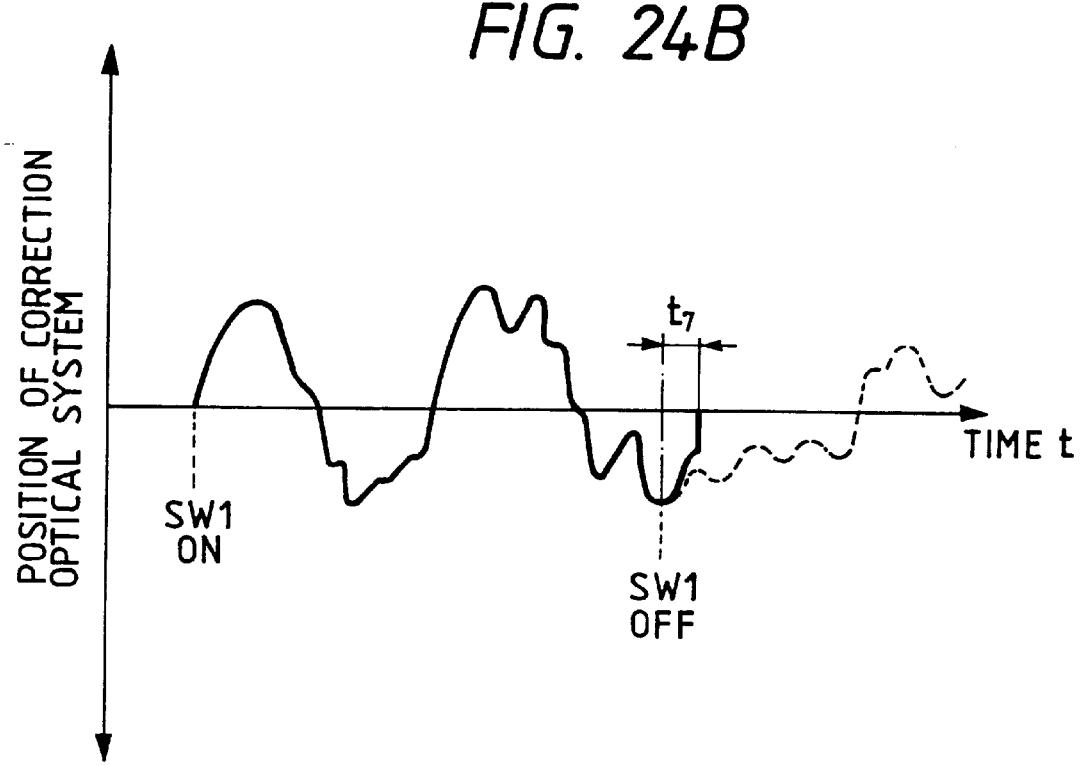

FIGS. 24A and 24B show the amount of shift of the correction optical means 216 in the zoom-tele mode and in the zoom-wide mode, respectively. In the zoom-tele mode, the blur suppression operation is stopped after a time lapse $t_7$ from the time the switch SW1 is turned off, wherein the correction optical means 216 is stopped in the vicinity of the zero position. On the other hand, in the zoom-wide mode, the correction optical means 216 is stopped before it comes in the vicinity of the zero position, because the time lapse $t_7$ during which the correction optical means 216 is driven is shorter than that in the zoom-tele mode. In this way, the blur suppression operation can be finished earlier.

(Eleventh Embodiment)

FIGS. 25A and 25B are block diagrams schematically showing the construction of the blur prevention camera of the eleventh embodiment according to the present invention.

This construction is different from the construction shown in FIGS. 15A and 15B in that the driving range detection means 329 is replaced by the timer 4 (248).

The modification from the construction of FIGS. 15A and 15B to that of FIGS. 25A and 25B is similar to the modification from the construction of FIGS. 14A to 14B to that of FIGS. 15A and 15B. That is, the time lapse $t_7$ of the timer 4 (248) is determined according to the control means 22 changed as the sensor output calculator control means 22 reduces the timer constant of the sensor output calculator.

With the present construction, desirable effects similar to those of FIGS. 24A and 24B can be obtained.

(Twelfth Embodiment)

Figure 26:
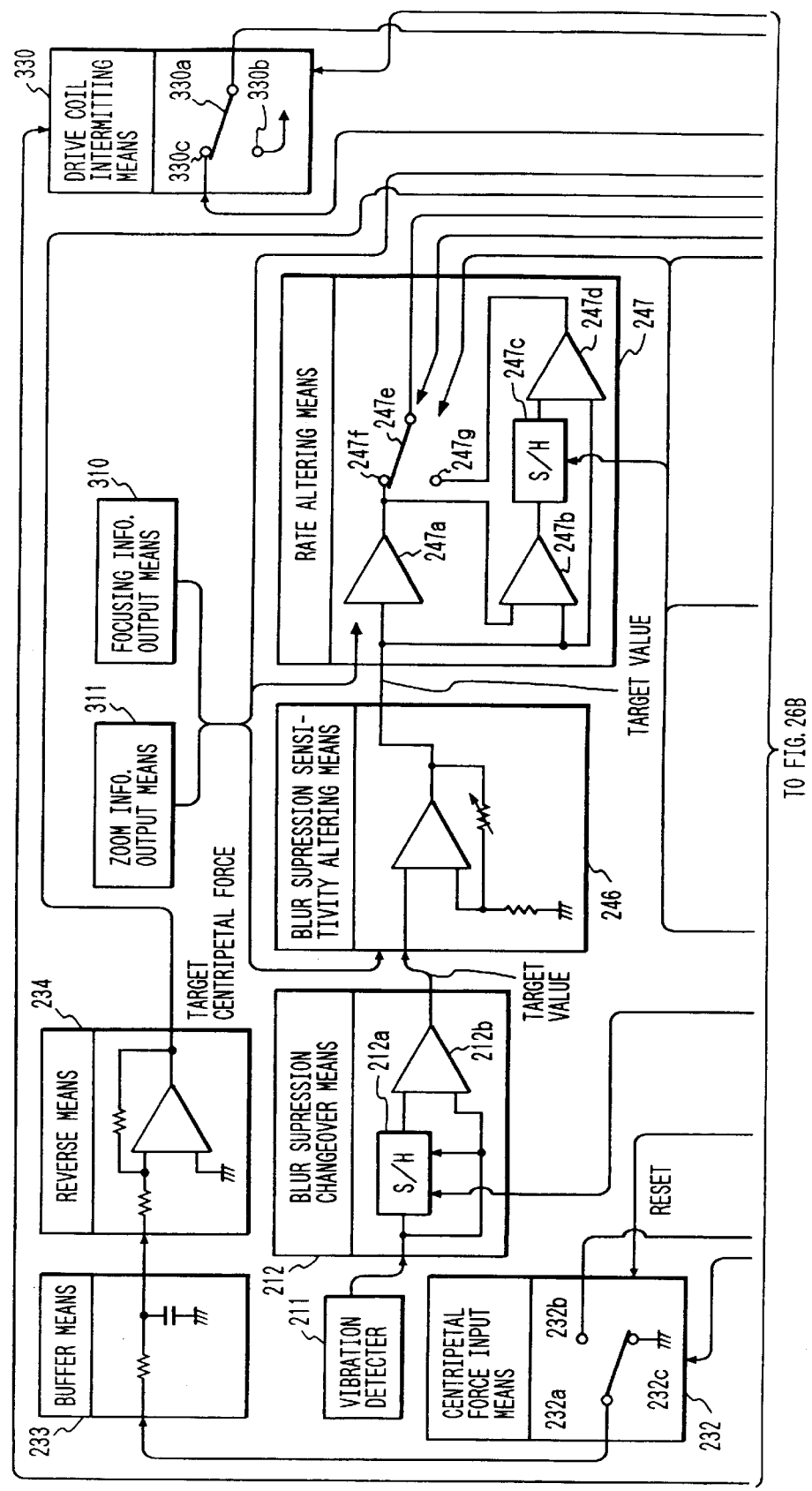
FIG. 26 is comprised of FIGS. 26A and 26B which show block diagrams schematically illustrating the construction of the blur prevention camera of the twelfth embodiment according to the present invention.

FIGS. 26A and 26B are block diagrams schematically showing the construction of the twelfth embodiment according to the present invention.

The modification from the construction shown in FIGS. 18A and 18B to that of FIGS. 26A and 26B is similar to the modification from the construction of FIGS. 13A and 13B to that of FIGS. 23A and 23B. That is, the time lapse $t_7$ of the timer 4 (248) is determined according to the time during which the correction optical means 216 is gradually returned from the position when the switch SW1 is turned off toward the zero position while performing the blur suppression operation.

Figure 27A:
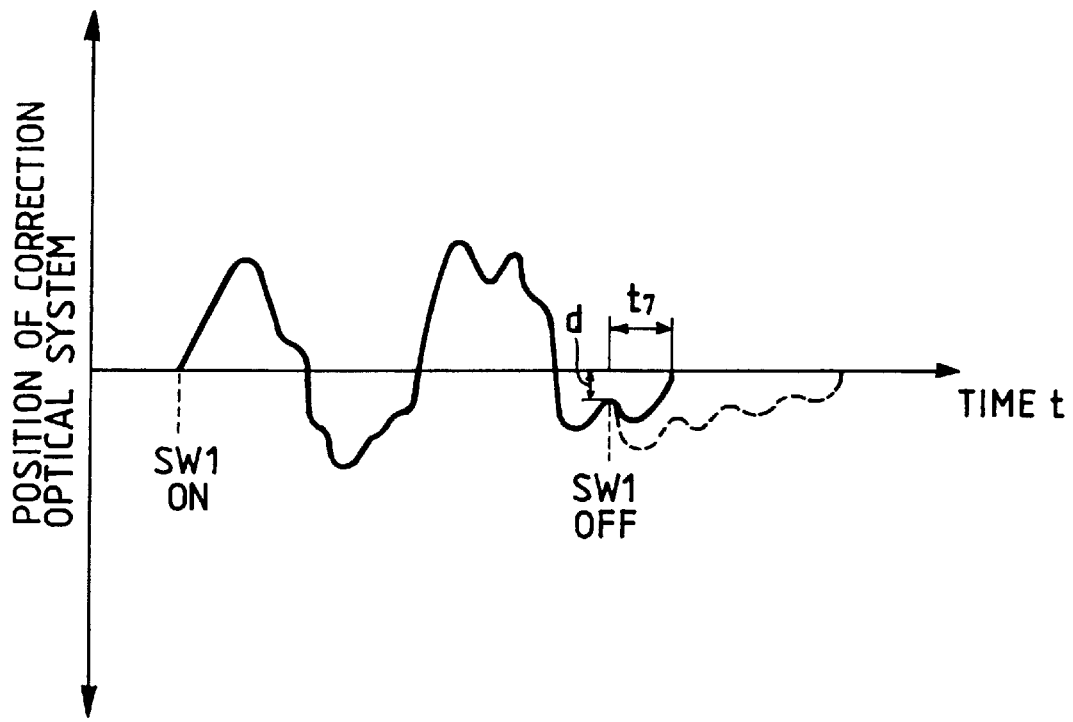
FIGS. 27A and 27B are diagrams explaining position control of the correction optical means after the switch SW1 is turned off, performed by the twelfth embodiment according to the present invention.
Figure 27B:
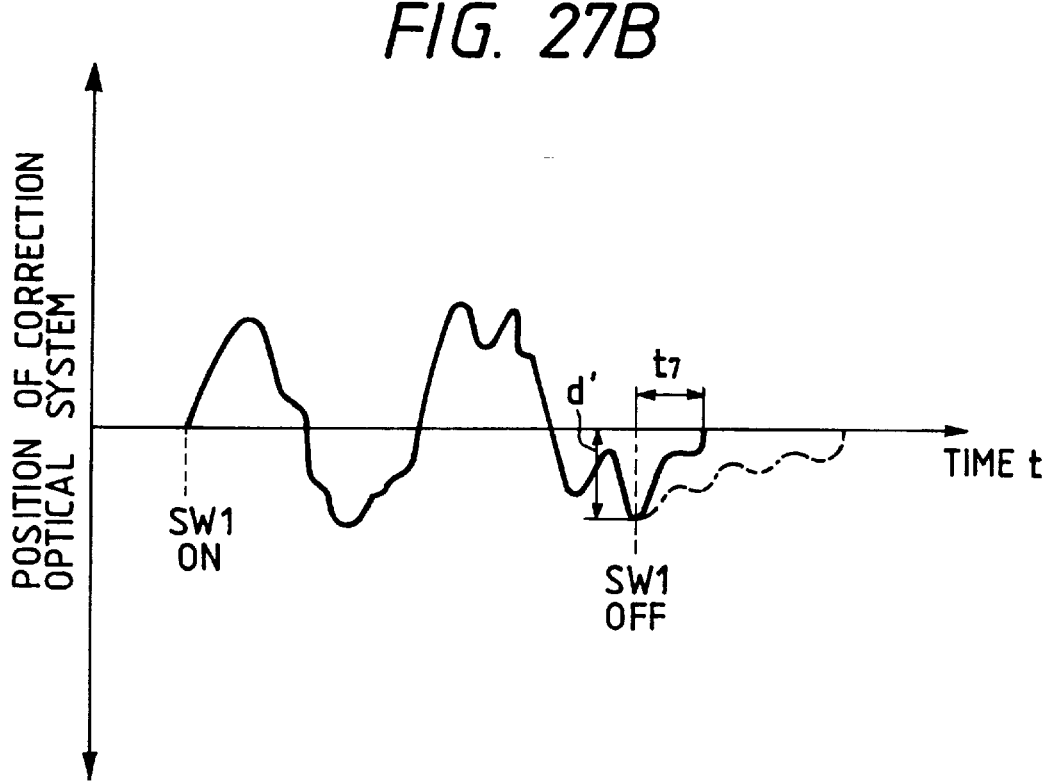

With this construction, the correction optical means 216 reaches in the vicinity of the zero position after the predetermined time ($t_7$) from the time the switch SW1 is turned off, as shown in FIGS. 27A and 27B. Thus, little change in framing occurs when the blur suppression is stopped. Accordingly, the photographer does not see unpleasant disturbance of framing.

In the above-mentioned fifth to twelfth embodiments, the blur suppression operation is continued after the switch SW1 is turned off. And the blur suppression operation is stopped when the correction optical means 216 enters the predetermined driving range or after the predetermined time lapse. As a result, the blur prevention system of each of these embodiments can prevent unpleasant disturbance of framing when the switch SW1 is turned off.

By varying said "predetermined driving range" and/or said "predetermined time lapse" according to the focal length of the lenses, the blur suppression operation of these embodiments can be finished earlier.

In addition, by modifying the operations of the exposure means 316 such as flash of the stroboscope, aperture operation, shutter close operation, and so on, deterioration of the images caused by vibration can be reduced in these embodiments.

In the fifth to twelfth embodiments according to the present invention, as described above, the blur suppression operation is continued by the blur prevention system even after the signal to stop the operation is received. And there is provided the blur suppression control means for stopping the blur suppression operation when the correcting lens of the correction optical means enters a certain driving range which is variable according to the focal length of the photographing lenses or after a certain time lapse which is variable according to the focal length of the photographing lenses. Or, there is provided a blur suppressions control means for reducing, in a predetermined time, the ratio of amount of correction performed by the blur prevention system according to the target value, and a blur suppression stop means for continuing the blur suppression operation after receiving the signal to stop the blur suppression of the blur prevention system and for stopping it when the correction optical means enters a certain driving range which is variable according to the focal length of the photographing lenses or after a certain time lapse which is variable according to the focal length of the photographing lenses. Or, there is provided a blur suppression control means for changing, at predetermined points of time, the frequency characteristics of the blur prevention system, and a blur suppression stop means for continuing the blur suppression operation after receiving the signal to stop the blur suppression of the blur prevention system and for stopping it when the correction optical means enters a certain driving range which is variable according to the focal length of the photographing lenses or after a certain time lapse which is variable according to the focal length of the photographing lenses.

In short, in the fifth to twelfth embodiments, the blur suppression operation is continued even after the blur suppression stop signal is generated, while the correction optical means is inhibited from being driven after stopping the blur suppression operation by stopping the blur suppression operation when the correction optical means enters a predetermined driving range during the blur suppression operation, or by gradually reducing, in a predetermined time, the blur suppression sensitivity after receiving the blur suppression stop signal. At the same time, said driving range and/or the time lapse are varied according to the focal length of the photographing lenses. More specifically, in the zoom-wide mode, the driving range is broadened and/or the time lapse is lengthened.

In this way, the time to perform the blur suppression operation can be reduced to save electric power. At the same time, unpleasant disturbance of framing (the image the photographer sees when looking into the finder) caused when the blur suppression operation is stopped can be made to be negligible.

In some of these embodiments according to the present invention, there is provided a blur suppression control means for commanding, after a predetermined time has lapsed from the beginning of the exposure, the exposure means to perform an aperture down operation, a flash operation, a shutter close operation.

At a result, in each embodiment, deterioration of the images caused by vibration can be remarkably reduced.

The present invention can be applied not only to the image recording operation of a silver salt camera which exposes film to light, but also to that of a video camera.

Though the initializing operation is started when the signal to start image recording is outputted in the above-mentioned embodiments, the initializing operation may be started when a signal other than the image recording start signal is outputted, for example, when the signal to start photometry and/or range measuring (generated right after the ON-signal of switch SW1 in the above-mentioned embodiments) or the signal to start displaying the image in the finder according to the image signal is outputted.

Though, in the above-mentioned embodiments, the correction optical means is driven toward the center of its driving range during the initializing operation, the correction driven optical means may be driven toward a target position other than the center of the driving range.

The apparatus of the present invention can be operated from outside not only by directly touching the operation unit (such as the release button, in the above-mentioned embodiments), but also without directly touching the apparatus, for example, with a remote-controller.

The constructions of the appended claims and of the above-mentioned embodiments, including points of their constructions, may be separately applied to different devices or to different parts of a camera. For example, the deviation detection means is provided in the main body of the camera, and the deviation correction means is provided in the lens barrel mounted on the main body of the camera, while the control means for controlling said means is provided in the intermediate adaptor.

The blur suppression means according to the present invention is not limited to those which actually perform blur suppression, but may include those which indirectly prevent a blur by warning the user by sound, light, or the like, of actual and/or possible vibration.

The deviation detection means employed in the present invention may be any device capable of deviation detection, including an angular accerelation meter, an angular velocity meter, a speed meter, an angular displacement sensor, a displacement sensor, a detector for detecting the vibration of the finder image itself, and so on.

The blur suppression means according to the present invention is not limited to the shift optical system for driving the optical member in a plane vertical to the optical axis, but may be any device capable of preventing a blur, including a light beam altering means such as a variable apex angle prism, a device for shifting the photographing area in a plane vertical to the optical axis, a device for correcting the blur by image processing and so on.

The present invention may be applied to a single-lens reflex camera, a lens shutter camera, a video camera, and to an optical apparatus other than a camera, other kinds of apparatus, and further to a constituent unit of these apparatuses.

The constructions and technical ideas, including any part of them, of the above-mentioned embodiments may be employed in combination with each other, if desirable.

The individual components shown in schematic or block form in the Drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus for use with an image blur prevention device which performs an image blur prevention operation by operating a movable member, said apparatus comprising:

an initial setting portion which moves the movable member to a predetermined target position as an initial setting of the image blur prevention device; and a changing portion which changes a moving amount of the movable member on moving the movable member at positions corresponding to the predetermined target position, as an initial setting operation.

2. An apparatus according to claim 1, wherein said initial setting portion moves the movable member to a position where the image blur operation is started.

3. An apparatus according to claim 2, wherein said initial setting portion moves the movable member to an operational center position of the movable member.

4. An apparatus according to claim 1, wherein the movable member comprises an optical member.

5. An apparatus according to claim 1, wherein said changing portion changes over said changing portion from a state where the initial setting portion performs the initial setting to a state where the initial setting portion is inhibited from performing the initial setting.

6. An apparatus according to claim 1, wherein said changing portion changes a degree of the initial setting operation performed by said initial setting portion.

7. An apparatus according to claim 1, wherein said changing portion changes an operation of said initial setting portion in accordance with a focal length of the movable member.

8. An apparatus according to claim 1, wherein the image blur prevention device includes a shutter release operation member, and wherein said initial setting portion comprises means for performing the initial setting operation in accordance with an operational state of the shutter release operation member.

9. An apparatus according to claim 1, further comprising a control portion for beginning an operation of the movable member after said initial setting portion performs the initial setting operation.

10. An image blur prevention apparatus comprising:

a movable member which prevents image blur;

an initial setting portion which moves the movable member to a predetermined target position as an initial setting of the image blur prevention device; and a changing portion which changes a moving amount of the movable member on moving the movable member at positions corresponding to the predetermined target position, as an initial setting operation.

11. An optical apparatus having an image blur prevention device which performs an image blur prevention operation by moving a movable member, said apparatus comprising:

an initial setting portion which moves the movable member to a predetermined target position as an initial setting of the image blur prevention device; and a changing portion which changes a moving amount of the movable member on moving the movable member at positions corresponding to the predetermined target position, as an initial setting operation.

12. An apparatus having an image blur prevention device which performs an image blur prevention operation by moving a movable member, said apparatus comprising:

an initial setting portion which moves the movable member to a predetermined target position as an initial setting of the image blur prevention device; and a changing portion which changes a moving amount of the movable member on moving the movable member at positions corresponding to the predetermined target position, as an initial setting operation an operation of said initial setting portion.

13. An apparatus adapted to an image blur prevention device used with an optical device, said apparatus comprising:

an initial setting portion which sets the image blur prevention device to an initial state;

a control portion which performs an image blur prevention operation corresponding to a vibration signal following an initial setting of said initial setting portion, said control portion selectively performing a first control and a second control, the first control causing said initial setting portion to perform an initial setting at a first operation state and to perform the image blur prevention operation following the initial setting, the second control causing said initial setting portion to perform an initial setting at a second operation state, which is different from the first operation state, and to perform the image blur prevention operation following the initial setting; and a selecting portion which selects whether said control portion performs the first control or the second control in accordance with at least one of a focal length of the optical device and a setting state of an optical system for focus adjustment of the optical device.

14. An apparatus according to claim 13, wherein the image blur prevention device has a movable member, and wherein said control portion moves, in the initial setting operation, the movable member to a position where the image blur prevention operation is started.

15. An apparatus according to claim 14, wherein the movable member comprises an optical member.

16. An apparatus according to claim 14, wherein said control portion changes operation from a first state where the initial setting operation is performed to a second state where the initial setting operation is inhibited.

17. An apparatus according to claim 14, wherein said control portion further changes a degree of the initial setting operation.

18. An apparatus according to claim 14, wherein the image blur prevention device has a movable member, and further comprising an operation portion which starts an operation of the movable member to prevent image blur after said control portion performs the initial setting operation.

19. An image blur prevention apparatus for use with an optical device, said apparatus comprising:

an image blur prevention device which prevents an image blur; and an initial setting portion which sets the image blur prevention device to an initial state;

a control portion which performs an image blur prevention operation corresponding to a vibration signal following an initial setting of said initial setting portion, said control portion selectively performing a first control and a second control, the first control causing said initial setting portion to perform an initial setting at a first operation state and to perform the image blur prevention operation following the initial setting, the second control causing said initial setting portion to perform an initial setting at a second operation state, which is different from the first operation state, and to perform the image blur prevention operation following the initial setting; and a selecting portion which selects whether said control portion performs the first control or the second control in accordance with at least one of a focal length of the optical device and a setting state of an optical system for focus adjustment of the optical device.

20. An optical apparatus for use with an image blur prevention device, said optical apparatus including an optical device, said apparatus comprising:

an initial set ting portion which sets the image blur prevention device to an initial state;

a control portion which performs an image blur prevention operation corresponding to a vibration signal following an initial setting of said initial setting portion, said control portion selectively performing a first control and a second control, the first control causing said initial setting portion to perform an initial setting a t a first operation state and to perform the image blur prevention operation following the initial setting, the second control causing said initial setting portion to perform an initial setting at a second operation state, which is different from the first operation state, and to perform the image blur prevention operation following the initial setting; and a selecting portion which selects whether said control portion performs the first control or the second control in accordance with at least one of a focal length of the optical device and a setting state of an optical system for focus adjustment of the optical device.

* * * * *

UNITED STATES PATENT AND TRADEMARK OFFICE
CERTIFICATE OF CORRECTION

PATENT NO.   :   6,064,826

DATED        :   May 16, 2000

INVENTOR(S)  :   Koichi WASHISU                                        Page 1 of 13

It is certified that error appears in the above-identified patent and that said Letters Patent is hereby corrected as shown below:

IN THE DRAWINGS:

SHEET 4 OF THE DRAWINGS:

In Fig. 3A, in box 11, "DETECTER" should read --DETECTOR--.

SHEET 10 OF THE DRAWINGS:

In Fig. 7A, in boxes 12 and 46 "SUPRESSION" (both occurrences) should read --SUPPRESSION--.

SHEET 11 OF THE DRAWINGS:

In Fig. 7B, in box 114, "ALTER" should read --ALTERING--.

SHEET 12 OF THE DRAWINGS:

In Fig. 9A, in box 12, "SUPRESION" should read --SUPPRESSION--.

SHEET 14 OF THE DRAWINGS:

In Fig. 10A, in boxes 212 and 246, "SUPRESSION" (both occurrences) should read --SUPPRESSION--.

UNITED STATES PATENT AND TRADEMARK OFFICE
CERTIFICATE OF CORRECTION

PATENT NO.    : 6,064,826
DATED         : May 16, 2000
INVENTOR(S)   : Koichi WASHISU It is certified that error appears in the above-identified patent and that said Letters Patent is hereby corrected as shown below:

SHEET 15 OF THE DRAWINGS:

In Fig. 10B, in boxes 318, 321, and 333, "SUPRESSION" (three occurrences) should read --SUPPRESSION-- and in box 314, "ALTER" should read --ALTERING--.

SHEET 18 OF THE DRAWINGS:

In Fig. 13A, in boxes 212 and 246, "SUPRESSION" (both occurrences) should read --SUPPRESSION--.

SHEET 19 OF THE DRAWINGS:

In Fig. 13B, in boxes 318, 321, and 333, "SUPRESSION" (three occurrences) should read --SUPPRESSION-- and in box 314, "ALTER" should read --ALTERING--.

SHEET 21 OF THE DRAWINGS:

In Fig. 15A, in boxes 212 and 246 "SUPRESSION" (both occurrences) should read --SUPPRESSION--.

SHEET 22 OF THE DRAWINGS:

In Fig. 15B, in boxes 222, 318, 321, and 333 "SUPRESSION" (four occurrences) should read --SUPPRESSION-- and in box 314 "ALTER" should read --ALTERING--.

UNITED STATES PATENT AND TRADEMARK OFFICE
CERTIFICATE OF CORRECTION

PATENT NO. : 6,064,826

DATED : May 16, 2000

INVENTOR(S) : Koichi WASHISU

It is certified that error appears in the above-identified patent and that said Letters Patent is hereby corrected as shown below:

SHEET 25 OF THE DRAWINGS:

In Fig. 18A, in boxes 212 and 246 "SUPRESSION" (both occurrences) should read --SUPPRESSION--.

SHEET 26 OF THE DRAWINGS:

In Fig. 18B, in boxes 318, 321, and 333, "SUPRESSION" (three occurrences) should read --SUPPRESSION-- and in box 314, "ALTER" should read --ALTERING--.

SHEET 28 OF THE DRAWINGS:

In Fig. 20A, in boxes 212 and 246, "SUPRESSION" (both occurrences) should read --SUPPRESSION--.

SHEET 29 OF THE DRAWINGS:

In Fig. 20B, in boxes 318, 319, and 333, "SUPRESSION" (three occurrences) should read --SUPPRESSION-- and in box 314, "ALTER" should read --ALTERING--.

SHEET 32 OF THE DRAWINGS:

In Fig. 23A, in boxes 212 and 246, "SUPRESSION" (both occurrences) should read --SUPPRESSION--.

UNITED STATES PATENT AND TRADEMARK OFFICE
CERTIFICATE OF CORRECTION

PATENT NO. : 6,064,826
DATED : May 16, 2000
INVENTOR(S) : Koichi WASHISU

Page 4 of 13

It is certified that error appears in the above-identified patent and that said Letters Patent is hereby corrected as shown below:

SHEET 33 OF THE DRAWINGS:

In Fig. 23B, in boxes 318 and 333 "SUPRESSION" (both occurrences) should read --SUPPRESSION--; and in box 314, "ALTER" should read --ALTERING--.

SHEET 35 OF THE DRAWINGS:

In Fig. 25A, in boxes 212 and 246, "SUPRESSION" (both occurrences) should read --SUPPRESSION--.

SHEET 36 OF THE DRAWINGS:

In Fig. 25B, in boxes 222, 318, and 333 "SUPRESSION" (three occurrences) should read --SUPPRESSION-- and in box 314, "ALTER" should read --ALTERING--.

SHEET 37 OF THE DRAWINGS:

In Fig. 26A, in boxes 212 and 246, "SUPRESSION" (both occurrences) should read --SUPPRESSION--.

SHEET 38 OF THE DRAWINGS:

In Fig. 26B, in boxes 318 and 333, "SUPRESSION" (both occurrences) should read --SUPPRESSION-- and in box 314, "ALTER" should read --ALTERING--.

UNITED STATES PATENT AND TRADEMARK OFFICE
CERTIFICATE OF CORRECTION

PATENT NO.   :  6,064,826

DATED        :  May 16, 2000

INVENTOR(S)  :  Koichi WASHISU

It is certified that error appears in the above-identified patent and that said Letters Patent is hereby corrected as shown below:

SHEET 46 OF THE DRAWINGS:

In Fig. 33A, in boxes 212 and 246, "SUPRESSION" (both occurrences) should read --SUPPRESSION--.

SHEET 47 OF THE DRAWINGS:

In Fig. 33B, in box 314, "ALTER" should read --ALTERING--.

SHEET 48 OF THE DRAWINGS:

In Fig. 34A, in boxes 212 and 246, "SUPRESSION" (both occurrences) should read --SUPPRESSION--.

Figure 34B:
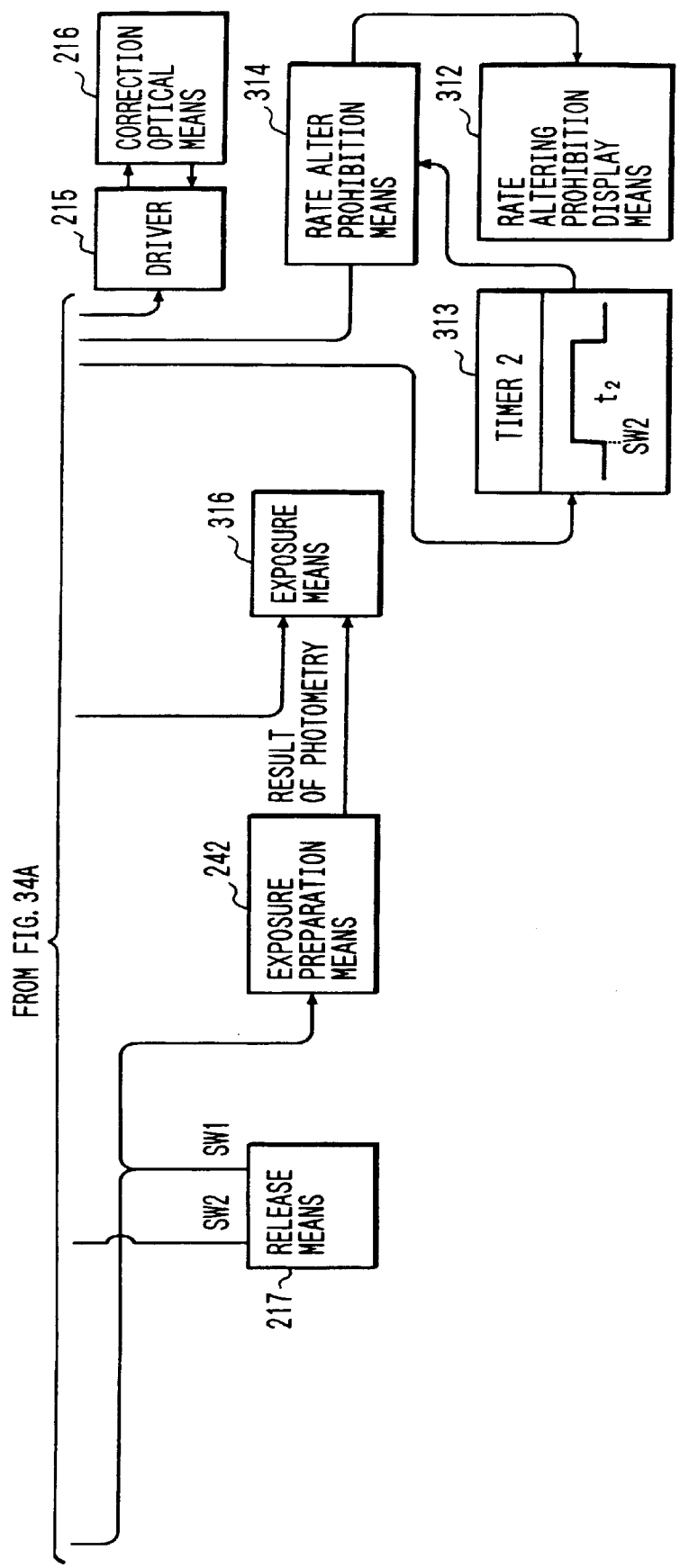
FIG. 34 is comprised of FIGS. 34A and 34B which show block diagrams illustrating the same construction as FIGS. 33A and 33B, wherein some means such as the buffer means are omitted.
Figure 35A:
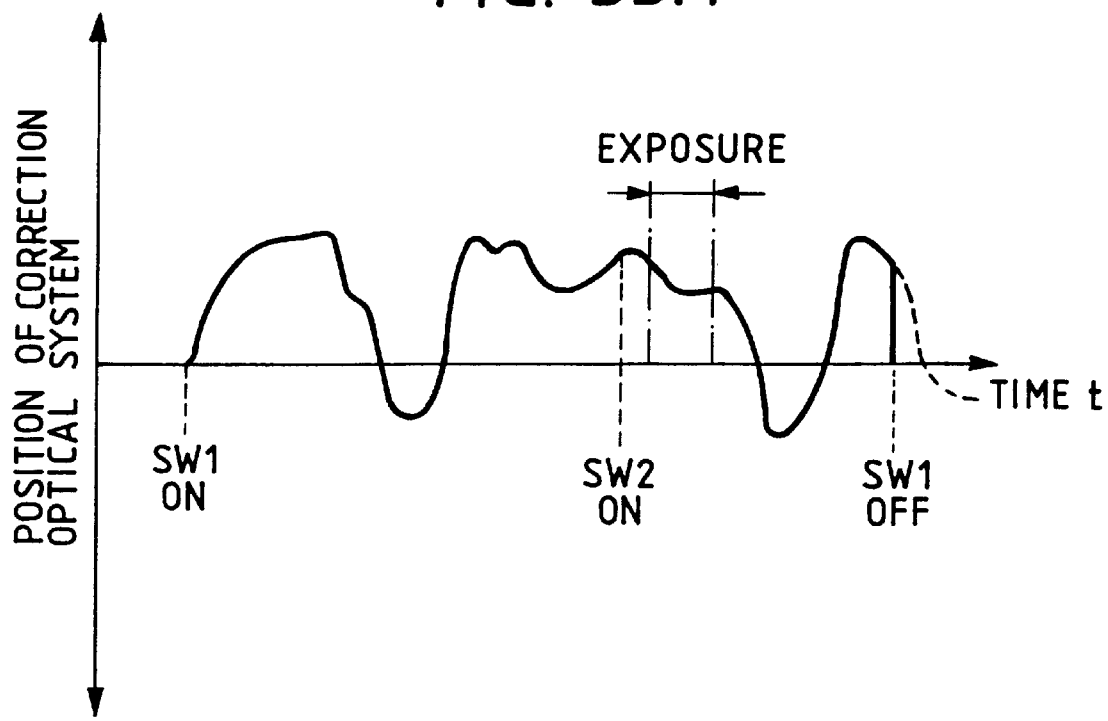
FIGS. 35A and 35B are diagrams explaining position control of the correction optical means after the switch SW1 of the blur prevention camera shown in FIGS. 33A and 33B is turned off.
Figure 35B:
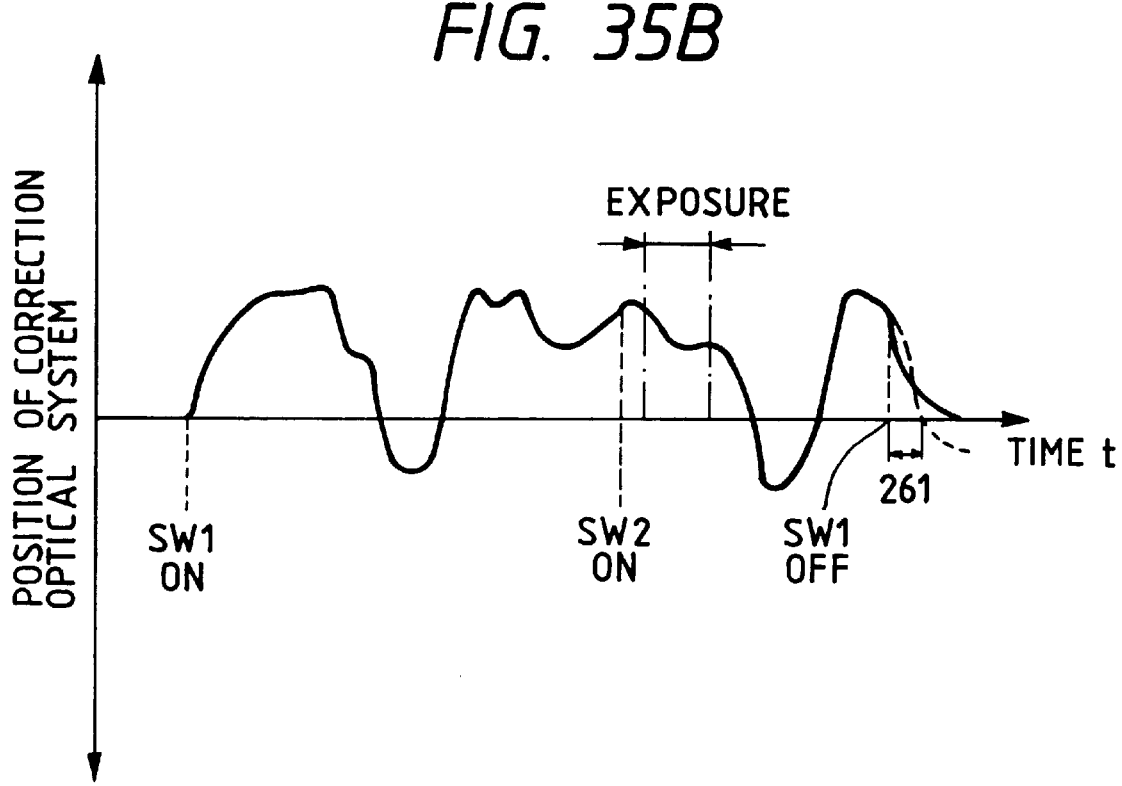

SHEET 49 OF THE DRAWINGS:

In Fig. 34B, in box 314, "ALTER" should read --ALTERING--.

COLUMN 1:

Line 24, "of the" should read --of--.
Line 25, "of" should read --of the--.
Line 55, "designate" should read --designates--.

UNITED STATES PATENT AND TRADEMARK OFFICE
CERTIFICATE OF CORRECTION

PATENT NO. : 6,064,826

DATED : May 16, 2000

INVENTOR(S) : Koichi WASHISU

It is certified that error appears in the above-identified patent and that said Letters Patent is hereby corrected as shown below:

COLUMN 2:

Line 46, "senser" should read --sensor--.

COLUMN 4:

Line 11, "drive" should read --drives--.
   Line 35, "lenses" should read --lens--.
   Line 39, "can not" should read --cannot--.

COLUMN 5:

Line 1, "can not" should read --cannot--.
   Line 13, "comprising" should read --comprises a--.
   Line 41, "comprising of" should read --comprising--.

COLUMN 6:

Line 31, "is applied should be deleted
   Line 37, "during" should read --while--.
   Line 65, "can not" should read --cannot--.

UNITED STATES PATENT AND TRADEMARK OFFICE
CERTIFICATE OF CORRECTION

PATENT NO.   : 6,064,826
DATED        : May 16, 2000
INVENTOR(S)  : Koichi WASHISU It is certified that error appears in the above-identified patent and that said Letters Patent is hereby corrected as shown below:

COLUMN 7:

Line 21, "output" should read --outputs--.
Line 53, "whole" should read --while--.

COLUMN 8:

Line 20, "invention" should read --invention,--.
Line 37, "comprised" should read --is comprised--.
Line 38, "illustratinging" should read --illustrating--.

COLUMN 9:

Line 8, "lip" should be deleted.

COLUMN 10:

Line 35, "sample" should read --a sample--.
Line 53, "referred" should read --referred to--.
Line 61, "change over" should read --change-over--.
Line 64, "witch" should read --switch--.

UNITED STATES PATENT AND TRADEMARK OFFICE
CERTIFICATE OF CORRECTION

PATENT NO.  : 6,064,826

DATED  : May 16, 2000

INVENTOR(S) :  Koichi WASHISU

It is certified that error appears in the above-identified patent and that said Letters Patent is hereby corrected as shown below:

COLUMN 11:

Line 13, "change" should read --change- --.
Line 19, "change" should read --change- --.
Line 32, "change over" should read --change-over--.
Line 47, "change over" should read --change-over--.

COLUMN 12:

Line 7, "change over" should read --change-over--.
Line 11, "value" should read --value which--.
Line 13, "change over" should read --change-over--.
Line 20, "change over" should read --change-over--.
Line 27, "change" should read --change- --.
Line 42, "change over" should read --change-over--.
Line 44, "then" should read --is then--.
Line 46, "change over" should read --change-over--.
Line 48, "change over" should read --change-over--.
Line 51, "change over" should read --change-over--.
Line 53, "change over" should read --change-over-- and "construction" should read --construction were--.

UNITED STATES PATENT AND TRADEMARK OFFICE
CERTIFICATE OF CORRECTION

PATENT NO.   :   6,064,826

DATED        :   May 16, 2000

INVENTOR(S)  :   Koichi WASHISU

It is certified that error appears in the above-identified patent and that said Letters Patent is hereby corrected as shown below:

COLUMN 13:

Line 15, "operation" should read --operation,--.
Line 16, "problems" should read --problems,-- and "performed" should read --performed when--.
Line 61, "disturbance" should read --disturbances--.

COLUMN 14:

Line 8, "change over" should read --change-over--.
Line 10, "change over" should read --change-over--.
Line 37, "change over" should read --change-over--.
Line 40, "change over" should read --change-over--.
Line 47, "change." should read --change- --.
Line 48, "Over" should read --over--.
Line 53, "change over" should read --change-over--.
Line 64, "change over" should read --change-over--.

UNITED STATES PATENT AND TRADEMARK OFFICE
CERTIFICATE OF CORRECTION

PATENT NO.   :   6,064,826
DATED        :   May 16, 2000
INVENTOR(S)  :   Koichi WASHISU It is certified that error appears in the above-identified patent and that said Letters Patent is hereby corrected as shown below:

COLUMN 15:

Line 10, "change over" should read --change-over--.
Line 14, "receives" should read --received-- and "change over" should read --change-over--.
Line 22, "change over" should read --change-over--.
Line 64, "can not" should read --cannot--.
Line 66, "shows" should read --show--.

COLUMN 16:

Line 45, "change over," should read --change-over--.

COLUMN 17:

Line 7, "by 6," should read --by $\delta$,--.
Line 25, "addition" should read --addition,--.
Line 27, "object" should read --objects--.
Line 41, "is optically" should read --optically--.

COLUMN 18:

Line 22, "can not" should read --cannot--.
Line 24, "can not" should read --cannot--.
Line 34, "object" should read --objects--.

UNITED STATES PATENT AND TRADEMARK OFFICE
CERTIFICATE OF CORRECTION

PATENT NO. : 6,064,826
DATED : May 16, 2000
INVENTOR(S) : Koichi WASHISU

It is certified that error appears in the above-identified patent and that said Letters Patent is hereby corrected as shown below:

COLUMN 19:

Line 10, "change over" should read --change-over--.
Line 36, "can not" should read --cannot--.
Line 67, "have" should read --have:--.

COLUMN 21:

Line 39, "start" should read --starts--.
Line 55, "tion" should read --tions--.
Line 56, "limitation" should read --limitations-- and "of" (first occurrence) should read --on the--.

COLUMN 22:

Line 66, "exposure the" should read --the exposure--.

COLUMN 23:

Line 7, "can not" should read --cannot--.

UNITED STATES PATENT AND TRADEMARK OFFICE
CERTIFICATE OF CORRECTION

PATENT NO.    : 6,064,826
DATED         : May 16, 2000
INVENTOR(S)   : Koichi WASHISU It is certified that error appears in the above-identified patent and that said Letters Patent is hereby corrected as shown below:

COLUMN 24:

Line 36, "comprises of" should read --comprises--.
Line 40, "comprises of" should read --comprises--.

COLUMN 28:

Line 37, "amount" should read --the amount--.

COLUMN 29:

Line 14, "a shutter" should read --or a shutter--.

UNITED STATES PATENT AND TRADEMARK OFFICE
CERTIFICATE OF CORRECTION

PATENT NO.    :   6,064,826
DATED         :   May 16, 2000
INVENTOR(S)   :   Koichi WASHISU It is certified that error appears in the above-identified patent and that said Letters Patent is hereby corrected as shown below:

COLUMN 32:

Line 37, "set ting" should read --setting--.
Line 44, "a t a" should read --at a--.

Signed and Sealed this

Eighth Day of May, 2001

*Attest:*

NICHOLAS P. GODICI

*Attesting Officer*   Acting Director of the United States Patent and Trademark Office